(12) United States Patent
Raleigh et al.

(10) Patent No.: US 8,924,469 B2
(45) Date of Patent: Dec. 30, 2014

(54) ENTERPRISE ACCESS CONTROL AND ACCOUNTING ALLOCATION FOR ACCESS NETWORKS

(75) Inventors: Gregory G. Raleigh, Woodside, CA (US); Alireza Raissinia, Monte Sereno, CA (US); Jeffrey Green, Sunnyvale, CA (US)

(73) Assignee: Headwater Partners I LLC, Redwood City, CA (US)

( * ) Notice: Subject to any disclaimer, the term of this patent is extended or adjusted under 35 U.S.C. 154(b) by 0 days.

(21) Appl. No.: 13/248,028

(22) Filed: Sep. 28, 2011

(65) Prior Publication Data

US 2012/0084184 A1     Apr. 5, 2012

Related U.S. Application Data

(63) Continuation-in-part of application No. 12/380,759, filed on Mar. 2, 2009, now Pat. No. 8,270,310, which is (Continued)

(51) Int. Cl.
*G06F 15/173* (2006.01)

(52) U.S. Cl.
USPC ............................ 709/203; 709/224; 455/406

(58) Field of Classification Search
USPC ......... 709/203, 216, 219, 223, 225, 226, 238, 709/224; 370/230, 289, 312, 313; 726/1, 4; 705/30, 34; 455/30, 34, 404.1, 405, 455/406, 414.1, 456.1
See application file for complete search history.

(56) References Cited

U.S. PATENT DOCUMENTS 5,283,904 A   2/1994  Carson et al.
5,577,100 A   11/1996 McGregor et al.

(Continued)

FOREIGN PATENT DOCUMENTS

CN   1310401 A    8/2001
CN   1538730 A    10/2004

(Continued)

OTHER PUBLICATIONS

Author Unknown, 3GPP TS 23.203, V8.4.0, 3rd Generation Partnership Project; Technical Specification Group Services and System Aspects; Policy and Charging Control Architecture (Release 8), Dec. 2008.

(Continued)

*Primary Examiner* — Andrew Joseph Rudy
(74) *Attorney, Agent, or Firm* — James E. Harris; Krista S. Jacobsen

(57) ABSTRACT

Enterprise and consumer billing allocation for wireless communication device service usage activities is provided. In some embodiments, enterprise and consumer billing allocation for wireless communication device service usage activities includes: monitoring a service usage activity of a wireless communication device, and determining an enterprise and consumer billing allocation for the monitored service usage activity; reporting the monitored service usage activity to a network element, in which the network element determines an enterprise and consumer billing allocation for the monitored service usage activity; or providing a service design center for configuring an enterprise and consumer billing allocation of monitored service usage activities for a plurality of wireless communication devices associated with an enterprise account, and implementing the configured enterprise and consumer billing allocation for monitored service usage activities for the plurality of wireless communication devices associated with the enterprise account.

47 Claims, 28 Drawing Sheets

Related U.S. Application Data a continuation-in-part of application No. 12/380,779, filed on Mar. 2, 2009, now abandoned, application No. 13/248,028, which is a continuation-in-part of application No. 12/380,758, filed on Mar. 2, 2009, and a continuation-in-part of application No. 12/380,778, filed on Mar. 2, 2009, now Pat. No. 8,321,526, and a continuation-in-part of application No. 12/380,768, filed on Mar. 2, 2009, and a continuation-in-part of application No. 12/380,767, filed on Mar. 2, 2009, now Pat. No. 8,355,337, and a continuation-in-part of application No. 12/380,780, filed on Mar. 2, 2009, now Pat. No. 8,839,388, and a continuation-in-part of application No. 12/380,755, filed on Mar. 2, 2009, now Pat. No. 8,331,901, and a continuation-in-part of application No. 12/380,756, filed on Mar. 2, 2009, now Pat. No. 8,250,207, and a continuation-in-part of application No. 12/380,770, filed on Mar. 2, 2009, now abandoned, and a continuation-in-part of application No. 12/380,772, filed on Mar. 2, 2009, now Pat. No. 8,839,387, and a continuation-in-part of application No. 12/380,782, filed on Mar. 2, 2009, now Pat. No. 8,270,952, and a continuation-in-part of application No. 12/380,783, filed on Mar. 2, 2009, and a continuation-in-part of application No. 12/380,757, filed on Mar. 2, 2009, now Pat. No. 8,326,958, and a continuation-in-part of application No. 12/380,781, filed on Mar. 2, 2009, now Pat. No. 8,229,812, and a continuation-in-part of application No. 12/380,774, filed on Mar. 2, 2009, now Pat. No. 8,630,192, and a continuation-in-part of application No. 12/380,773, filed on Mar. 2, 2009, now Pat. No. 8,799,451, and a continuation-in-part of application No. 12/380,769, filed on Mar. 2, 2009, now Pat. No. 8,675,507, and a continuation-in-part of application No. 12/380,777, filed on Mar. 2, 2009, now Pat. No. 8,583,781, and a continuation-in-part of application No. 12/695,019, filed on Jan. 27, 2010, now Pat. No. 8,275,830, and a continuation-in-part of application No. 12/695,020, filed on Jan. 27, 2010, now Pat. No. 8,406,748, which is a continuation-in-part of application No. 12/394,445, filed on Feb. 27, 2009, now Pat. No. 8,418,148, application No. 13/248,028, which is a continuation-in-part of application No. 12/694,451, filed on Jan. 27, 2010, now Pat. No. 8,548,428, and a continuation-in-part of application No. 12/394,455, filed on Feb. 27, 2010, now Pat. No. 8,109,801, and a continuation-in-part of application No. 12/695,021, filed on Jan. 27, 2010, now Pat. No. 8,346,225, and a continuation-in-part of application No. 12/695,980, filed on Jan. 28, 2010, now Pat. No. 8,340,634, and a continuation-in-part of application No. 13/134,028, filed on May 25, 2011, now Pat. No. 8,589,541, which is a continuation-in-part of application No. 12/134,005, filed on Jun. 5, 2008, now Pat. No. 7,518,809, application No. 13/248,028, which is a continuation-in-part of application No. 13/237,827, filed on Sep. 20, 2011, now Pat. No. 8,832,777, and a continuation-in-part of application No. 13/239,321, filed on Sep. 21, 2011, and a continuation-in-part of application No. 13/229,580, filed on Sep. 9, 2011, now Pat. No. 8,626,115, and a continuation-in-part of application No. 13/248,025, filed on Sep. 28, 2011, which is a continuation-in-part of application No. 12/380,759, filed on Mar. 2, 2009, now Pat. No. 8,270,310, and a continuation-in-part of application No. 12/380,779, filed on Mar. 2, 2009, now abandoned, and a continuation-in-part of application No. 12/380,758, filed on Mar. 2, 2009, and a continuation-in-part of application No. 12/380,778, filed on Mar. 2, 2009, now Pat. No. 8,321,526, and a continuation-in-part of application No. 12/380,768, filed on Mar. 2, 2009, and a continuation-in-part of application No. 12/380,767, filed on Mar. 2, 2009, now Pat. No. 8,355,337, said application No. 13/248,025 is a continuation-in-part of application No. 12/380,780, filed on Mar. 2, 2009, now Pat. No. 8,839,388, application No. 13/248,028, which is a continuation-in-part of application No. 13/247,998, filed on Sep. 28, 2011, now Pat. No. 8,725,123, which is a continuation-in-part of application No. 13/239,321, filed on Sep. 21, 2011, which is a continuation-in-part of application No. 12/380,757, filed on Mar. 2, 2009, now Pat. No. 8,326,958, and a continuation-in-part of application No. 13/134,005, filed on May 25, 2011, now Pat. No. 8,635,335, and a continuation-in-part of application No. 13/134,028, filed on May 25, 2011, now Pat. No. 8,589,541, and a continuation-in-part of application No. 12/380,768, filed on Mar. 2, 2009, and a continuation-in-part of application No. 13/237,827, filed on Sep. 20, 2011, now Pat. No. 8,832,777, and a continuation-in-part of application No. 13/229,580, filed on Sep. 9, 2011, now Pat. No. 8,626,115, which is a continuation-in-part of application No. 12/380,759, filed on Mar. 2, 2009, now Pat. No. 8,270,310, said application No. 13/229,580 is a continuation-in-part of application No. 13/134,005, filed on May 25, 2011, now Pat. No. 8,635,335, which is a continuation-in-part of application No. 12/380,759, filed on Mar. 2, 2009, now Pat. No. 8,270,310, said application No. 13/134,005 is a continuation-in-part of application No. 12/380,779, filed on Mar. 2, 2009, now abandoned, said application No. 13/134,005 is a continuation-in-part of application No. 12/380,758, filed on Mar. 2, 2009, said application No. 13/134,005 is a continuation-in-part of application No. 12/380,778, filed on Mar. 2, 2009, now Pat. No. 8,321,526, said application No. 13/134,005 is a continuation-in-part of application No. 12/380,768, filed on Mar. 2, 2009, said application No. 13/134,005 is a continuation-in-part of application No. 12/380,767, filed on Mar. 2, 2009, now Pat. No. 8,355,337, said application No. 13/134,005 is a continuation-in-part of application No. 12/380,780, filed on Mar. 2, 2009, now Pat. No. 8,839,388, said application No. 13/134,005 is a continuation-in-part of application No. 12/380,755, filed on Mar. 2, 2009, now Pat. No. 8,331,901, said application No. 13/134,005 is a continuation-in-part of application No. 12/380,756, filed on Mar. 2, 2009, now Pat. No. 8,250,207, said application No. 13/134,005 is a continuation-in-part of application No. 12/380,770, filed on Mar. 2, 2009, now abandoned, said application No. 13/134,005 is a continuation-in-part of application No. 12/380,772, filed on Mar. 2, 2009, now Pat. No. 8,839,387, said application No. 13/134,005 is a continuation-in-part of application No. 12/380,782, filed on Mar. 2, 2009, now Pat. No. 8,270,952, said application No. 13/134,005 is a continuation-in-part of application No. 12/380,783, filed on Mar. 2, 2009, said application No. 13/134,005 is a continuation-in-part of application No. 12/380,757, filed on Mar. 2, 2009, now Pat. No. 8,326,958, which is a continuation-in-part of application No. 12/380,781, filed on Mar. 2, 2009, now Pat. No. 8,229,812, said application No. 13/134,005 is a continuation-in-part of application No. 12/380,774, filed on Mar. 2, 2009, now Pat. No. 8,630,192, said application No. 13/134,005 is a continuation-in-part of application No. 12/380,771, filed on Mar. 2, 2009, now Pat. No. 8,023,425, said application No. 13/134,005 is a continuation-in-part of application No. 12/380,773, filed on Mar. 2, 2009, now Pat. No. 8,799,451, said application No. 13/134,005 is a continuation-in-part of application No. 12/380,769, filed on Mar. 2, 2009, now Pat. No. 8,675,507, said application No. 13/134,005 is a continuation-in-part of application No. 12/380,777, filed on Mar. 2, 2009, now Pat. No. 8,583,781, said application No. 13/134,005 is a continuation-in-part of application No. 12/695,019, filed on Jan. 27, 2010, now Pat. No. 8,275,830, which is a continuation-in-part of application No. 12/380,778, filed on Mar. 2, 2009, now Pat. No. 8,321,526, and a continuation-in-part of application No. 12/380,771, filed on Mar. 2, 2009, now Pat. No. 8,023,425, said application No. 13/134,005 is a continuation-in-part of application No. 12/695,020, filed on Jan. 27, 2010, now Pat. No. 8,406,748, which is a continuation-in-part of application No. 12/380,780, filed on Mar. 2, 2009, now Pat. No. 8,839,388, said application No. 13/134,005 is a continuation-in-part of application No. 12/694,445, filed on Jan. 27, 2010, now Pat. No. 8,391,834, which is a continuation-in-part of application No. 12/380,780, filed on Mar. 2, 2009, now Pat. No. 8,839,388, said application No. 13/134,005 is a continuation-in-part of application No. 12/694,451, filed on Jan. 27, 2010, now Pat. No. 8,548,428, which is a continuation-in-part of application No. 12/380,780, filed on Mar. 2, 2009, now Pat. No. 8,839,388, said application No. 13/134,005 is a continuation-in-part of application No. 12/694,455, filed on Jan. 27, 2010, now Pat. No. 8,402,111, which is a continuation-in-part of application No. 12/380,780, filed on Mar. 2, 2009, now Pat. No. 8,839,388, said application No. 13/134,005 is a continuation-in-part of application No. 12/695,021, filed on Jan. 27, 2010, now Pat. No. 8,346,225, which is a continuation-in-part of application No. 12/380,780, filed on Mar. 2, 2009, now Pat. No. 8,839,388, said application No. 13/134,005 is a continuation-in-part of application No. 12/695,980, filed on Jan. 28, 2010, now Pat. No. 8,340,634, said application No. 12/695,980 is a continuation-in-part of application No. 12/380,780, filed on Mar. 2, 2009, now Pat. No. 8,839,388, and a continuation-in-part of application No. 12/695,019, filed on Jan. 27, 2010, now Pat. No. 8,275,830, and a continuation-in-part of application No. 12/695,021, filed on Jan. 27, 2010, now Pat. No. 8,346,225, said application No. 13/229,580 is a continuation-in-part of application No. 13/134,028, filed on May 25, 2011, now Pat. No. 8,589,541, which is a continuation-in-part of application No. 13/134,005, filed on May 25, 2011, now Pat. No. 8,635,335, and a continuation-in-part of application No. 12/380,780, filed on Mar. 2, 2009, now Pat. No. 8,839,388, and a continuation-in-part of application No. 12/380,755, filed on Mar. 2, 2009, now Pat. No. 8,331,901, and a continuation-in-part of application No. 12/380,756, filed on Mar. 2, 2009, now Pat. No. 8,250,207, and a continuation-in-part of application No. 12/695,980, filed on Jan. 28, 2010, now Pat. No. 8,340,634, and a continuation-in-part of application No. 12/695,021, filed on Jan. 27, 2010, now Pat. No. 8,346,225, and a continuation-in-part of application No. 12/694,455, filed on Jan. 27, 2010, now Pat. No. 8,402,111, said application No. 13/134,028 is a continuation-in-part of application No. 12/694,451, filed on Jan. 27, 2010, now Pat. No. 8,548,428, and a continuation-in-part of application No. 12/695,020, filed on Jan. 27, 2010, now Pat. No. 8,406,748, and a continuation-in-part of application No. 12/694,445, filed on Jan. 27, 2010, now Pat. No. 8,391,834, and a continuation-in-part of application No. 12/695,019, filed on Jan. 27, 2010, now Pat. No. 8,275,830, and a continuation-in-part of application No. 12/380,777, filed on Mar. 2, 2009, now Pat. No. 8,583,781, and a continuation-in-part of application No. 12/380,769, filed on Mar. 2, 2009, now Pat. No. 8,675,507, and a continuation-in-part of application No. 12/380,773, filed on Mar. 2, 2009, now Pat. No. 8,799,451, and a continuation-in-part of application No. 12/380,774, filed on Mar. 2, 2009, now Pat. No. 8,630,192, and a continuation-in-part of application No. 12/380,781, filed on Mar. 2, 2009, now Pat. No. 8,229,812, and a continuation-in-part of application No. 12/380,757, filed on Mar. 2, 2009, now Pat. No. 8,326,958, and a continuation-in-part of application No. 12/380,783, filed on Mar. 2, 2009, and a continuation-in-part of application No. 12/380,782, filed on Mar. 2, 2009, now Pat. No. 8,270,952, and a continuation-in-part of application No. 12/380,772, filed on Mar. 2, 2009, now Pat. No. 8,839,387, and a continuation-in-part of application No. 12/380,771, filed on Mar. 2, 2009, now Pat. No. 8,023,425, and a continuation-in-part of application No. 12/380,770, filed on Mar. 2, 2009, now abandoned, and a continuation-in-part of application No. 12/380,759, filed on Mar. 2, 2009, now Pat. No. 8,270,310, and a continuation-in-part of application No. 12/380,779, filed on Mar. 2, 2009, now abandoned, and a continuation-in-part of application No. 12/380,758, filed on Mar. 2, 2009, and a continuation-in-part of application No. 12/380,778, filed on Mar. 2, 2009, now Pat. No. 8,321,526, and a continuation-in-part of application No. 12/380,768, filed on Mar. 2, 2009, and a continuation-in-part of application No. 12/380,767, filed on Mar. 2, 2009, now Pat. No. 8,355,337, said application No. 13/229,580 is a continuation-in-part of application No. 12/380,779, filed on Mar. 2, 2009, now abandoned, and a continuation-in-part of application No. 12/380,758, and a continuation-in-part of application No. 12/380,778, and a continuation-in-part of application No. 12/380,768, and a continuation-in-part of application No. 12/380,767, and a continuation-in-part of application No. 12/380,780, and a continuation-in-part of application No. 12/380,755, and a continuation-in-part of application No. 12/380,756, and a continuation-in-part of application No. 12/380,770, and a continuation-in-part of application No. 12/380,771, and a continuation-in-part of application No. 12/380,772, and a continuation-in-part of application No. 12/380,782, and a continuation-in-part of application No. 12/380,783, and a continuation-in-part of application No. 12/380,757, and a continuation-in-part of application No. 12/380,781, and a continuation-in-part of application No. 12/380,774, and a continuation-in-part of application No. 12/380,773, and a continuation-in-part of application No. 12/380,769, and a continuation-in-part of application No. 12/380,777, and a continuation-in-part of application No. 12/695,019, and a continuation-in-part of application No. 12/695,020, and a continuation-in-part of application No. 12/694,445, and a continuation-in-part of application No. 12/694,451, and a continuation-in-part of application No. 12/694,455, and a continuation-in-part of application No. 12/695,021, and a continuation-in-part of application No. 12/695,980, said application No. 13/239,321 is a continuation-in-part of application No. 12/380,758, and a continuation-in-part of application No. 12/380,778, and a continuation-in-part of application No. 12/380,768, said application No. 13/239,321 is a continuation-in-part of application No. 12/380,767, and a continuation-in-part of application No. 12/380,755, and a continuation-in-part of application No. 12/380,756, and a continuation-in-part of application No. 12/380,770, and a continuation-in-part of application No. 12/380,772, and a continuation-in-part of application No. 12/380,782, and a continuation-in-part of application No. 12/380,783, and a continuation-in-part of application No. 12/380,781, and a continuation-in-part of application No. 12/380,774, and a continuation-in-part of application No. 12/380,773, and a continuation-in-part of application No. 12/380,769, and a continuation-in-part of application No. 12/380,777, and a continuation-in-part of application No. 12/695,020, and a continuation-in-part of application No. 13/695,019, and a continuation-in-part of application No. 12/694,445, and a continuation-in-part of application No. 12/694,451, said application No. 13/237,827 is a continuation-in-part of application No. 12/380,759, said application No. 13/134,028 is a continuation-in-part of application No. 12/380,779, said application No. 13/237,827 is a continuation-in-part of application No. 12/380,758, and a continuation-in-part of application No. 12/338,778, filed on Dec. 18, 2008, now Pat. No. 7,742,164, and a continuation-in-part of application No. 12/380,768, and a continuation-in-part of application No. 12/380,767, and a continuation-in-part of application No. 12/380,780, and a continuation-in-part of application No. 12/380,755, and a continuation-in-part of application No. 12/380,756, and a continuation-in-part of application No. 12/380,770, and a continuation-in-part of application No. 12/380,772, and a continuation-in-part of application No. 12/380,782, and a continuation-in-part of application No. 12/380,783, and a continuation-in-part of application No. 12/380,757, and a continuation-in-part of application No. 12/380,781, and a continuation-in-part of application No. 12/380,774, and a continuation-in-part of application No. 12/380,773, and a continuation-in-part of application No. 12/380,769, and a continuation-in-part of application No. 12/380,777, and a continuation-in-part of application No. 12/695,019.

(60) Provisional application No. 61/387,243, filed on Sep. 28, 2010, provisional application No. 61/387,247, filed on Sep. 28, 2010, provisional application No. 61/389,547, filed on Oct. 4, 2010, provisional application No. 61/407,358, filed on Oct. 27, 2010, provisional application No. 61/418,507, filed on Dec. 1, 2010, provisional application No. 61/418,509, filed on Dec. 1, 2010, provisional application No. 61/420,727, filed on Dec. 7, 2010, provisional application No. 61/422,565, filed on Dec. 13, 2010, provisional application No. 61/422,572, filed on Dec. 13, 2010, provisional application No. 61/422,574, filed on Dec. 13, 2010, provisional application No. 61/435,564, filed on Jan. 24, 2011, provisional application No. 61/472,606, filed on Apr. 6, 2011, provisional application No. 61/385,020, filed on Sep. 21, 2010, provisional application No. 61/381,159, filed on Sep. 9, 2010, provisional application No. 61/381,162, filed on Sep. 9, 2010, provisional application No. 61/384,456, filed on Sep. 20, 2010, provisional application No. 61/206,354, filed on Jan. 28, 2009, provisional application No. 61/206,944, filed on Feb. 4, 2009, provisional application No. 61/207,393, filed on Feb. 10, 2009, provisional application No. 61/207,739, filed on Feb. 13, 2009, provisional application No. 61/270,353, filed on Jul. 6, 2009, provisional application No. 61/264,126, filed on Nov. 24, 2009, provisional application No. 61/275,208, filed on Aug. 25, 2009, provisional application No. 61/237,753, filed on Aug. 28, 2009, provisional application No. 61/252,151, filed on Oct. 15, 2009, provisional application No. 61/252,153, filed on Oct. 15, 2009, provisional application No. 61/264,120, filed on Nov. 24, 2009, provisional application No. 61/348,022, filed on May 25, 2010, provisional application No. 61/387,547, filed on Sep. 29, 2010.

(56) References Cited

U.S. PATENT DOCUMENTS

| | | |
|---|---|---|
| 5,594,777 A | 1/1997 | Makkonen et al. |
| 5,630,159 A | 5/1997 | Zancho |
| 5,633,484 A | 5/1997 | Zancho et al. |
| 5,774,532 A | 6/1998 | Gottlieb et al. |
| 5,794,142 A | 8/1998 | Vanttila et al. |
| 5,814,798 A | 9/1998 | Zancho |
| 5,889,477 A | 3/1999 | Fastenrath |
| 5,892,900 A | 4/1999 | Ginter et al. |
| 5,903,845 A | 5/1999 | Buhrmann et al. |
| 5,915,008 A | 6/1999 | Dulman |
| 5,933,778 A | 8/1999 | Buhrmann et al. |
| 5,940,472 A | 8/1999 | Newman et al. |
| 5,983,270 A | 11/1999 | Abraham et al. |
| 6,035,281 A | 3/2000 | Crosskey et al. |
| 6,038,452 A | 3/2000 | Strawczynski et al. |
| 6,047,268 A | 4/2000 | Bartoli et al. |
| 6,064,878 A | 5/2000 | Denker et al. |
| 6,078,953 A | 6/2000 | Vaid et al. |
| 6,081,591 A | 6/2000 | Skoog |
| 6,098,878 A | 8/2000 | Dent et al. |
| 6,104,700 A | 8/2000 | Haddock et al. |
| 6,141,686 A | 10/2000 | Jackowski et al. |

(56) References Cited

U.S. PATENT DOCUMENTS

| | | |
|---|---|---|
| 6,148,336 A | 11/2000 | Thomas et al. |
| 6,154,738 A | 11/2000 | Call |
| 6,185,576 B1 | 2/2001 | Mcintosh |
| 6,198,915 B1 | 3/2001 | McGregor et al. |
| 6,226,277 B1 | 5/2001 | Chuah |
| 6,263,055 B1 | 7/2001 | Garland et al. |
| 6,292,828 B1 * | 9/2001 | Williams ................. 709/218 |
| 6,317,584 B1 | 11/2001 | Abu-Amara et al. |
| 6,381,316 B2 | 4/2002 | Joyce et al. |
| 6,418,147 B1 | 7/2002 | Wiedeman |
| 6,449,479 B1 | 9/2002 | Sanchez |
| 6,477,670 B1 | 11/2002 | Ahmadvand |
| 6,502,131 B1 | 12/2002 | Vaid et al. |
| 6,505,114 B2 | 1/2003 | Luciani |
| 6,532,235 B1 | 3/2003 | Benson et al. |
| 6,532,579 B2 | 3/2003 | Sato et al. |
| 6,539,082 B1 | 3/2003 | Lowe et al. |
| 6,542,992 B1 | 4/2003 | Peirce et al. |
| 6,563,806 B1 | 5/2003 | Yano et al. |
| 6,574,321 B1 | 6/2003 | Cox et al. |
| 6,574,465 B2 | 6/2003 | Marsh et al. |
| 6,581,092 B1 | 6/2003 | Motoyama et al. |
| 6,598,034 B1 | 7/2003 | Kloth |
| 6,603,969 B1 | 8/2003 | Vuoristo et al. |
| 6,606,744 B1 | 8/2003 | Mikurak |
| 6,631,122 B1 | 10/2003 | Arunachalam et al. |
| 6,639,975 B1 | 10/2003 | O'Neal et al. |
| 6,640,097 B2 | 10/2003 | Corrigan et al. |
| 6,650,887 B2 | 11/2003 | McGregor et al. |
| 6,651,101 B1 | 11/2003 | Gai et al. |
| 6,654,814 B1 | 11/2003 | Britton et al. |
| 6,658,254 B1 | 12/2003 | Purdy et al. |
| 6,678,516 B2 | 1/2004 | Nordman et al. |
| 6,683,853 B1 | 1/2004 | Kannas et al. |
| 6,684,244 B1 | 1/2004 | Goldman et al. |
| 6,725,031 B2 | 4/2004 | Watler et al. |
| 6,748,195 B1 | 6/2004 | Phillips |
| 6,754,470 B2 | 6/2004 | Hendrickson et al. |
| 6,763,000 B1 | 7/2004 | Walsh |
| 6,765,864 B1 | 7/2004 | Natarajan et al. |
| 6,765,925 B1 | 7/2004 | Sawyer et al. |
| 6,782,412 B2 | 8/2004 | Brophy et al. |
| 6,785,889 B1 | 8/2004 | Williams |
| 6,829,596 B1 | 12/2004 | Frazee |
| 6,829,696 B1 | 12/2004 | Balmer et al. |
| 6,839,340 B1 | 1/2005 | Voit et al. |
| 6,873,988 B2 | 3/2005 | Herrmann et al. |
| 6,876,653 B2 | 4/2005 | Ambe et al. |
| 6,885,997 B1 | 4/2005 | Roberts |
| 6,920,455 B1 | 7/2005 | Weschler |
| 6,922,562 B2 | 7/2005 | Ward et al. |
| 6,928,280 B1 | 8/2005 | Xanthos et al. |
| 6,934,249 B1 | 8/2005 | Bertin et al. |
| 6,947,723 B1 | 9/2005 | Gurnani et al. |
| 6,952,428 B1 | 10/2005 | Necka et al. |
| 6,957,067 B1 | 10/2005 | Iyer et al. |
| 6,965,667 B2 | 11/2005 | Trabandt et al. |
| 6,965,872 B1 | 11/2005 | Grdina |
| 6,967,958 B2 | 11/2005 | Ono et al. |
| 6,996,076 B1 | 2/2006 | Forbes et al. |
| 6,996,393 B2 | 2/2006 | Pyhalammi et al. |
| 6,998,985 B2 | 2/2006 | Reisman et al. |
| 7,002,920 B1 | 2/2006 | Ayyagari et al. |
| 7,013,469 B2 | 3/2006 | Smith et al. |
| 7,024,200 B2 | 4/2006 | McKenna et al. |
| 7,027,408 B2 | 4/2006 | Nabkel et al. |
| 7,032,072 B1 | 4/2006 | Quinn et al. |
| 7,039,037 B2 | 5/2006 | Wang et al. |
| 7,039,403 B2 | 5/2006 | Wong |
| 7,039,713 B1 | 5/2006 | Van Gunter et al. |
| 7,042,988 B2 | 5/2006 | Juitt et al. |
| 7,043,226 B2 * | 5/2006 | Yamauchi ................. 455/405 |
| 7,043,268 B2 | 5/2006 | Yukie et al. |
| 7,058,968 B2 | 6/2006 | Rowland et al. |
| 7,068,600 B2 | 6/2006 | Cain |
| 7,069,248 B2 | 6/2006 | Huber |
| 7,092,696 B1 | 8/2006 | Hosain et al. |
| 7,102,620 B2 | 9/2006 | Harries et al. |
| 7,113,780 B2 | 9/2006 | Mckenna et al. |
| 7,113,997 B2 | 9/2006 | Jayapalan et al. |
| 7,139,569 B2 | 11/2006 | Kato |
| 7,142,876 B2 | 11/2006 | Trossen et al. |
| 7,158,792 B1 | 1/2007 | Cook et al. |
| 7,167,078 B2 | 1/2007 | Pourchot |
| 7,174,174 B2 | 2/2007 | Boris et al. |
| 7,180,855 B1 | 2/2007 | Lin |
| 7,181,017 B1 | 2/2007 | Nagel et al. |
| 7,197,321 B2 | 3/2007 | Erskine et al. |
| 7,203,169 B1 | 4/2007 | Okholm et al. |
| 7,212,491 B2 | 5/2007 | Koga |
| 7,228,354 B2 | 6/2007 | Chambliss et al. |
| 7,236,780 B2 | 6/2007 | Benco et al. |
| 7,242,920 B2 | 7/2007 | Morris |
| 7,245,901 B2 | 7/2007 | McGregor et al. |
| 7,251,218 B2 | 7/2007 | Jorgensen |
| 7,280,816 B2 | 10/2007 | Fratti et al. |
| 7,280,818 B2 | 10/2007 | Clayton |
| 7,283,561 B1 | 10/2007 | Picher-Dempsey |
| 7,283,963 B1 | 10/2007 | Fitzpatrick et al. |
| 7,286,834 B2 | 10/2007 | Walter |
| 7,286,848 B2 | 10/2007 | Vireday et al. |
| 7,289,489 B1 | 10/2007 | Kung et al. |
| 7,290,283 B2 | 10/2007 | Copeland, III |
| 7,310,424 B2 | 12/2007 | Gehring et al. |
| 7,313,237 B2 | 12/2007 | Bahl et al. |
| 7,317,699 B2 | 1/2008 | Godfrey et al. |
| 7,320,029 B2 | 1/2008 | Rinne et al. |
| 7,322,044 B2 | 1/2008 | Hrastar |
| 7,324,447 B1 | 1/2008 | Morford |
| 7,325,037 B2 | 1/2008 | Lawson |
| 7,336,960 B2 | 2/2008 | Zavalkovsky et al. |
| 7,346,410 B2 | 3/2008 | Uchiyama |
| 7,349,695 B2 | 3/2008 | Oommen et al. |
| 7,353,533 B2 | 4/2008 | Wright et al. |
| 7,356,011 B1 | 4/2008 | Waters et al. |
| 7,356,337 B2 | 4/2008 | Florence |
| 7,366,497 B2 | 4/2008 | Nagata |
| 7,373,136 B2 | 5/2008 | Watler et al. |
| 7,373,179 B2 | 5/2008 | Stine et al. |
| 7,388,950 B2 | 6/2008 | Elsey et al. |
| 7,401,338 B1 | 7/2008 | Bowen et al. |
| 7,403,763 B2 | 7/2008 | Maes |
| 7,418,253 B2 | 8/2008 | Kavanagh |
| 7,418,257 B2 | 8/2008 | Kim |
| 7,421,004 B2 | 9/2008 | Feher |
| 7,444,669 B1 | 10/2008 | Bahl et al. |
| 7,450,591 B2 | 11/2008 | Korling et al. |
| 7,450,927 B1 | 11/2008 | Creswell et al. |
| 7,457,265 B2 | 11/2008 | Julka et al. |
| 7,460,837 B2 | 12/2008 | Diener |
| 7,472,189 B2 * | 12/2008 | Mallya et al. ................. 709/224 |
| 7,478,420 B2 | 1/2009 | Wright et al. |
| 7,486,185 B2 | 2/2009 | Culpepper et al. |
| 7,493,659 B1 | 2/2009 | Wu et al. |
| 7,496,652 B2 | 2/2009 | Pezzutti |
| 7,499,438 B2 | 3/2009 | Hinman et al. |
| 7,499,537 B2 | 3/2009 | Elsey et al. |
| 7,502,672 B1 | 3/2009 | Kolls |
| 7,515,608 B2 | 4/2009 | Yuan et al. |
| 7,516,219 B2 | 4/2009 | Moghaddam et al. |
| 7,529,204 B2 | 5/2009 | Bourlas et al. |
| 7,535,880 B1 | 5/2009 | Hinman et al. |
| 7,539,132 B2 | 5/2009 | Werner et al. |
| 7,540,408 B2 | 6/2009 | Levine et al. |
| 7,545,782 B2 | 6/2009 | Rayment et al. |
| 7,546,460 B2 | 6/2009 | Maes |
| 7,546,629 B2 | 6/2009 | Albert et al. |
| 7,548,976 B2 | 6/2009 | Bahl et al. |
| 7,551,922 B2 | 6/2009 | Roskowski et al. |
| 7,555,757 B2 | 6/2009 | Smith et al. |
| 7,565,141 B2 | 7/2009 | Macaluso |
| 7,574,509 B2 | 8/2009 | Nixon et al. |
| 7,574,731 B2 | 8/2009 | Fascenda |
| 7,580,356 B1 | 8/2009 | Mishra et al. |

(56) References Cited

U.S. PATENT DOCUMENTS

| | | | |
|---|---|---|---|
| 7,580,857 B2 | 8/2009 | VanFleet et al. |
| 7,583,964 B2 | 9/2009 | Wong |
| 7,593,417 B2 | 9/2009 | Wang et al. |
| 7,593,730 B2 | 9/2009 | Khandelwal et al. |
| 7,596,373 B2 | 9/2009 | Mcgregor et al. |
| 7,599,288 B2 | 10/2009 | Cole et al. |
| 7,609,650 B2 | 10/2009 | Roskowski et al. |
| 7,609,700 B1 | 10/2009 | Ying et al. |
| 7,610,328 B2 | 10/2009 | Haase et al. |
| 7,610,396 B2 | 10/2009 | Taglienti et al. |
| 7,616,962 B2 | 11/2009 | Oswal et al. |
| 7,617,516 B2 | 11/2009 | Huslak et al. |
| 7,620,041 B2 | 11/2009 | Dunn et al. |
| 7,620,065 B2 | 11/2009 | Falardeau |
| 7,620,162 B2 | 11/2009 | Aaron et al. |
| 7,627,314 B2 | 12/2009 | Carlson et al. |
| 7,633,438 B2 | 12/2009 | Tysowski |
| 7,634,388 B2 | 12/2009 | Archer et al. |
| 7,636,574 B2 | 12/2009 | Poosala |
| 7,644,151 B2 | 1/2010 | Jerrim et al. |
| 7,644,267 B2 | 1/2010 | Ylikoski et al. |
| 7,647,047 B2 | 1/2010 | Moghaddam et al. |
| 7,650,137 B2 | 1/2010 | Jobs et al. |
| 7,653,394 B2 | 1/2010 | McMillin |
| 7,668,176 B2 | 2/2010 | Chuah |
| 7,668,903 B2 | 2/2010 | Edwards et al. |
| 7,685,131 B2 | 3/2010 | Batra et al. |
| 7,685,254 B2 | 3/2010 | Pandya |
| 7,693,720 B2 | 4/2010 | Kennewick et al. |
| 7,697,540 B2 | 4/2010 | Haddad et al. |
| 7,710,932 B2 | 5/2010 | Muthuswamy et al. |
| 7,711,848 B2 | 5/2010 | Maes |
| 7,720,464 B2 | 5/2010 | Batta |
| 7,720,505 B2 | 5/2010 | Gopi et al. |
| 7,720,960 B2 | 5/2010 | Pruss et al. |
| 7,725,570 B1 | 5/2010 | Lewis |
| 7,729,326 B2 | 6/2010 | Sekhar |
| 7,730,123 B1 | 6/2010 | Erickson et al. |
| 7,734,784 B1 | 6/2010 | Araujo et al. |
| 7,742,406 B1 | 6/2010 | Muppala |
| 7,746,854 B2 | 6/2010 | Ambe et al. |
| 7,747,240 B1 | 6/2010 | Briscoe et al. |
| 7,747,699 B2 | 6/2010 | Prueitt et al. |
| 7,747,730 B1 | 6/2010 | Harlow |
| 7,756,534 B2 | 7/2010 | Anupam et al. |
| 7,756,757 B1 | 7/2010 | Oakes, III |
| 7,760,711 B1 | 7/2010 | Kung et al. |
| 7,760,861 B1 | 7/2010 | Croak et al. |
| 7,774,323 B2 | 8/2010 | Helfman |
| 7,774,456 B1 | 8/2010 | Lownsbrough et al. |
| 7,778,176 B2 | 8/2010 | Morford |
| 7,778,643 B2 | 8/2010 | Laroia et al. |
| 7,792,538 B2 | 9/2010 | Kozisek |
| 7,792,708 B2 | 9/2010 | Alva |
| 7,797,060 B2 | 9/2010 | Grgic et al. |
| 7,797,204 B2 | 9/2010 | Balent |
| 7,797,401 B2 | 9/2010 | Stewart et al. |
| 7,801,523 B1 | 9/2010 | Kenderov |
| 7,801,985 B1 | 9/2010 | Pitkow et al. |
| 7,802,724 B1 * | 9/2010 | Nohr ............................ 235/384 |
| 7,805,140 B2 * | 9/2010 | Friday et al. .................. 455/436 |
| 7,805,606 B2 | 9/2010 | Birger et al. |
| 7,822,837 B1 | 10/2010 | Urban et al. |
| 7,826,427 B2 | 11/2010 | Sood et al. |
| 7,826,607 B1 | 11/2010 | De Carvalho Resende et al. |
| 7,844,728 B2 | 11/2010 | Anderson et al. |
| 7,848,768 B2 | 12/2010 | Omori et al. |
| 7,853,255 B2 | 12/2010 | Karaoguz et al. |
| 7,856,226 B2 * | 12/2010 | Wong et al. ................. 455/414.1 |
| 7,865,182 B2 | 1/2011 | Macaluso |
| 7,868,778 B2 | 1/2011 | Kenwright |
| 7,873,344 B2 * | 1/2011 | Bowser et al. ............. 455/404.1 |
| 7,873,705 B2 | 1/2011 | Kalish |
| 7,877,090 B2 * | 1/2011 | Maes ......................... 455/432.1 |
| 7,881,199 B2 | 2/2011 | Krstulich |
| 7,881,697 B2 | 2/2011 | Baker et al. |
| 7,882,029 B2 | 2/2011 | White |
| 7,886,047 B1 | 2/2011 | Potluri |
| 7,890,084 B1 | 2/2011 | Dudziak et al. |
| 7,890,111 B2 | 2/2011 | Bugenhagen |
| 7,899,438 B2 | 3/2011 | Baker et al. |
| 7,903,553 B2 | 3/2011 | Liu |
| 7,907,970 B2 | 3/2011 | Park et al. |
| 7,911,975 B2 | 3/2011 | Droz et al. |
| 7,912,025 B2 | 3/2011 | Pattenden et al. |
| 7,912,056 B1 | 3/2011 | Brassem |
| 7,920,529 B1 | 4/2011 | Mahler et al. |
| 7,921,463 B2 | 4/2011 | Sood et al. |
| 7,929,959 B2 | 4/2011 | DeAtley et al. |
| 7,929,960 B2 | 4/2011 | Martin et al. |
| 7,929,973 B2 | 4/2011 | Zavalkovsky et al. |
| 7,930,327 B2 | 4/2011 | Craft et al. |
| 7,930,446 B2 | 4/2011 | Kesselman et al. |
| 7,937,069 B2 | 5/2011 | Rassam |
| 7,940,685 B1 | 5/2011 | Breslau et al. |
| 7,940,751 B2 | 5/2011 | Hansen |
| 7,941,184 B2 | 5/2011 | Prendergast et al. |
| 7,944,948 B2 * | 5/2011 | Chow et al. .................. 370/485 |
| 7,945,238 B2 | 5/2011 | Baker et al. |
| 7,945,240 B1 | 5/2011 | Klock et al. |
| 7,945,945 B2 | 5/2011 | Graham et al. |
| 7,948,952 B2 | 5/2011 | Hurtta et al. |
| 7,948,953 B2 | 5/2011 | Melkote et al. |
| 7,948,968 B2 | 5/2011 | Voit et al. |
| 7,949,529 B2 | 5/2011 | Weider et al. |
| 7,953,808 B2 | 5/2011 | Sharp et al. |
| 7,953,877 B2 | 5/2011 | Vemula et al. |
| 7,957,020 B2 | 6/2011 | Mine et al. |
| 7,957,381 B2 | 6/2011 | Clermidy et al. |
| 7,957,511 B2 | 6/2011 | Drudis et al. |
| 7,958,029 B1 | 6/2011 | Bobich et al. |
| 7,962,622 B2 | 6/2011 | Friend et al. |
| 7,965,983 B1 | 6/2011 | Swan et al. |
| 7,969,950 B2 | 6/2011 | Iyer et al. |
| 7,970,350 B2 | 6/2011 | Sheynman et al. |
| 7,970,426 B2 | 6/2011 | Poe et al. |
| 7,974,624 B2 | 7/2011 | Gallagher et al. |
| 7,975,184 B2 | 7/2011 | Goff et al. |
| 7,978,627 B2 | 7/2011 | Taylor et al. |
| 7,984,130 B2 | 7/2011 | Bogineni et al. |
| 7,984,511 B2 | 7/2011 | Kocher et al. |
| 7,986,935 B1 | 7/2011 | D'Souza et al. |
| 7,987,510 B2 | 7/2011 | Kocher et al. |
| 8,000,276 B2 | 8/2011 | Scherzer et al. |
| 8,000,318 B2 | 8/2011 | Wiley et al. |
| 8,005,009 B2 | 8/2011 | McKee et al. |
| 8,005,459 B2 | 8/2011 | Balsillie |
| 8,005,988 B2 | 8/2011 | Maes |
| 8,010,080 B1 | 8/2011 | Thenthiruperai et al. |
| 8,010,081 B1 | 8/2011 | Roskowski |
| 8,015,133 B1 | 9/2011 | Wu et al. |
| 8,015,234 B2 | 9/2011 | Lum et al. |
| 8,019,687 B2 | 9/2011 | Wang et al. |
| 8,019,820 B2 * | 9/2011 | Son et al. ...................... 709/206 |
| 8,019,868 B2 | 9/2011 | Rao et al. |
| 8,019,886 B2 | 9/2011 | Harrang et al. |
| 8,023,425 B2 | 9/2011 | Raleigh |
| 8,024,397 B1 | 9/2011 | Erickson et al. |
| 8,027,339 B2 | 9/2011 | Short et al. |
| 8,031,601 B2 | 10/2011 | Feroz et al. |
| 8,032,409 B1 | 10/2011 | Mikurak |
| 8,032,899 B2 | 10/2011 | Archer et al. |
| 8,036,600 B2 | 10/2011 | Garrett et al. |
| 8,045,973 B2 | 10/2011 | Chambers |
| 8,046,449 B2 | 10/2011 | Yoshiuchi |
| 8,050,275 B1 | 11/2011 | Iyer |
| 8,059,530 B1 | 11/2011 | Cole |
| 8,060,463 B1 | 11/2011 | Spiegel |
| 8,064,896 B2 | 11/2011 | Bell et al. |
| 8,068,824 B2 | 11/2011 | Shan et al. |
| 8,068,829 B2 | 11/2011 | Lemond et al. |
| 8,073,721 B1 | 12/2011 | Lewis |
| 8,078,140 B2 | 12/2011 | Baker et al. |
| 8,078,163 B2 | 12/2011 | Lemond et al. |

(56) References Cited

U.S. PATENT DOCUMENTS

| | | |
|---|---|---|
| 8,086,497 B1 | 12/2011 | Oakes, III |
| 8,090,359 B2 | 1/2012 | Proctor, Jr. et al. |
| 8,090,616 B2 | 1/2012 | Proctor, Jr. et al. |
| 8,094,551 B2 | 1/2012 | Huber et al. |
| 8,095,112 B2 | 1/2012 | Chow et al. |
| 8,095,124 B2 | 1/2012 | Balia |
| 8,095,666 B2 | 1/2012 | Schmidt et al. |
| 8,098,579 B2 | 1/2012 | Ray et al. |
| 8,099,077 B2 | 1/2012 | Chowdhury et al. |
| 8,099,517 B2 | 1/2012 | Jia et al. |
| 8,102,814 B2 | 1/2012 | Rahman et al. |
| 8,108,520 B2 | 1/2012 | Ruutu et al. |
| 8,116,223 B2 | 2/2012 | Tian et al. |
| 8,116,749 B2 | 2/2012 | Proctor, Jr. et al. |
| 8,116,781 B2 | 2/2012 | Chen et al. |
| 8,122,128 B2 | 2/2012 | Burke, II et al. |
| 8,122,249 B2 | 2/2012 | Falk et al. |
| 8,126,123 B2 | 2/2012 | Cai et al. |
| 8,126,396 B2 | 2/2012 | Bennett |
| 8,126,476 B2 | 2/2012 | Vardi et al. |
| 8,126,722 B2 | 2/2012 | Robb et al. |
| 8,130,793 B2 | 3/2012 | Edwards et al. |
| 8,131,256 B2 | 3/2012 | Martti et al. |
| 8,134,954 B2 | 3/2012 | Godfrey et al. |
| 8,135,388 B1 | 3/2012 | Gailloux et al. |
| 8,135,392 B2 | 3/2012 | Marcellino et al. |
| 8,135,657 B2 | 3/2012 | Kapoor et al. |
| 8,144,591 B2 | 3/2012 | Ghai et al. |
| 8,149,823 B2 | 4/2012 | Turcan et al. |
| 8,150,431 B2 | 4/2012 | Wolovitz et al. |
| 8,155,155 B1 * | 4/2012 | Chow et al. .................. 370/485 |
| 8,155,620 B2 | 4/2012 | Wang et al. |
| 8,155,670 B2 | 4/2012 | Fullam et al. |
| 8,156,206 B2 | 4/2012 | Kiley et al. |
| 8,160,015 B2 | 4/2012 | Rashid et al. |
| 8,165,576 B2 | 4/2012 | Raju et al. |
| 8,166,040 B2 | 4/2012 | Brindisi et al. |
| 8,166,554 B2 | 4/2012 | John |
| 8,170,553 B2 | 5/2012 | Bennett |
| 8,174,970 B2 | 5/2012 | Adamczyk et al. |
| 8,175,574 B1 | 5/2012 | Panda et al. |
| 8,180,881 B2 | 5/2012 | Seo et al. |
| 8,184,530 B1 | 5/2012 | Swan et al. |
| 8,184,590 B2 | 5/2012 | Rosenblatt |
| 8,185,088 B2 | 5/2012 | Klein et al. |
| 8,185,093 B2 | 5/2012 | Jheng et al. |
| 8,185,127 B1 | 5/2012 | Cai et al. |
| 8,185,152 B1 | 5/2012 | Goldner |
| 8,185,158 B2 | 5/2012 | Tamura et al. |
| 8,190,675 B2 | 5/2012 | Tribbett |
| 8,191,116 B1 * | 5/2012 | Gazzard ............................ 726/4 |
| 8,191,124 B2 | 5/2012 | Wynn et al. |
| 8,194,549 B2 | 6/2012 | Huber et al. |
| 8,194,553 B2 | 6/2012 | Liang et al. |
| 8,194,572 B2 | 6/2012 | Horvath et al. |
| 8,195,093 B2 | 6/2012 | Garrett et al. |
| 8,195,163 B2 | 6/2012 | Gisby et al. |
| 8,196,199 B2 | 6/2012 | Hrastar et al. |
| 8,200,509 B2 | 6/2012 | Kenedy et al. |
| 8,200,775 B2 | 6/2012 | Moore |
| 8,204,190 B2 | 6/2012 | Bang et al. |
| 8,204,505 B2 | 6/2012 | Jin et al. |
| 8,204,794 B1 | 6/2012 | Peng et al. |
| 8,208,919 B2 | 6/2012 | Kotecha |
| 8,213,296 B2 | 7/2012 | Shannon et al. |
| 8,213,363 B2 | 7/2012 | Ying et al. |
| 8,214,536 B2 | 7/2012 | Zhao |
| 8,224,382 B2 | 7/2012 | Bultman |
| 8,224,773 B2 | 7/2012 | Spiegel |
| 8,228,818 B2 | 7/2012 | Chase et al. |
| 8,229,394 B2 | 7/2012 | Karlberg |
| 8,230,061 B2 | 7/2012 | Hassan et al. |
| 8,233,883 B2 | 7/2012 | De Froment |
| 8,233,895 B2 | 7/2012 | Tysowski |
| 8,238,287 B1 | 8/2012 | Gopi et al. |
| 8,239,520 B2 | 8/2012 | Grah et al. |
| 8,242,959 B2 | 8/2012 | Mia et al. |
| 8,244,241 B2 | 8/2012 | Montemurro |
| 8,254,915 B2 | 8/2012 | Kozisek |
| 8,255,515 B1 | 8/2012 | Melman et al. |
| 8,255,534 B2 | 8/2012 | Assadzadeh |
| 8,255,689 B2 | 8/2012 | Kim et al. |
| 8,264,965 B2 | 9/2012 | Dolganow et al. |
| 8,265,004 B2 | 9/2012 | Toutonghi |
| 8,266,681 B2 | 9/2012 | Deshpande et al. |
| 8,270,972 B2 | 9/2012 | Otting et al. |
| 8,271,045 B2 | 9/2012 | Parolkar et al. |
| 8,271,049 B2 | 9/2012 | Silver et al. |
| 8,271,992 B2 | 9/2012 | Chatley et al. |
| 8,275,415 B2 | 9/2012 | Huslak |
| 8,275,830 B2 | 9/2012 | Raleigh |
| 8,279,067 B2 | 10/2012 | Berger et al. |
| 8,279,864 B2 | 10/2012 | Wood |
| 8,280,351 B1 | 10/2012 | Ahmed et al. |
| 8,280,354 B2 | 10/2012 | Smith et al. |
| 8,284,740 B2 | 10/2012 | O'Connor |
| 8,285,249 B2 | 10/2012 | Baker et al. |
| 8,291,238 B2 | 10/2012 | Ginter et al. |
| 8,296,404 B2 | 10/2012 | McDysan et al. |
| 8,300,575 B2 | 10/2012 | Willars |
| 8,301,513 B1 | 10/2012 | Peng et al. |
| 8,306,518 B1 | 11/2012 | Gailloux |
| 8,307,067 B2 | 11/2012 | Ryan |
| 8,315,593 B2 | 11/2012 | Gallant et al. |
| 8,315,594 B1 | 11/2012 | Mauser et al. |
| 8,315,718 B2 | 11/2012 | Caffrey et al. |
| 8,315,999 B2 | 11/2012 | Chatley et al. |
| 8,320,244 B2 | 11/2012 | Muqattash et al. |
| 8,320,949 B2 | 11/2012 | Matta |
| 8,325,638 B2 | 12/2012 | Jin et al. |
| 8,326,319 B2 | 12/2012 | Davis |
| 8,326,359 B2 | 12/2012 | Kauffman |
| 8,331,293 B2 | 12/2012 | Sood |
| 8,332,375 B2 | 12/2012 | Chatley et al. |
| 8,332,517 B2 | 12/2012 | Russell |
| 8,335,161 B2 | 12/2012 | Foottit et al. |
| 8,340,718 B2 | 12/2012 | Colonna et al. |
| 8,347,362 B2 | 1/2013 | Cai et al. |
| 8,347,378 B2 | 1/2013 | Merkin et al. |
| 8,350,700 B2 | 1/2013 | Fast et al. |
| 8,351,592 B2 | 1/2013 | Freeny, Jr. et al. |
| 8,351,898 B2 | 1/2013 | Raleigh |
| 8,352,360 B2 | 1/2013 | De Judicibus et al. |
| 8,352,630 B2 | 1/2013 | Hart |
| 8,352,980 B2 | 1/2013 | Howcroft |
| 8,353,001 B2 | 1/2013 | Herrod |
| 8,356,336 B2 | 1/2013 | Johnston et al. |
| 8,358,638 B2 | 1/2013 | Scherzer et al. |
| 8,363,658 B1 | 1/2013 | Delker et al. |
| 8,364,089 B2 | 1/2013 | Phillips |
| 8,364,806 B2 | 1/2013 | Short et al. |
| 8,369,274 B2 | 2/2013 | Sawai |
| 8,370,477 B2 | 2/2013 | Short et al. |
| 8,374,090 B2 | 2/2013 | Morrill et al. |
| 8,374,592 B2 | 2/2013 | Proctor, Jr. et al. |
| 8,375,128 B2 | 2/2013 | Tofighbakhsh et al. |
| 8,379,847 B2 | 2/2013 | Bell et al. |
| 8,385,896 B2 | 2/2013 | Proctor, Jr. et al. |
| 8,385,975 B2 | 2/2013 | Forutanpour et al. |
| 8,386,386 B1 | 2/2013 | Zhu |
| 8,391,262 B2 | 3/2013 | Maki et al. |
| 8,391,834 B2 | 3/2013 | Raleigh |
| 8,396,929 B2 | 3/2013 | Helfman et al. |
| 8,402,540 B2 | 3/2013 | Kapoor et al. |
| 8,406,427 B2 | 3/2013 | Chand et al. |
| 8,411,587 B2 | 4/2013 | Curtis et al. |
| 8,411,691 B2 | 4/2013 | Aggarwal |
| 8,422,988 B1 | 4/2013 | Keshav |
| 8,423,016 B2 | 4/2013 | Buckley et al. |
| 8,429,403 B2 | 4/2013 | Moret et al. |
| 8,437,734 B2 | 5/2013 | Ray et al. |
| 8,441,955 B2 | 5/2013 | Wilkinson et al. |
| 8,442,015 B2 | 5/2013 | Behzad et al. |
| 8,447,324 B2 * | 5/2013 | Shuman et al. ............ 455/456.1 |

(56) References Cited

U.S. PATENT DOCUMENTS

| | | |
|---|---|---|
| 8,447,607 B2 | 5/2013 | Weider et al. |
| 8,447,980 B2 | 5/2013 | Godfrey et al. |
| 8,452,858 B2 | 5/2013 | Wu et al. |
| 8,461,958 B2 | 6/2013 | Saenz et al. |
| 8,463,232 B2 | 6/2013 | Tuli et al. |
| 8,468,337 B2 | 6/2013 | Gaur et al. |
| 8,472,371 B1 | 6/2013 | Bari et al. |
| 8,477,778 B2 | 7/2013 | Lehmann, Jr. et al. |
| 8,483,135 B2 | 7/2013 | Cai et al. |
| 8,483,694 B2 | 7/2013 | Lewis et al. |
| 8,484,327 B2 | 7/2013 | Werner et al. |
| 8,489,720 B1 | 7/2013 | Morford et al. |
| 8,495,227 B2 | 7/2013 | Kaminsky et al. |
| 8,495,360 B2 | 7/2013 | Falk et al. |
| 8,495,700 B2 | 7/2013 | Shahbazi |
| 8,504,729 B2 | 8/2013 | Pezzutti |
| 8,509,082 B2 | 8/2013 | Heinz et al. |
| 8,516,552 B2 | 8/2013 | Raleigh |
| 8,520,589 B2 | 8/2013 | Bhatt et al. |
| 8,521,110 B2 | 8/2013 | Rofougaran |
| 8,522,039 B2 | 8/2013 | Hyndman et al. |
| 8,526,329 B2 | 9/2013 | Mahany et al. |
| 8,526,350 B2 | 9/2013 | Xue et al. |
| 8,527,410 B2 | 9/2013 | Markki et al. |
| 8,528,068 B1 | 9/2013 | Weglein et al. |
| 8,539,561 B2 | 9/2013 | Gupta et al. |
| 8,543,265 B2 | 9/2013 | Ekhaguere et al. |
| 8,544,105 B2 | 9/2013 | Mclean et al. |
| 8,548,427 B2 | 10/2013 | Chow et al. |
| 8,548,428 B2 | 10/2013 | Raleigh |
| 8,554,876 B2 | 10/2013 | Winsor |
| 8,561,138 B2 | 10/2013 | Rothman et al. |
| 8,566,236 B2 | 10/2013 | Busch |
| 8,571,474 B2 | 10/2013 | Chavez et al. |
| 8,571,993 B2 | 10/2013 | Kocher et al. |
| 8,572,117 B2 | 10/2013 | Rappaport |
| 8,583,499 B2 | 11/2013 | De Judicibus et al. |
| 8,589,541 B2 | 11/2013 | Raleigh et al. |
| 8,589,955 B2 | 11/2013 | Roundtree et al. |
| 8,601,125 B2 | 12/2013 | Huang et al. |
| 8,605,691 B2 * | 12/2013 | Soomro et al. ............... 370/338 |
| 8,626,115 B2 | 1/2014 | Raleigh et al. |
| 8,635,164 B2 | 1/2014 | Rosenhaft et al. |
| 8,655,357 B1 * | 2/2014 | Gazzard et al. ............. 455/435.1 |
| 8,660,853 B2 | 2/2014 | Robb et al. |
| 8,666,395 B2 | 3/2014 | Silver |
| 2001/0048738 A1 | 12/2001 | Baniak et al. |
| 2001/0053694 A1 | 12/2001 | Igarashi et al. |
| 2002/0022472 A1 | 2/2002 | Watler et al. |
| 2002/0049074 A1 | 4/2002 | Eisinger et al. |
| 2002/0116338 A1 | 8/2002 | Gonthier et al. |
| 2002/0120540 A1 | 8/2002 | Kende et al. |
| 2002/0131404 A1 | 9/2002 | Mehta et al. |
| 2002/0138601 A1 | 9/2002 | Piponius et al. |
| 2002/0161601 A1 | 10/2002 | Nauer et al. |
| 2002/0164983 A1 | 11/2002 | Raviv et al. |
| 2002/0176377 A1 | 11/2002 | Hamilton |
| 2002/0199001 A1 | 12/2002 | Wenocur et al. |
| 2003/0004937 A1 | 1/2003 | Salmenkaita et al. |
| 2003/0005112 A1 | 1/2003 | Krautkremer |
| 2003/0013434 A1 | 1/2003 | Rosenberg et al. |
| 2003/0018524 A1 | 1/2003 | Fishman et al. |
| 2003/0046396 A1 | 3/2003 | Richter |
| 2003/0050070 A1 | 3/2003 | Mashinsky et al. |
| 2003/0050837 A1 | 3/2003 | Kim |
| 2003/0088671 A1 | 5/2003 | Klinker et al. |
| 2003/0133408 A1 | 7/2003 | Cheng et al. |
| 2003/0161265 A1 | 8/2003 | Cao et al. |
| 2003/0171112 A1 | 9/2003 | Lupper et al. |
| 2003/0182420 A1 | 9/2003 | Jones et al. |
| 2003/0182435 A1 | 9/2003 | Redlich et al. |
| 2003/0188006 A1 | 10/2003 | Bard |
| 2003/0188117 A1 | 10/2003 | Yoshino et al. |
| 2003/0220984 A1 | 11/2003 | Jones et al. |
| 2003/0224781 A1 | 12/2003 | Milford et al. |
| 2003/0229900 A1 | 12/2003 | Reisman |
| 2003/0233332 A1 | 12/2003 | Keeler et al. |
| 2003/0236745 A1 | 12/2003 | Hartsell et al. |
| 2004/0019539 A1 | 1/2004 | Raman et al. |
| 2004/0021697 A1 | 2/2004 | Beaton et al. |
| 2004/0030705 A1 | 2/2004 | Bowman-Amuah |
| 2004/0044623 A1 | 3/2004 | Wake et al. |
| 2004/0047358 A1 | 3/2004 | Chen et al. |
| 2004/0073672 A1 | 4/2004 | Fascenda |
| 2004/0082346 A1 | 4/2004 | Skytt et al. |
| 2004/0098715 A1 | 5/2004 | Aghera et al. |
| 2004/0102182 A1 | 5/2004 | Reith et al. |
| 2004/0103193 A1 | 5/2004 | Pandya et al. |
| 2004/0107360 A1 | 6/2004 | Herrmann et al. |
| 2004/0127200 A1 | 7/2004 | Shaw et al. |
| 2004/0132427 A1 | 7/2004 | Lee et al. |
| 2004/0168052 A1 | 8/2004 | Clisham et al. |
| 2004/0170191 A1 | 9/2004 | Guo et al. |
| 2004/0198331 A1 | 10/2004 | Coward et al. |
| 2004/0203755 A1 | 10/2004 | Brunet et al. |
| 2004/0203833 A1 | 10/2004 | Rathunde et al. |
| 2004/0225898 A1 | 11/2004 | Frost et al. |
| 2004/0236547 A1 | 11/2004 | Rappaport et al. |
| 2004/0249918 A1 | 12/2004 | Sunshine |
| 2004/0255145 A1 | 12/2004 | Chow |
| 2005/0007993 A1 | 1/2005 | Chambers et al. |
| 2005/0009499 A1 | 1/2005 | Koster |
| 2005/0021995 A1 | 1/2005 | Lal et al. |
| 2005/0048950 A1 | 3/2005 | Morper |
| 2005/0055291 A1 | 3/2005 | Bevente et al. |
| 2005/0055309 A1 | 3/2005 | Williams et al. |
| 2005/0055595 A1 | 3/2005 | Frazer et al. |
| 2005/0060266 A1 | 3/2005 | DeMello et al. |
| 2005/0079863 A1 | 4/2005 | Macaluso |
| 2005/0097516 A1 | 5/2005 | Donnelly et al. |
| 2005/0107091 A1 | 5/2005 | Vannithamby et al. |
| 2005/0128967 A1 | 6/2005 | Scobbie |
| 2005/0166043 A1 | 7/2005 | Zhang et al. |
| 2005/0183143 A1 | 8/2005 | Anderholm et al. |
| 2005/0186948 A1 | 8/2005 | Gallagher et al. |
| 2005/0198377 A1 | 9/2005 | Ferguson et al. |
| 2005/0216421 A1 | 9/2005 | Barry et al. |
| 2005/0228985 A1 | 10/2005 | Ylikoski et al. |
| 2005/0238046 A1 | 10/2005 | Hassan et al. |
| 2005/0246282 A1 | 11/2005 | Naslund et al. |
| 2005/0250508 A1 | 11/2005 | Guo et al. |
| 2005/0254435 A1 | 11/2005 | Moakley et al. |
| 2005/0266825 A1 | 12/2005 | Clayton |
| 2005/0266880 A1 | 12/2005 | Gupta |
| 2006/0014519 A1 | 1/2006 | Marsh et al. |
| 2006/0019632 A1 | 1/2006 | Cunningham et al. |
| 2006/0026679 A1 | 2/2006 | Zakas |
| 2006/0034256 A1 | 2/2006 | Addagatla et al. |
| 2006/0040642 A1 | 2/2006 | Boris et al. |
| 2006/0045245 A1 | 3/2006 | Aaron et al. |
| 2006/0048223 A1 | 3/2006 | Lee et al. |
| 2006/0068796 A1 | 3/2006 | Millen et al. |
| 2006/0072646 A1 | 4/2006 | Feher et al. |
| 2006/0085543 A1 | 4/2006 | Hrastar et al. |
| 2006/0112016 A1 | 5/2006 | Ishibashi |
| 2006/0114832 A1 | 6/2006 | Hamilton et al. |
| 2006/0135144 A1 | 6/2006 | Jothipragasam |
| 2006/0143098 A1 | 6/2006 | Lazaridis |
| 2006/0156398 A1 | 7/2006 | Ross et al. |
| 2006/0160536 A1 | 7/2006 | Chou |
| 2006/0165060 A1 | 7/2006 | Dua |
| 2006/0168128 A1 | 7/2006 | Sistla et al. |
| 2006/0173959 A1 | 8/2006 | Mckelvie et al. |
| 2006/0174035 A1 | 8/2006 | Tufail |
| 2006/0178918 A1 | 8/2006 | Mikurak |
| 2006/0183462 A1 | 8/2006 | Kolehmainen et al. |
| 2006/0190314 A1 | 8/2006 | Hernandez |
| 2006/0199608 A1 | 9/2006 | Dunn et al. |
| 2006/0206904 A1 | 9/2006 | Watkins et al. |
| 2006/0218395 A1 | 9/2006 | Maes |
| 2006/0233108 A1 | 10/2006 | Krishnan |
| 2006/0233166 A1 | 10/2006 | Bou-Diab et al. |
| 2006/0236095 A1 | 10/2006 | Smith et al. |
| 2006/0242685 A1 | 10/2006 | Heard et al. |

(56) References Cited

U.S. PATENT DOCUMENTS

| | | |
|---|---|---|
| 2006/0258341 A1 | 11/2006 | Miller et al. |
| 2006/0291477 A1 | 12/2006 | Croak et al. |
| 2007/0019670 A1 | 1/2007 | Falardeau |
| 2007/0022289 A1 | 1/2007 | Alt et al. |
| 2007/0025301 A1 | 2/2007 | Petersson et al. |
| 2007/0033194 A1 | 2/2007 | Srinivas et al. |
| 2007/0033197 A1 | 2/2007 | Scherzer et al. |
| 2007/0036312 A1 | 2/2007 | Cai et al. |
| 2007/0055694 A1 | 3/2007 | Ruge et al. |
| 2007/0061243 A1 | 3/2007 | Ramer et al. |
| 2007/0061878 A1 | 3/2007 | Hagiu et al. |
| 2007/0076616 A1 | 4/2007 | Ngo et al. |
| 2007/0093243 A1 | 4/2007 | Kapadekar et al. |
| 2007/0100981 A1 | 5/2007 | Adamczyk et al. |
| 2007/0101426 A1 | 5/2007 | Lee et al. |
| 2007/0104126 A1 | 5/2007 | Calhoun et al. |
| 2007/0109983 A1 | 5/2007 | Shankar et al. |
| 2007/0130315 A1 | 6/2007 | Friend et al. |
| 2007/0140113 A1 | 6/2007 | Gemelos |
| 2007/0140145 A1 | 6/2007 | Kumar et al. |
| 2007/0140275 A1 | 6/2007 | Bowman et al. |
| 2007/0147317 A1 | 6/2007 | Smith et al. |
| 2007/0147324 A1 | 6/2007 | McGary |
| 2007/0155365 A1 | 7/2007 | Kim et al. |
| 2007/0168499 A1 | 7/2007 | Chu |
| 2007/0198656 A1 | 8/2007 | Mazzaferri et al. |
| 2007/0220251 A1 | 9/2007 | Rosenberg et al. |
| 2007/0226225 A1 | 9/2007 | Yiu et al. |
| 2007/0243862 A1 | 10/2007 | Coskun et al. |
| 2007/0248100 A1 | 10/2007 | Zuberi et al. |
| 2007/0254675 A1 | 11/2007 | Zorlu Ozer et al. |
| 2007/0255848 A1 | 11/2007 | Sewall et al. |
| 2007/0259656 A1 | 11/2007 | Jeong |
| 2007/0259673 A1 | 11/2007 | Willars et al. |
| 2007/0263558 A1 | 11/2007 | Salomone |
| 2007/0274327 A1 | 11/2007 | Kaarela et al. |
| 2007/0280453 A1 | 12/2007 | Kelley et al. |
| 2007/0282896 A1 | 12/2007 | Wydroug et al. |
| 2007/0294395 A1 | 12/2007 | Strub et al. |
| 2007/0298764 A1 | 12/2007 | Clayton |
| 2007/0300252 A1 | 12/2007 | Acharya et al. |
| 2008/0005285 A1 | 1/2008 | Robinson et al. |
| 2008/0005561 A1 | 1/2008 | Brown et al. |
| 2008/0010452 A1 | 1/2008 | Holtzman et al. |
| 2008/0022354 A1 | 1/2008 | Grewal et al. |
| 2008/0025230 A1 | 1/2008 | Patel et al. |
| 2008/0039102 A1 | 2/2008 | Sewall et al. |
| 2008/0049630 A1 | 2/2008 | Kozisek et al. |
| 2008/0051076 A1 | 2/2008 | O'Shaughnessy et al. |
| 2008/0052387 A1 | 2/2008 | Heinz et al. |
| 2008/0056273 A1 | 3/2008 | Pelletier et al. |
| 2008/0059474 A1 | 3/2008 | Lim |
| 2008/0059743 A1 | 3/2008 | Bychkov et al. |
| 2008/0060066 A1 | 3/2008 | Wynn et al. |
| 2008/0062900 A1 | 3/2008 | Rao |
| 2008/0064367 A1 | 3/2008 | Nath et al. |
| 2008/0066149 A1 | 3/2008 | Lim |
| 2008/0066150 A1 | 3/2008 | Lim |
| 2008/0070550 A1 | 3/2008 | Hose |
| 2008/0081606 A1 | 4/2008 | Cole |
| 2008/0082643 A1 | 4/2008 | Storrie et al. |
| 2008/0083013 A1 | 4/2008 | Soliman et al. |
| 2008/0085707 A1 | 4/2008 | Fadell |
| 2008/0089295 A1 | 4/2008 | Keeler et al. |
| 2008/0095339 A1 | 4/2008 | Elliott et al. |
| 2008/0098062 A1 | 4/2008 | Balia |
| 2008/0109679 A1 | 5/2008 | Wright et al. |
| 2008/0120129 A1 | 5/2008 | Seubert et al. |
| 2008/0120668 A1 | 5/2008 | Yau |
| 2008/0120688 A1 | 5/2008 | Qiu et al. |
| 2008/0127304 A1 | 5/2008 | Ginter et al. |
| 2008/0130534 A1 | 6/2008 | Tomioka |
| 2008/0130656 A1 | 6/2008 | Kim et al. |
| 2008/0132201 A1 | 6/2008 | Karlberg |
| 2008/0132268 A1 | 6/2008 | Choi-Grogan et al. |
| 2008/0134330 A1 | 6/2008 | Kapoor et al. |
| 2008/0147454 A1 | 6/2008 | Walker et al. |
| 2008/0160958 A1 | 7/2008 | Abichandani et al. |
| 2008/0162637 A1 | 7/2008 | Adamczyk et al. |
| 2008/0162704 A1 | 7/2008 | Poplett et al. |
| 2008/0164304 A1 | 7/2008 | Narasimhan |
| 2008/0167027 A1 | 7/2008 | Gautier et al. |
| 2008/0167033 A1 | 7/2008 | Beckers |
| 2008/0168523 A1 | 7/2008 | Ansari et al. |
| 2008/0177998 A1 | 7/2008 | Apsangi et al. |
| 2008/0183812 A1 | 7/2008 | Paul et al. |
| 2008/0184127 A1 | 7/2008 | Rafey et al. |
| 2008/0189760 A1 | 8/2008 | Rosenberg et al. |
| 2008/0201266 A1 | 8/2008 | Chua et al. |
| 2008/0207167 A1 | 8/2008 | Bugenhagen |
| 2008/0212470 A1 | 9/2008 | Castaneda et al. |
| 2008/0219268 A1 | 9/2008 | Dennison |
| 2008/0221951 A1 | 9/2008 | Stanforth et al. |
| 2008/0222692 A1 | 9/2008 | Andersson et al. |
| 2008/0225748 A1 | 9/2008 | Khemani et al. |
| 2008/0229385 A1 | 9/2008 | Feder et al. |
| 2008/0229388 A1 | 9/2008 | Maes |
| 2008/0235511 A1 | 9/2008 | O'Brien et al. |
| 2008/0240373 A1 | 10/2008 | Wilhelm |
| 2008/0250053 A1 | 10/2008 | Aaltonen et al. |
| 2008/0256593 A1 | 10/2008 | Vinberg |
| 2008/0262798 A1 | 10/2008 | Kim et al. |
| 2008/0263348 A1 | 10/2008 | Zaltsman et al. |
| 2008/0268813 A1 | 10/2008 | Maes |
| 2008/0270212 A1 | 10/2008 | Blight et al. |
| 2008/0298230 A1 | 12/2008 | Luft et al. |
| 2008/0305793 A1 | 12/2008 | Gallagher et al. |
| 2008/0311885 A1 | 12/2008 | Dawson et al. |
| 2008/0313315 A1 | 12/2008 | Karaoguz et al. |
| 2008/0313730 A1 | 12/2008 | Iftimie et al. |
| 2008/0316923 A1 | 12/2008 | Fedders et al. |
| 2008/0318547 A1 | 12/2008 | Ballou et al. |
| 2008/0318550 A1 | 12/2008 | Deatley |
| 2008/0319879 A1 | 12/2008 | Carroll et al. |
| 2009/0005000 A1 | 1/2009 | Baker et al. |
| 2009/0005005 A1 | 1/2009 | Forstall et al. |
| 2009/0006116 A1 | 1/2009 | Baker et al. |
| 2009/0006200 A1 | 1/2009 | Baker et al. |
| 2009/0013157 A1 | 1/2009 | Beaule |
| 2009/0046723 A1 | 2/2009 | Rahman et al. |
| 2009/0054030 A1 | 2/2009 | Golds |
| 2009/0067372 A1 | 3/2009 | Shah et al. |
| 2009/0068984 A1 | 3/2009 | Burnett |
| 2009/0077622 A1 | 3/2009 | Baum et al. |
| 2009/0079699 A1 | 3/2009 | Sun |
| 2009/0113514 A1 | 4/2009 | Hu |
| 2009/0125619 A1 | 5/2009 | Antani |
| 2009/0157792 A1 | 6/2009 | Fiatal |
| 2009/0172077 A1 | 7/2009 | Roxburgh et al. |
| 2009/0180391 A1 | 7/2009 | Petersen et al. |
| 2009/0197585 A1 | 8/2009 | Aaron |
| 2009/0219170 A1 | 9/2009 | Clark et al. |
| 2009/0248883 A1 | 10/2009 | Suryanarayana et al. |
| 2009/0257379 A1 | 10/2009 | Robinson et al. |
| 2009/0271514 A1 | 10/2009 | Thomas et al. |
| 2009/0282127 A1 | 11/2009 | Leblanc et al. |
| 2009/0286507 A1 | 11/2009 | O'Neil et al. |
| 2009/0287921 A1 | 11/2009 | Zhu et al. |
| 2009/0288140 A1 | 11/2009 | Huber et al. |
| 2009/0299857 A1 | 12/2009 | Brubaker |
| 2009/0307746 A1 | 12/2009 | Di et al. |
| 2009/0315735 A1 | 12/2009 | Bhavani et al. |
| 2009/0326636 A1* | 12/2009 | Hashimoto et al. .......... 623/1.15 |
| 2010/0017506 A1 | 1/2010 | Fadell |
| 2010/0020822 A1 | 1/2010 | Zerillo et al. |
| 2010/0027469 A1 | 2/2010 | Gurajala et al. |
| 2010/0027559 A1 | 2/2010 | Lin et al. |
| 2010/0030890 A1 | 2/2010 | Dutta et al. |
| 2010/0041364 A1 | 2/2010 | Lott et al. |
| 2010/0042675 A1 | 2/2010 | Fujii |
| 2010/0043068 A1 | 2/2010 | Varadhan et al. |
| 2010/0071053 A1 | 3/2010 | Ansari et al. |
| 2010/0080202 A1 | 4/2010 | Hanson |
| 2010/0082431 A1 | 4/2010 | Ramer et al. |

(56) References Cited

U.S. PATENT DOCUMENTS

| | | |
|---|---|---|
| 2010/0103820 A1 | 4/2010 | Fuller et al. |
| 2010/0131584 A1 | 5/2010 | Johnson |
| 2010/0144310 A1 | 6/2010 | Bedingfield, Sr. et al. |
| 2010/0153781 A1 | 6/2010 | Hanna |
| 2010/0167696 A1 | 7/2010 | Smith et al. |
| 2010/0188975 A1 | 7/2010 | Raleigh |
| 2010/0188990 A1 | 7/2010 | Raleigh |
| 2010/0188992 A1 | 7/2010 | Raleigh |
| 2010/0188994 A1 | 7/2010 | Raleigh |
| 2010/0191576 A1 | 7/2010 | Raleigh |
| 2010/0191612 A1 | 7/2010 | Raleigh |
| 2010/0191846 A1 | 7/2010 | Raleigh |
| 2010/0192170 A1 | 7/2010 | Raleigh |
| 2010/0192212 A1 | 7/2010 | Raleigh |
| 2010/0195503 A1 | 8/2010 | Raleigh |
| 2010/0197268 A1 | 8/2010 | Raleigh et al. |
| 2010/0198698 A1 | 8/2010 | Raleigh et al. |
| 2010/0198939 A1 | 8/2010 | Raleigh et al. |
| 2010/0227632 A1 | 9/2010 | Bell et al. |
| 2010/0241544 A1 | 9/2010 | Benson et al. |
| 2010/0284327 A1 | 11/2010 | Miklos |
| 2010/0325420 A1 | 12/2010 | Kanekar |
| 2011/0013569 A1 | 1/2011 | Scherzer et al. |
| 2011/0019574 A1 | 1/2011 | Malomsoky et al. |
| 2011/0081881 A1 | 4/2011 | Baker et al. |
| 2011/0082790 A1 | 4/2011 | Baker et al. |
| 2011/0110309 A1 | 5/2011 | Bennett |
| 2011/0126141 A1 | 5/2011 | King et al. |
| 2011/0159818 A1 | 6/2011 | Scherzer et al. |
| 2011/0173678 A1 | 7/2011 | Kaippallimalil et al. |
| 2011/0195700 A1 | 8/2011 | Kukuchka et al. |
| 2011/0238545 A1 | 9/2011 | Fanaian et al. |
| 2011/0241624 A1 | 10/2011 | Park et al. |
| 2011/0264923 A1 | 10/2011 | Kocher et al. |
| 2012/0020296 A1 | 1/2012 | Scherzer et al. |
| 2012/0029718 A1 | 2/2012 | Davis |
| 2012/0155296 A1 | 6/2012 | Kashanian |
| 2012/0196644 A1 | 8/2012 | Scherzer et al. |
| 2012/0238287 A1 | 9/2012 | Scherzer |
| 2012/0330792 A1 | 12/2012 | Kashanian |
| 2013/0024914 A1 | 1/2013 | Ahmed et al. |
| 2013/0029653 A1 | 1/2013 | Baker et al. |
| 2013/0030960 A1 | 1/2013 | Kashanian |
| 2013/0058274 A1 | 3/2013 | Scherzer et al. |
| 2013/0065555 A1 | 3/2013 | Baker et al. |
| 2013/0084835 A1 | 4/2013 | Scherzer et al. |
| 2013/0095787 A1 | 4/2013 | Kashanian |
| 2013/0117140 A1 | 5/2013 | Kashanian |
| 2013/0144789 A1 | 6/2013 | Aaltonen et al. |

FOREIGN PATENT DOCUMENTS

| | | |
|---|---|---|
| CN | 101035308 A | 3/2006 |
| CN | 1802839 A | 7/2006 |
| CN | 1889777 A | 7/2006 |
| CN | 101155343 A | 9/2006 |
| CN | 1937511 A | 3/2007 |
| CN | 101123553 A | 9/2007 |
| CN | 101115248 A | 1/2008 |
| CN | 101341764 A | 1/2009 |
| EP | 1463238 A1 | 9/2004 |
| EP | 1739518 A1 | 1/2007 |
| EP | 1772988 A1 | 4/2007 |
| EP | 1978772 A1 | 10/2008 |
| EP | 2466831 A1 | 6/2012 |
| WO | 9858505 | 12/1998 |
| WO | 9927723 A1 | 6/1999 |
| WO | WO 99/65185 A3 | 12/1999 |
| WO | WO 03/014891 A2 | 2/2003 |
| WO | WO 03/058880 A1 | 7/2003 |
| WO | WO 2004/028070 A1 | 4/2004 |
| WO | 2004064306 | 7/2004 |
| WO | WO 2004/077797 A2 | 9/2004 |
| WO | WO 2004/095753 A2 | 11/2004 |
| WO | 2005008995 | 1/2005 |
| WO | WO 2006/004467 A1 | 1/2006 |
| WO | WO 2006/050758 A1 | 5/2006 |
| WO | WO 2006/073837 A2 | 7/2006 |
| WO | WO 2006/077481 A1 | 7/2006 |
| WO | 2006120558 A1 | 11/2006 |
| WO | WO 2006/130960 A1 | 12/2006 |
| WO | WO 2007/001833 A2 | 1/2007 |
| WO | WO 2007/014630 A1 | 2/2007 |
| WO | WO 2007/018363 A1 | 2/2007 |
| WO | WO 2007/053848 A1 | 5/2007 |
| WO | 2007068288 | 6/2007 |
| WO | WO 2007/069245 A2 | 6/2007 |
| WO | 2007097786 A | 8/2007 |
| WO | WO 2007/107701 A2 | 9/2007 |
| WO | 2007124279 | 11/2007 |
| WO | 2007133844 A | 11/2007 |
| WO | WO 2008/017837 A1 | 2/2008 |
| WO | WO 2008/051379 A2 | 5/2008 |
| WO | WO 2008/066419 A1 | 6/2008 |
| WO | WO 2008/080139 A1 | 7/2008 |
| WO | WO 2008/080430 A1 | 7/2008 |
| WO | WO 2008/099802 A1 | 8/2008 |
| WO | WO 2010/088413 A1 | 8/2010 |

OTHER PUBLICATIONS

Author Unknown, 3GPP TS 23.401, V8.4.0, 3rd Generation Partnership Project; Technical Specification Group Services and System Aspects; General Packer Radio Service (GPRS) Enhancements for Evolved Universal Terrestrial Radio Access Network (E-UTRAN) Access (Release 8), Dec. 2008.
Author Unknown, "Overview of GSM, GPRS, and UMTS," Chapter 2, Nov. 4, 2008.
Author Unknown, Hewlett-Packard, "IP Multimedia Services Charging," a White Paper from HP, Jan. 2006.
Author Unknown, Kindle ™ User's Guide 3rd Edition, Copyright 2004-2009.
No author/date indicated. "Data Roaming Tariffs—Transparency Measures." Obtained from EUROPA—Europe's Information Society Thematic Portal website, Jun. 24, 2011: "http://ec.europa.eu/information_society/activities/roaming/data/measures/index_en.htm.".
Alonistioti et al., "Intelligent Architectures Enabling Flexible Service Provision and Adaptability," 2002.
Chandrasekhar et al., "Femtocell Networks: A Survey," Jun. 28, 2008.
Chaouchi et al., "Policy Based Networking in the Integration Effort of 4G Networks and Services," 2004 IEEE.
Dikaiakos et al., "A Distributed Middleware Infrastructure for Personalized Services," Nov. 24, 2003.
Farooq et al., "An IEEE 802.16 WiMax Module for the NS-3 Simulator," Mar. 2-6, 2009.
Han et al., "Information Collection Services for Qos-Aware Mobile Applications," 2005.
Hartmann et al., "Agent-Based Banking Transactions & Information Retrieval—What About Performance Issues?" 1999.
Hossain et al., "Gain-Based Selection of Ambient Media Services in Pervasive Environments," Mobile Networks and Applications. Oct. 3, 2008.
Li, Yu, "Dedicated E-Reading Device: The State of the Art and the Challenges," Scroll, vol. 1, No. 1, 2008.
Knight et al., "Layer 2 and 3 Virtual Private Networks: Taxonomy, Technology, and Standardization Efforts," IEEE Communications Magazine, Jun. 2004.
Koutsopoulou et al., "Middleware Platform for the Support of Charging Reconfiguration Actions," 2005.
Kyriakakos et al., "Ubiquitous Service Provision in Next Generation Mobile Networks," Proceedings of the 13th IST Mobile and Wireless Communications Summit, Lyon, France, Jun. 2004.
Nilsson et al., "A Novel MAC Scheme for Solving the QoS Parameter Adjustment Problem in IEEE802.11e EDCA," Feb. 2006.
Oppliger, Rolf, "Internet Security: Firewalls and Bey," Communications of the Acm, May 1997, vol. 40. No. 5.

(56) References Cited

OTHER PUBLICATIONS

Rao et al., "Evolution of Mobile Location-Based Services," Communication of the ACM, Dec. 2003.
Steglich, Stephan, "I-Centric User Interaction," Nov. 21, 2003.
Van Eijk, et al., "GigaMobile, Agent Technology for Designing Personalized Mobile Service Brokerage," Jul. 1, 2002.
Zhu et al., "A Survey of Quality of Service in IEEE 802.11 Networks," IEEE Wireless Communications, Aug. 2004.
Search Report and Written Opinion mailed Jan. 17, 2012 from International U.S. Appl. No. PCT/US2011/001683 filed Sep. 28, 2011.
Search Report and Written Opinion mailed Jan. 30, 2012 from International U.S. Appl. No. PCT/US2011/053797 filed Sep. 28, 2011.
Accuris Networks, "The Business Value of Mobile Data Offload—a White Paper", 2010.
Anton, B. et al., "Best Current Practices for Wireless Internet Service Provider (WISP) Roaming"; Release Date Feb. 2003, Version 1.0; Wi-Fi Alliance—Wireless ISP Roaming (WISPr).
Ruckus Wireless—White Paper; "Smarter Wi-Fi for Mobile Operator Infrastructures" 2010.
Thurston, Richard, "WISPr 2.0 Boosts Roaming Between 3G and Wi-Fi"; Jun. 23, 2010; Web page from zdnet.com; Zdnet.com/wispr-2-0-boosts-roaming-between-3g-and-wi-fi-3040089325/.
Wireless Broadband Alliance, "WISPr 2.0, Apr. 8, 2010"; Doc. Ref. No. WBA/RM/WISPr, Version 01.00.
"The Construction of Intelligent Residential District in Use of Cable Television Network," Shandong Science, vol. 13, No. 2, Jun. 2000.
VerizonWireless.com news, "Verizon Wireless Adds to Portfolio of Cosumer-Friendly Tools With Introduction of Usage Controls, Usage Controls and Chaperone 2.0 Offer Parents Full Family Security Solution," Aug. 18, 2008.
"Communication Concepts for Mobile Agent Systems," by Joachim Baumann et al.; Inst. of Parallel and Distributed High-Performance Systems, Univ. of Stuttgart, Germany, pp. 123-135, 1997.
"End to End QoS Solution for Real-time Multimedia Application:" Computer Engineering and Applications, 2007, 43 (4): 155-159, by Tan Zu-guo, Wang Wen-juan; Information and Science School, Zhanjian Normal College, Zhan jiang, Guangdong 524048, China.
"ASA/PIX: Allow Split Tunneling for VPN Clients on the ASA Configuration Example," Document ID 70917, Jan. 10, 2008.

\* cited by examiner

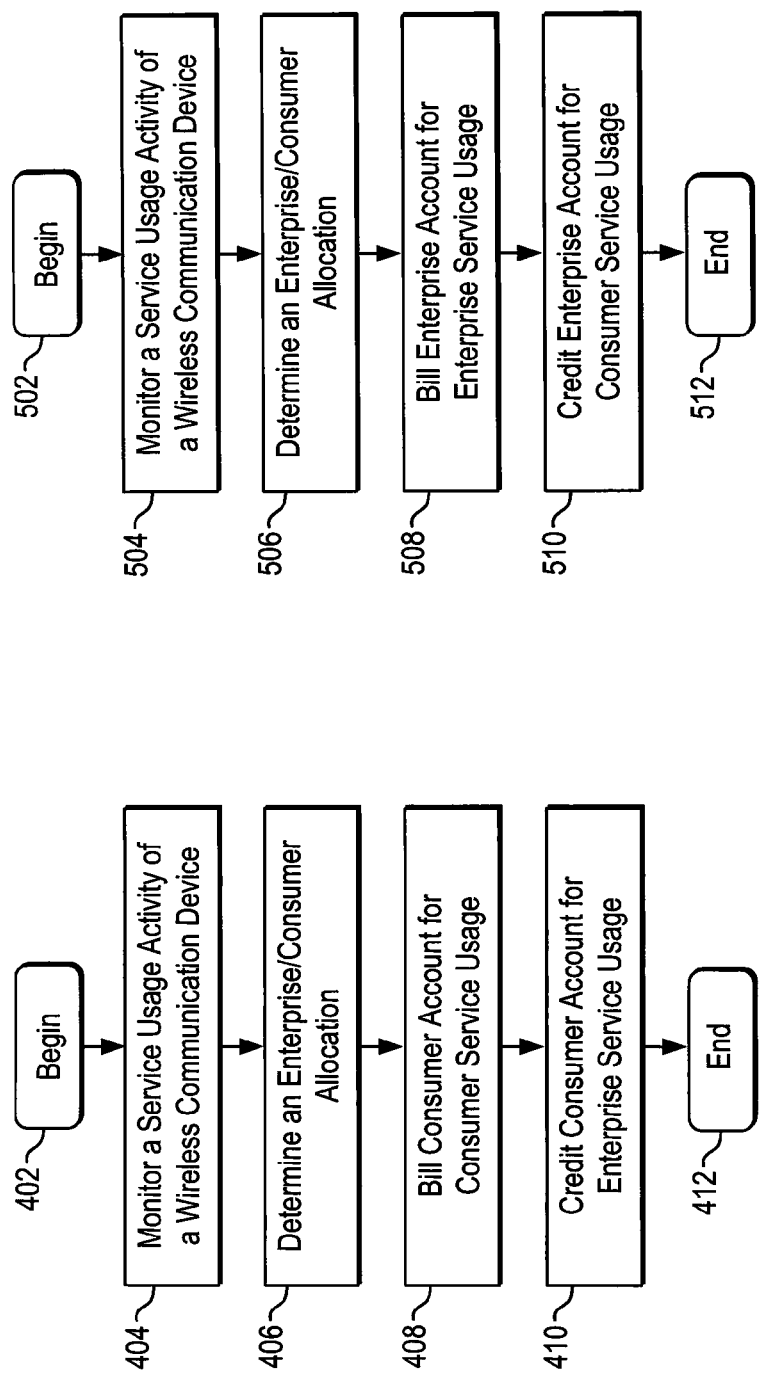

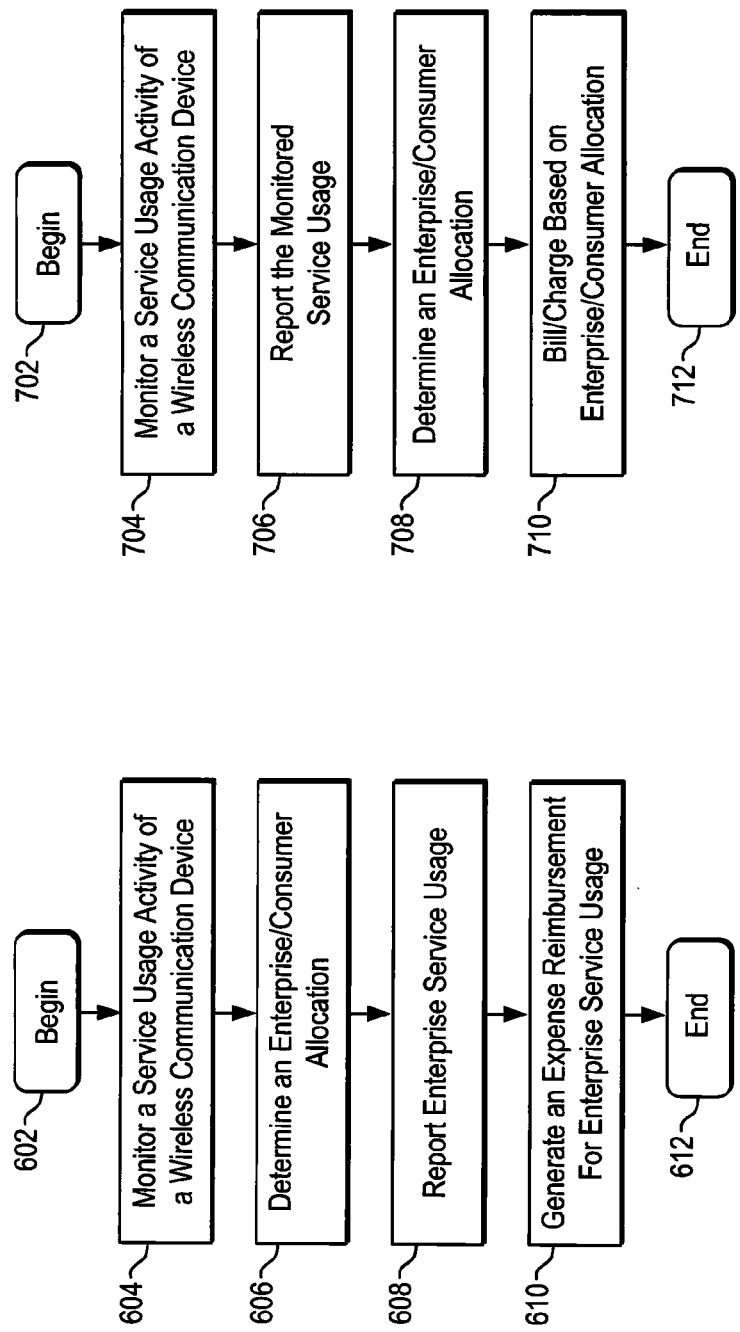

ENTERPRISE ACCESS CONTROL AND ACCOUNTING ALLOCATION FOR ACCESS NETWORKS

CROSS REFERENCE TO OTHER APPLICATIONS

This application is a continuation-in-part of the following U.S. non-provisional patent applications: U.S. application Ser. No. 12/380,759, filed Mar. 2, 2009, entitled VERIFIABLE DEVICE ASSISTED SERVICE POLICY IMPLEMENTATION, now U.S. Pat. No. 8,270,310 (issued on Sep. 18, 2012); U.S. application Ser. No. 12/380,779, filed Mar. 2, 2009, entitled DEVICE ASSISTED SERVICE PROFILE MANAGEMENT WITH USER PREFERENCE, ADAPTIVE POLICY, NETWORK NEUTRALITY, AND USER PRIVACY; U.S. application Ser. No. 12/380,758, filed Mar. 2, 2009, entitled VERIFIABLE DEVICE ASSISTED SERVICE USAGE MONITORING WITH REPORTING, SYNCHRONIZATION, AND NOTIFICATION; U.S. application Ser. No. 12/380,778, filed Mar. 2, 2009, entitled VERIFIABLE DEVICE ASSISTED SERVICE USAGE BILLING WITH INTEGRATED ACCOUNTING, MEDIATION ACCOUNTING, AND MULTI-ACCOUNT, now U.S. Pat. No. 8,321,526 (issued on Nov. 27, 2012); U.S. application Ser. No. 12/380,768, filed Mar. 2, 2009, entitled NETWORK BASED SERVICE POLICY IMPLEMENTATION WITH NETWORK NEUTRALITY AND USER PRIVACY; U.S. application Ser. No. 12/380,767, filed Mar. 2, 2009, entitled NETWORK BASED SERVICE PROFILE MANAGEMENT WITH USER PREFERENCE, ADAPTIVE POLICY, NETWORK NEUTRALITY AND USER PRIVACY, now U.S. Pat. No. 8,355,337 (issued on Jan. 15, 2013); U.S. application Ser. No. 12/380,780, filed Mar. 2, 2009, entitled AUTOMATED DEVICE PROVISIONING AND ACTIVATION; U.S. application Ser. No. 12/380,755, filed Mar. 2, 2009, entitled DEVICE ASSISTED AMBIENT SERVICES, now U.S. Pat. No. 8,331,901 (issued Dec. 11, 2012); U.S. application Ser. No. 12/380,756, filed Mar. 2, 2009, entitled NETWORK BASED AMBIENT SERVICES, now U.S. Pat. No. 8,250,207 (issued Aug. 21, 2012); U.S. application Ser. No. 12/380,770, filed Mar. 2, 2009, entitled NETWORK TOOLS FOR ANALYSIS, DESIGN, TESTING, AND PRODUCTION OF SERVICES, now abandoned; U.S. application Ser. No. 12/380,772, filed Mar. 2, 2009, entitled ROAMING SERVICES NETWORK AND OVERLAY NETWORKS; U.S. application Ser. No. 12/380,782, filed Mar. 2, 2009, entitled OPEN DEVELOPMENT SYSTEM FOR ACCESS SERVICE PROVIDERS, now U.S. Pat. No. 8,270,952 (issued Sep. 18, 2012); U.S. application Ser. No. 12/380,783, filed Mar. 2, 2009, entitled VIRTUAL SERVICE PROVIDER SYSTEMS; U.S. application Ser. No. 12/380,757, filed Mar. 2, 2009, entitled SERVICE ACTIVATION TRACKING SYSTEM, now U.S. Pat. No. 8,326,958 (issued Dec. 4, 2012); U.S. application Ser. No. 12/380,781, filed Mar. 2, 2009, entitled OPEN TRANSACTION CENTRAL BILLING SYSTEM, now U.S. Pat. No. 8,229,812 (issued Jul. 24, 2012); U.S. application Ser. No. 12/380,774, filed Mar. 2, 2009, entitled VERIFIABLE AND ACCURATE SERVICE USAGE MONITORING FOR INTERMEDIATE NETWORKING DEVICES; U.S. application Ser. No. 12/380,773, filed Mar. 2, 2009, entitled VERIFIABLE SERVICE POLICY IMPLEMENTATION FOR INTERMEDIATE NETWORKING DEVICES; U.S. application Ser. No. 12/380,769, filed Mar. 2, 2009, entitled SERVICE PROFILE MANAGEMENT WITH USER PREFERENCE, ADAPTIVE POLICY, NETWORK NEUTRALITY AND USER PRIVACY FOR INTERMEDIATE NETWORKING DEVICES; U.S. application Ser. No. 12/380,777, filed Mar. 2, 2009, entitled SIMPLIFIED SERVICE NETWORK ARCHITECTURE, each of which claims the benefit of U.S. Provisional Application Nos. 61/206,354, filed Jan. 28, 2009, entitled SERVICES POLICY COMMUNICATION SYSTEM AND METHOD; 61/206,944, filed Feb. 4, 2009, entitled SERVICES POLICY COMMUNICATION SYSTEM AND METHOD; 61/207,393, filed Feb. 10, 2009, entitled SERVICES POLICY COMMUNICATION SYSTEM AND METHOD; and 61/207,739, entitled SERVICES POLICY COMMUNICATION SYSTEM AND METHOD, filed Feb. 13, 2009.

This application is also a continuation-in-part of U.S. application Ser. No. 12/695,019, filed Jan. 27, 2010, entitled DEVICE ASSISTED CDR CREATION, AGGREGATION, MEDIATION AND BILLING, now U.S. Pat. No. 8,275,830 (issued Sep. 25, 2012), which is a continuation-in-part of above-referenced U.S. application Ser. No. 12/380,778, filed Mar. 2, 2009, and is also a continuation-in-part of U.S. application Ser. No. 12/380,771, filed Mar. 2, 2009, entitled VERIFIABLE SERVICE BILLING FOR INTERMEDIATE NETWORKING DEVICES, now U.S. Pat. No. 8,023,425 (issued Sep. 20, 2011), and which claims the benefit of U.S. Provisional Application Nos. 61/206,354, filed Jan. 28, 2009; 61/206,944, filed Feb. 4, 2009; 61/207,393, filed Feb. 10, 2009; 61/207,739, filed Feb. 13, 2009; 61/270,353, filed Jul. 6, 2009, entitled DEVICE ASSISTED CDR CREATION, AGGREGATION, MEDIATION AND BILLING; and 61/264,126, filed Nov. 24, 2009, entitled DEVICE ASSISTED SERVICES ACTIVITY MAP. Above-referenced U.S. application Ser. No. 12/380,771, filed Mar. 2, 2009, claims the benefit of U.S. Provisional Application Nos. 61/206,354, filed Jan. 28, 2009, 61/206,944, filed Feb. 4, 2009, 61/207,393, filed Feb. 10, 2009, and 61/207,739, filed Feb. 13, 2009.

This application is also a continuation-in-part of U.S. application Ser. No. 12/695,020, filed Jan. 27, 2010, entitled ADAPTIVE AMBIENT SERVICES, now U.S. Pat. No. 8,406,748 (issued on Mar. 26, 2013), which is a continuation-in-part of above-referenced U.S. application Ser. No. 12/380,780, filed Mar. 2, 2009, and which claims the benefit of U.S. Provisional Application Nos. 61/206,354, filed Jan. 28, 2009; 61/206,944, filed Feb. 4, 2009; 61/207,393, filed Feb. 10, 2009; 61/207,739, filed Feb. 13, 2009; 61/275,208, filed Aug. 25, 2009, entitled ADAPTIVE AMBIENT SERVICES; and 61/237,753, filed Aug. 28, 2009, entitled ADAPTIVE AMBIENT SERVICES.

This application is also a continuation-in-part of U.S. application Ser. No. 12/694,445, filed Jan. 27, 2010, entitled SECURITY TECHNIQUES FOR DEVICE ASSISTED SERVICES, now U.S. Pat. No. 8,391,834 (issued Mar. 5, 2013), which is a continuation-in-part of above-referenced U.S. application Ser. No. 12/380,780, filed Mar. 2, 2009, and which claims the benefit of U.S. Provisional Application Nos. 61/206,354, filed Jan. 28, 2009; 61/206,944, filed Feb. 4, 2009; 61/207,393, filed Feb. 10, 2009; 61/207,739, filed Feb. 13, 2009; and 61/252,151, filed Oct. 15, 2009, entitled SECURITY TECHNIQUES FOR DEVICE ASSISTED SERVICES.

This application is also a continuation-in-part of U.S. application Ser. No. 12/694,451, filed Jan. 27, 2010, entitled DEVICE GROUP PARTITIONS AND SETTLEMENT PLATFORM, which is a continuation-in-part of above-referenced U.S. application Ser. No. 12/380,780, filed Mar. 2, 2009, and which claims the benefit of U.S. Provisional Application Nos. 61/206,354, filed Jan. 28, 2009; 61/206,944, filed Feb. 4, 2009; 61/207,393, filed Feb. 10, 2009; 61/207,739, filed Feb. 13, 2009; 61/270,353, filed Jul. 6, 2009; and 61/252,153, filed Oct. 15, 2009, entitled DEVICE GROUP PARTITIONS AND SETTLEMENT PLATFORM.

This application is also a continuation-in-part of U.S. application Ser. No. 12/694,455, filed Jan. 27, 2010, entitled DEVICE ASSISTED SERVICES INSTALL, now U.S. Pat. No. 8,402,111 (issued on Mar. 19, 2013), which is a continuation-in-part of above-referenced U.S. application Ser. No. 12/380,780, filed Mar. 2, 2009, and which claims the benefit of U.S. Provisional Application Nos. 61/206,354, filed Jan. 28, 2009; 61/206,944, filed Feb. 4, 2009; 61/207,393, filed Feb. 10, 2009; 61/207,739, filed Feb. 13, 2009; and 61/264,120, filed Nov. 24, 2009, entitled DEVICE ASSISTED SERVICES INSTALL.

This application is also a continuation-in-part of U.S. application Ser. No. 12/695,021, filed Jan. 27, 2010, entitled QUALITY OF SERVICE FOR DEVICE ASSISTED SERVICES, now U.S. Pat. No. 8,346,225 (issued Jan. 1, 2013), which is a continuation-in-part of above-referenced U.S. application Ser. No. 12/380,780, filed Mar. 2, 2009, and which claims the benefit of U.S. Provisional Application Nos. 61/206,354, filed Jan. 28, 2009; 61/206,944, filed Feb. 4, 2009; 61/207,393, filed Feb. 10, 2009; 61/207,739, filed Feb. 13, 2009; 61/252,151, filed Oct. 15, 2009; and 61/252,153, filed Oct. 15, 2009.

This application is also a continuation-in-part of U.S. application Ser. No. 12/695,980, filed Jan. 28, 2010, entitled ENHANCED ROAMING SERVICES AND CONVERGED CARRIER NETWORKS WITH DEVICE ASSISTED SERVICES AND A PROXY, now U.S. Pat. No. 8,340,634 (issued Dec. 25, 2012 ), which is a continuation-in-part of above-referenced U.S. application Ser. No. 12/380,780, filed Mar. 2, 2009; Ser. No. 12/695,019, filed Jan. 27, 2010; and Ser. No. 12/695,021, filed Jan. 27, 2010, and which claims the benefit of U.S. Provisional Application Nos. 61/206,354, filed Jan. 28, 2009; 61/206,944, filed Feb. 4, 2009; 61/207,393, filed Feb. 10, 2009; 61/207,739, filed Feb. 13, 2009; and 61/270,353, filed Jul. 6, 2009.

This application is also a continuation-in-part of U.S. application Ser. No. 13/134,005, filed May 25, 2011, entitled SYSTEM AND METHOD FOR WIRELESS NETWORK OFFLOADING, which is a continuation-in-part of above-referenced U.S. application Ser. No. 12/380,759, filed Mar. 2, 2009; Ser. No. 12/380,779, filed Mar. 2, 2009; Ser. No. 12/380,758, filed Mar. 2, 2009; Ser. No. 12/380,778, filed Mar. 2, 2009; Ser. No. 12/380,768, filed Mar. 2, 2009; Ser. No. 12/380,767, filed Mar. 2, 2009; Ser. No. 12/380,780, filed Mar. 2, 2009; Ser. No. 12/380,755, filed Mar. 2, 2009; Ser. No. 12/380,756, filed Mar. 2, 2009; Ser. No. 12/380,770, filed Mar. 2, 2009; Ser. No. 12/380,772, filed Mar. 2, 2009; Ser. No. 12/380,782, filed Mar. 2, 2009; Ser. No. 12/380,783, filed Mar. 2, 2009; Ser. No. 12/380,757, filed Mar. 2, 2009; Ser. No. 12/380,781, filed Mar. 2, 2009; Ser. No. 12/380,774, filed Mar. 2, 2009; Ser. No. 12/380,771, filed Mar. 2, 2009; Ser. No. 12/380,773, filed Mar. 2, 2009; Ser. No. 12/380,769, filed Mar. 2, 2009; Ser. No. 12/380,777, filed Mar. 2, 2009; Ser. No. 12/695,019, filed Jan. 27, 2010; Ser. No. 12/695,020, filed Jan. 27, 2010; Ser. No. 12/694,445, filed Jan. 27, 2010; Ser. No. 12/694,451, filed Jan. 27, 2010; Ser. No. 12/694,455, filed Jan. 27, 2010; Ser. No. 12/695,021, filed Jan. 27, 2010; and Ser. No. 12/695,980, filed Jan. 28, 2010, and which claims the benefit of U.S. Provisional Application Nos. 61/348,022, filed May 25, 2010, entitled DEVICE ASSISTED SERVICES FOR PROTECTING NETWORK CAPACITY; 61/381,159, filed Sep. 9, 2010, entitled DEVICE ASSISTED SERVICES FOR PROTECTING NETWORK CAPACITY; 61/381,162, filed Sep. 9, 2010, entitled SERVICE CONTROLLER INTERFACES AND WORKFLOWS; 61/384,456, filed Sep. 20, 2010, entitled SECURING SERVICE PROCESSOR WITH SPONSORED SIMS; 61/389,547, filed Oct. 4, 2010, entitled USER NOTIFICATIONS FOR DEVICE ASSISTED SERVICES; 61/385,020, filed Sep. 21, 2010, entitled SERVICE USAGE RECONCILIATION SYSTEM OVERVIEW; 61/387,243, filed Sep. 28, 2010, entitled ENTERPRISE AND CONSUMER BILLING ALLOCATION FOR WIRELESS COMMUNICATION DEVICE SERVICE USAGE ACTIVITIES; 61/387,247, filed Sep. 28, 2010 entitled SECURED DEVICE DATA RECORDS; 61/407,358, filed Oct. 27, 2010, entitled SERVICE CONTROLLER AND SERVICE PROCESSOR ARCHITECTURE; 61/418,507, filed Dec. 1, 2010, entitled APPLICATION SERVICE PROVIDER INTERFACE SYSTEM; 61/418,509, filed Dec. 1, 2010, entitled SERVICE USAGE REPORTING RECONCILIATION AND FRAUD DETECTION FOR DEVICE ASSISTED SERVICES; 61/420,727, filed Dec. 7, 2010, entitled SECURE DEVICE DATA RECORDS; 61/422,565, filed Dec. 13, 2010, entitled SERVICE DESIGN CENTER FOR DEVICE ASSISTED SERVICES; 61/422,572, filed Dec. 13, 2010, entitled SYSTEM INTERFACES AND WORKFLOWS FOR DEVICE ASSISTED SERVICES; 61/422,574, filed Dec. 13, 2010, entitled SECURITY AND FRAUD DETECTION FOR DEVICE ASSISTED SERVICES; 61/435,564, filed Jan. 24, 2011, entitled FRAMEWORK FOR DEVICE ASSISTED SERVICES; and 61/472,606, filed Apr. 6, 2011, entitled MANAGING SERVICE USER DISCOVERY AND SERVICE LAUNCH OBJECT PLACEMENT ON A DEVICE.

This application is also a continuation-in-part of U.S. application Ser. No. 13/134,028, filed May 25, 2011, entitled DEVICE-ASSISTED SERVICES FOR PROTECTING NETWORK CAPACITY, which is a continuation-in-part of above-referenced U.S. application Ser. No. 12/380,759, filed Mar. 2, 2009; Ser. No. 12/380,779, filed Mar. 2, 2009; Ser. No. 12/380,758, filed Mar. 2, 2009; Ser. No. 12/380,778, filed Mar. 2, 2009; Ser. No. 12/380,768, filed Mar. 2, 2009; Ser. No. 12/380,767, filed Mar. 2, 2009; Ser. No. 12/380,780, filed Mar. 2, 2009; Ser. No. 12/380,755, filed Mar. 2, 2009; Ser. No. 12/380,756, filed Mar. 2, 2009; Ser. No. 12/380,770, filed Mar. 2, 2009; Ser. No. 12/380,772, filed Mar. 2, 2009; Ser. No. 12/380,782, filed Mar. 2, 2009; Ser. No. 12/380,783, filed Mar. 2, 2009; Ser. No. 12/380,757, filed Mar. 2, 2009; Ser. No. 12/380,781, filed Mar. 2, 2009; Ser. No. 12/380,774, filed Mar. 2, 2009; Ser. No. 12/380,771, filed Mar. 2, 2009; Ser. No. 12/380,773, filed Mar. 2, 2009; Ser. No. 12/380,769, filed Mar. 2, 2009; Ser. No. 12/380,777, filed Mar. 2, 2009; Ser. No. 12/695,019, filed Jan. 27, 2010; Ser. No. 12/695,020, filed Jan. 27, 2010; Ser. No. 12/694,445, filed Jan. 27, 2010; Ser. No. 12/694,451, filed Jan. 27, 2010; Ser. No. 12/694,455, filed Jan. 27, 2010; Ser. No. 12/695,021, filed Jan. 27, 2010; Ser. No. 12/695,980, filed Jan. 28, 2010; and Ser. No. 13/134,005, filed May 25, 2011, and which claims the benefit of U.S. Provisional Application Nos. 61/348,022, filed May 25, 2010; 61/381,159, filed Sep. 9, 2010; 61/381,162, filed Sep. 9, 2010; 61/384,456, filed Sep. 20, 2010; 61/389,547, filed Oct. 4, 2010; 61/385,020, filed Sep. 21, 2010; 61/387,243, filed Sep. 28, 2010; 61/387,247, filed Sep. 28; 61/407,358, filed Oct. 27, 2010; 61/418,507, filed Dec. 1, 2010; 61/418,509, filed Dec. 1, 2010; 61/420,727, filed Dec. 7, 2010; 61/422,565, filed Dec. 13, 2010; 61/422,572, filed Dec. 13, 2010; 61/422,574, filed Dec. 13, 2010; 61/435,564, filed Jan. 24, 2011; and 61/472,606, filed Apr. 6, 2011.

This application is also a continuation-in-part of U.S. application Ser. No. 13/229,580, filed Sep. 9, 2011, entitled WIRELESS NETWORK SERVICE INTERFACES, which is a continuation-in-part of above-referenced U.S. application Ser. No. 12/380,759, filed Mar. 2, 2009; Ser. No. 12/380,779, filed Mar. 2, 2009; Ser. No. 12/380,758, filed Mar. 2, 2009; Ser. No. 12/380,778, filed Mar. 2, 2009; Ser. No. 12/380,768, filed Mar. 2, 2009; Ser. No. 12/380,767, filed Mar. 2, 2009; Ser. No. 12/380,780, filed Mar. 2, 2009; Ser. No. 12/380,755, filed Mar. 2, 2009; Ser. No. 12/380,756, filed Mar. 2, 2009; Ser. No. 12/380,770, filed Mar. 2, 2009; Ser. No. 12/380,772, filed Mar. 2, 2009; Ser. No. 12/380,782, filed Mar. 2, 2009; Ser. No. 12/380,783, filed Mar. 2, 2009; Ser. No. 12/380,757, filed Mar. 2, 2009; Ser. No. 12/380,781, filed Mar. 2, 2009; Ser. No. 12/380,774, filed Mar. 2, 2009; Ser. No. 12/380,771, filed Mar. 2, 2009; Ser. No. 12/380,773, filed Mar. 2, 2009; Ser. No. 12/380,769, filed Mar. 2, 2009; Ser. No. 12/380,777, filed Mar. 2, 2009; Ser. No. 12/695,019, filed Jan. 27, 2010; Ser. No. 12/695,020, filed Jan. 27, 2010; Ser. No. 12/694,445, filed Jan. 27, 2010; Ser. No. 12/694,451, filed Jan. 27, 2010; Ser. No. 12/694,455, filed Jan. 27, 2010; Ser. No. 12/695,021, filed Jan. 27, 2010; Ser. No. 12/695,980, filed Jan. 28, 2010; Ser. No. 13/134,005, filed May 25, 2011; and Ser. No. 13/134,028, filed May 25, 2011, and which claims the benefit of U.S. Provisional Application Nos. 61/381,159, filed Sep. 9, 2010; 61/381,162, filed Sep. 9, 2010; 61/384,456, filed Sep. 20, 2010; 61/389,547, filed Oct. 4, 2010; 61/385,020, filed Sep. 21, 2010; 61/387,243, filed Sep. 28, 2010; 61/387,247, filed Sep. 28; 61/407,358, filed Oct. 27, 2010; 61/418,507, filed Dec. 1, 2010; 61/418,509, filed Dec. 1, 2010; 61/420,727, filed Dec. 7, 2010; 61/422,565, filed Dec. 13, 2010; 61/422,572, filed Dec. 13, 2010; 61/422,574, filed Dec. 13, 2010; 61/435,564, filed Jan. 24, 2011; and 61/472,606, filed Apr. 6, 2011.

This application is also a continuation-in-part of U.S. application Ser. No. 13/237,827, filed Sep. 20, 2011, entitled ADAPTING NETWORK POLICIES BASED ON DEVICE SERVICE PROCESSOR CONFIGURATION, which is a continuation-in-part of above-referenced U.S. application Ser. No. 12/380,759, filed Mar. 2, 2009; Ser. No. 12/380,779, filed Mar. 2, 2009; Ser. No. 12/380,758, filed Mar. 2, 2009; Ser. No. 12/380,778, filed Mar. 2, 2009; Ser. No. 12/380,768, filed Mar. 2, 2009; Ser. No. 12/380,767, filed Mar. 2, 2009; Ser. No. 12/380,780, filed Mar. 2, 2009; Ser. No. 12/380,755, filed Mar. 2, 2009; Ser. No. 12/380,756, filed Mar. 2, 2009; Ser. No. 12/380,770, filed Mar. 2, 2009; Ser. No. 12/380,772, filed Mar. 2, 2009; Ser. No. 12/380,782, filed Mar. 2, 2009; Ser. No. 12/380,783, filed Mar. 2, 2009; Ser. No. 12/380,757, filed Mar. 2, 2009; Ser. No. 12/380,781, filed Mar. 2, 2009; Ser. No. 12/380,774, filed Mar. 2, 2009; Ser. No. 12/380,773, filed Mar. 2, 2009; Ser. No. 12/380,769, filed Mar. 2, 2009; Ser. No. 12/380,777, filed Mar. 2, 2009; Ser. No. 12/695,019, filed Jan. 27, 2010; Ser. No. 12/695,020, filed Jan. 27, 2010; Ser. No. 12/694,445, filed Jan. 27, 2010; Ser. No. 12/694,451, filed Jan. 27, 2010; Ser. No. 12/694,455, filed Jan. 27, 2010; Ser. No. 12/695,021, filed Jan. 27, 2010; Ser. No. 12/695,980, filed Jan. 28, 2010; Ser. No. 13/134,005, filed May 25, 2011; Ser. No. 13/134,028, filed May 25, 2011; and Ser. No. 13/229,580, filed Sep. 9, 2011, and which claims the benefit of U.S. Provisional Application Nos. 61/384,456, filed Sep. 20, 2010; 61/389,547, filed Oct. 4, 2010; 61/385,020, filed Sep. 21, 2010; 61/387,243, filed Sep. 28, 2010; 61/387,247, filed Sep. 28; 61/407,358, filed Oct. 27, 2010; 61/418,507, filed Dec. 1, 2010; 61/418,509, filed Dec. 1, 2010; 61/420,727, filed Dec. 7, 2010; 61/422,565, filed Dec. 13, 2010; 61/422,572, filed Dec. 13, 2010; 61/422,574, filed Dec. 13, 2010; 61/435,564, filed Jan. 24, 2011; and 61/472,606, filed Apr. 6, 2011.

This application is also a continuation-in-part of U.S. application Ser. No. 13/239,321, filed Sep. 21, 2011, entitled SERVICE OFFER SET PUBLISHING TO DEVICE AGENT WITH ON-DEVICE SERVICE SELECTION, which is a continuation-in-part of above-referenced U.S. application Ser. No. 12/380,759, filed Mar. 2, 2009; Ser. No. 12/380,779, filed Mar. 2, 2009; Ser. No. 12/380,758, filed Mar. 2, 2009; Ser. No. 12/380,778, filed Mar. 2, 2009; Ser. No. 12/380,768, filed Mar. 2, 2009; Ser. No. 12/380,767, filed Mar. 2, 2009; Ser. No. 12/380,780, filed Mar. 2, 2009; Ser. No. 12/380,755, filed Mar. 2, 2009; Ser. No. 12/380,756, filed Mar. 2, 2009; Ser. No. 12/380,770, filed Mar. 2, 2009; Ser. No. 12/380,772, filed Mar. 2, 2009; Ser. No. 12/380,782, filed Mar. 2, 2009; Ser. No. 12/380,783, filed Mar. 2, 2009; Ser. No. 12/380,757, filed Mar. 2, 2009; Ser. No. 12/380,781, filed Mar. 2, 2009; Ser. No. 12/380,774, filed Mar. 2, 2009; Ser. No. 12/380,773, filed Mar. 2, 2009; Ser. No. 12/380,769, filed Mar. 2, 2009; Ser. No. 12/380,777, filed Mar. 2, 2009; Ser. No. 12/695,019, filed Jan. 27, 2010; Ser. No. 12/695,020, filed Jan. 27, 2010; Ser. No. 12/694,445, filed Jan. 27, 2010; Ser. No. 12/694,451, filed Jan. 27, 2010; Ser. No. 12/694,455, filed Jan. 27, 2010; Ser. No. 12/695,021, filed Jan. 27, 2010; Ser. No. 12/695,980, filed Jan. 28, 2010; Ser. No. 13/134,005, filed May 25, 2011; Ser. No. 13/134,028, filed May 25, 2011; Ser. No. 13/229,580, filed Sep. 9, 2011; and Ser. No. 13/237,827, filed Sep. 20, 2011, and which claims the benefit of U.S. Provisional Application Nos. 61/389,547, filed Oct. 4, 2010; 61/385,020, filed Sep. 21, 2010; 61/387,243, filed Sep. 28, 2010; 61/387,247, filed Sep. 28; 61/407,358, filed Oct. 27, 2010; 61/418,507, filed Dec. 1, 2010; 61/418,509, filed Dec. 1, 2010; 61/420,727, filed Dec. 7, 2010; 61/422,565, filed Dec. 13, 2010; 61/422,572, filed Dec. 13, 2010; 61/422,574, filed Dec. 13, 2010; 61/435,564, filed Jan. 24, 2011; and 61/472,606, filed Apr. 6, 2011.

This application is also a continuation-in-part of U.S. application Ser. No. 13/247,998, filed Sep. 28, 2011, entitled SECURE DEVICE DATA RECORDS, which is a continuation-in-part of above-referenced U.S. application Ser. No. 12/380,759, filed Mar. 2, 2009; Ser. No. 12/380,779, filed Mar. 2, 2009; Ser. No. 12/380,758, filed Mar. 2, 2009; Ser. No. 12/380,778, filed Mar. 2, 2009; Ser. No. 12/380,768, filed Mar. 2, 2009; Ser. No. 12/380,767, filed Mar. 2, 2009; Ser. No. 12/380,780, filed Mar. 2, 2009; Ser. No. 12/380,755, filed Mar. 2, 2009; Ser. No. 12/380,756, filed Mar. 2, 2009; Ser. No. 12/380,770, filed Mar. 2, 2009; Ser. No. 12/380,772, filed Mar. 2, 2009; Ser. No. 12/380,782, filed Mar. 2, 2009; Ser. No. 12/380,783, filed Mar. 2, 2009; Ser. No. 12/380,757, filed Mar. 2, 2009; Ser. No. 12/380,781, filed Mar. 2, 2009; Ser. No. 12/380,774, filed Mar. 2, 2009; Ser. No. 12/380,773, filed Mar. 2, 2009; Ser. No. 12/380,769, filed Mar. 2, 2009; Ser. No. 12/380,777, filed Mar. 2, 2009; Ser. No. 12/695,019, filed Jan. 27, 2010; Ser. No. 12/695,020, filed Jan. 27, 2010; Ser. No. 12/694,445, filed Jan. 27, 2010; Ser. No. 12/694,451, filed Jan. 27, 2010; Ser. No. 12/694,455, filed Jan. 27, 2010; Ser. No. 12/695,021, filed Jan. 27, 2010; Ser. No. 12/695,980, filed Jan. 28, 2010; Ser. No. 13/134,005, filed May 25, 2011; Ser. No. 13/134,028, filed May 25, 2011; Ser. No. 13/229,580, filed Sep. 9, 2011; Ser. No. 13/237,827, filed Sep. 20, 2011; Ser. No. 13/239,321, filed Sep. 21, 2011; Ser. No. 13/248,028, filed Sep. 28, 2011; and U.S. application Ser. No. 13/248,025, filed Sep. 28, 2011, entitled SERVICE DESIGN CENTER FOR DEVICE ASSISTED SERVICES, and which claims the benefit of U.S. Provisional Application Nos. 61/389,547, filed Oct. 4, 2010; 61/387,243, filed Sep. 28, 2010; 61/387,247, filed Sep. 28; 61/407,358, filed Oct. 27, 2010; 61/418,507, filed Dec. 1, 2010; 61/418,509, filed Dec. 1, 2010; 61/420,727, filed Dec. 7, 2010; 61/422,565, filed Dec. 13, 2010; 61/422,572, filed Dec. 13, 2010; 61/422,574, filed Dec. 13, 2010; 61/435,564, filed Jan. 24, 2011;and 61/472,606, filed Apr. 6, 2011.

This application is also a continuation-in-part of above-referenced U.S. application Ser. No. 13/248,025, filed Sep. 28, 2011, which is a continuation-in-part of above-referenced U.S. application Ser. No. 12/380,759, filed Mar. 2, 2009; Ser. No. 12/380,779, filed Mar. 2, 2009; Ser. No. 12/380,758, filed Mar. 2, 2009; Ser. No. 12/380,778, filed Mar. 2, 2009; Ser. No. 12/380,768, filed Mar. 2, 2009; Ser. No. 12/380,767, filed Mar. 2, 2009; Ser. No. 12/380,780, filed Mar. 2, 2009; Ser. No. 12/380,755, filed Mar. 2, 2009; Ser. No. 12/380,756, filed Mar. 2, 2009; Ser. No. 12/380,770, filed Mar. 2, 2009; Ser. No. 12/380,772, filed Mar. 2, 2009; Ser. No. 12/380,782, filed Mar. 2, 2009; Ser. No. 12/380,783, filed Mar. 2, 2009; Ser. No. 12/380,757, filed Mar. 2, 2009; Ser. No. 12/380,781, filed Mar. 2, 2009; Ser. No. 12/380,774, filed Mar. 2, 2009; Ser. No. 12/380,773, filed Mar. 2, 2009; Ser. No. 12/380,769, filed Mar. 2, 2009; Ser. No. 12/380,777, filed Mar. 2, 2009; Ser. No. 12/695,019, filed Jan. 27, 2010; Ser. No. 12/695,020, filed Jan. 27, 2010; Ser. No. 12/694,445, filed Jan. 27, 2010; Ser. No. 12/694,451, filed Jan. 27, 2010; Ser. No. 12/694,455, filed Jan. 27, 2010; Ser. No. 12/695,021, filed Jan. 27, 2010; and Ser. No. 12/695,980, filed Jan. 28, 2010; Ser. No. 13/134,005, filed May 25, 2011; Ser. No. 13/134,028, filed May 25, 2011; Ser. No. 13/229,580, filed Sep. 9, 2011; Ser. No. 13/237,827, filed Sep. 20, 2011; Ser. No. 13/239,321, filed Sep. 21, 2011; Ser. No. 13/248,028, filed Sep. 28, 2011; and Ser. No. 13/247,998, filed Sep. 28, 2011, and which claims the benefit of U.S. Provisional Application Nos. 61/389,547, filed Oct. 4, 2010; 61/387,243, filed Sep. 28, 2010; 61/387,247, filed Sep. 28; 61/407,358, filed Oct. 27, 2010; 61/418,507, filed Dec. 1, 2010; 61/418,509, filed Dec. 1, 2010; 61/420,727, filed Dec. 7, 2010; 61/422,565, filed Dec. 13, 2010; 61/422,572, filed Dec. 13, 2010; 61/422,574, filed Dec. 13, 2010; 61/435,564, filed Jan. 24, 2011; and 61/472,606, filed Apr. 6, 2011.

Additionally, this application claims the benefit of the following U.S. Provisional Applications: 61/389,547, filed Oct. 4, 2010; 61/387,243, filed Sep. 28, 2010; 61/387,247, filed Sep. 28; 61/407,358, filed Oct. 27, 2010; 61/418,507, filed Dec. 1, 2010; 61/418,509, filed Dec. 1, 2010; 61/420,727, filed Dec. 7, 2010; 61/422,565, filed Dec. 13, 2010; 61/422,572, filed Dec. 13, 2010; 61/422,574, filed Dec. 13, 2010; 61/435,564, filed Jan. 24, 2011; and 61/472,606, filed Apr. 6, 2011.

All of the above-identified patents and applications are hereby incorporated by reference.

BACKGROUND

With the advent of mass market digital communications and content distribution, many access networks such as wireless networks, cable networks and DSL (Digital Subscriber Line) networks are pressed for user capacity, with, for example, EVDO (Evolution-Data Optimized), HSPA (High Speed Packet Access), LTE (Long Term Evolution), WiMax (Worldwide Interoperability for Microwave Access), and Wi-Fi (Wireless Fidelity) wireless networks increasingly becoming user capacity constrained. Although wireless network capacity will increase with new higher capacity wireless radio access technologies, such as MIMO (Multiple-Input Multiple-Output), and with more frequency spectrum being deployed in the future, these capacity gains are likely to be less than what is required to meet growing digital networking demand.

Similarly, although wire line access networks, such as cable and DSL, can have higher average capacity per user, wire line user service consumption habits are trending toward very high bandwidth applications that can quickly consume the available capacity and degrade overall network service experience. Because some components of service provider costs go up with increasing bandwidth, this trend will also negatively impact service provider profits.

BRIEF DESCRIPTION OF THE DRAWINGS

Various embodiments of the invention are disclosed in the following detailed description and the accompanying drawings.

FIG. 27 illustrates a flow diagram for providing enterprise and consumer billing allocation for wireless communication device service usage activities in accordance with some embodiments.

FIG. 28 illustrates another flow diagram for providing enterprise and consumer billing allocation for wireless communication device service usage activities in accordance with some embodiments.

FIG. 29 illustrates another flow diagram for providing enterprise and consumer billing allocation for wireless communication device service usage activities in accordance with some embodiments.

FIG. 30 illustrates another flow diagram for providing enterprise and consumer billing allocation for wireless communication device service usage activities in accordance with some embodiments.

DETAILED DESCRIPTION

Figure 1:
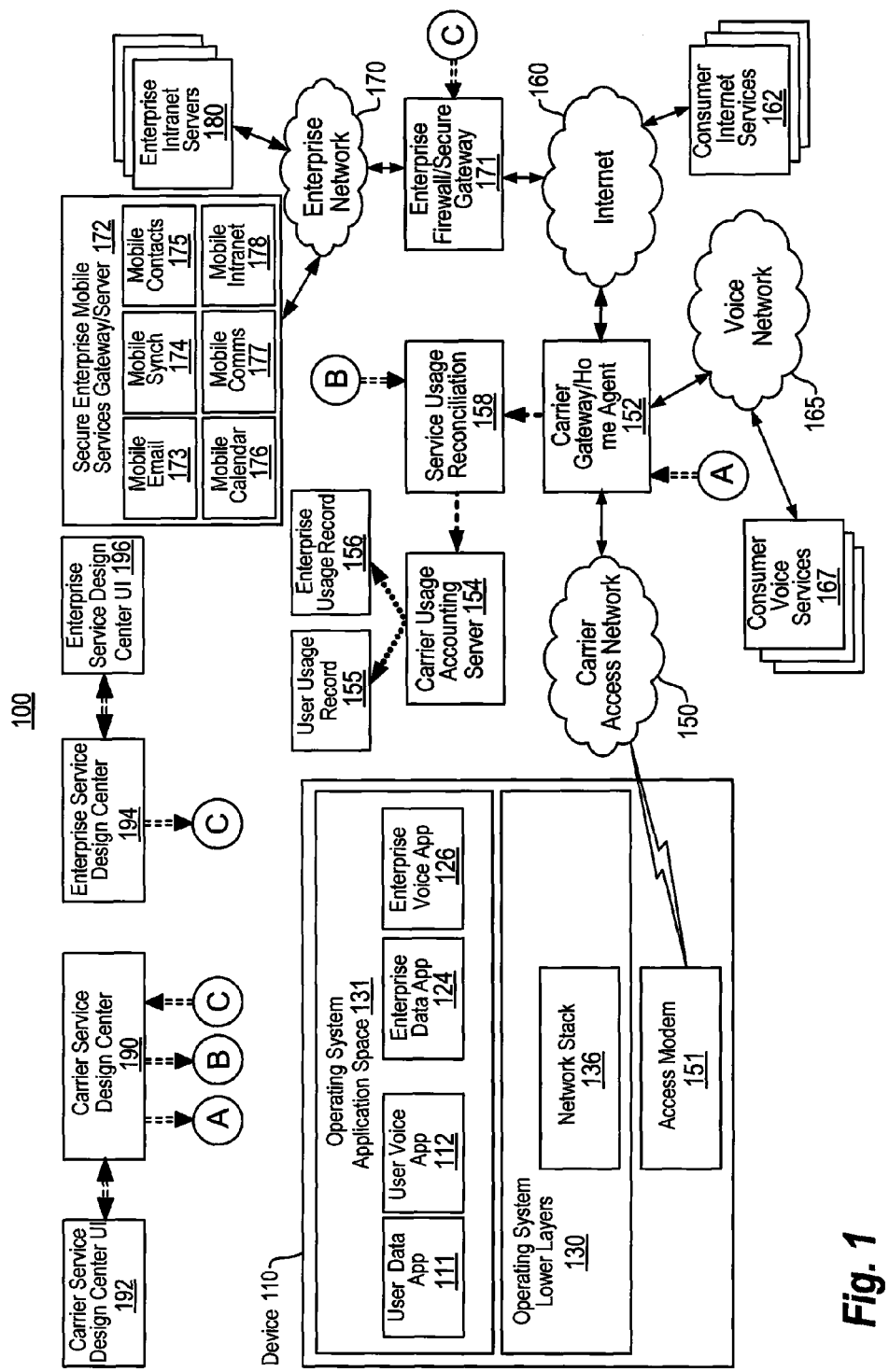
FIG. 1 illustrates a functional diagram of a network architecture for providing enterprise and consumer billing allocation for wireless communication device service usage activities in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Some enterprises only allow certain specialized wireless devices to be used for connection to their enterprise network. Such devices typically contain secure data storage and enterprise program execution environments to protect enterprise information and network access. This approach is generally directed towards maintaining enterprise data integrity and enterprise network security. However, this approach does not address the various problems associated with allocating service usage or billing between consumer or non-enterprise service usage activities and enterprise service usage activities.

Accordingly, there is a need to provide for an enterprise and consumer billing allocation for wireless communication device service usage activities. There is also a need to address various issues with enterprise policies that can vary from employee to employee. For example, roaming policies can be configured differently for a global sales person than for a finance administrator who does not travel as much on enterprise business. Furthermore, some enterprises may not elect to pay for employee wireless communication device purchase or all employee wireless communication service usage needs or desires. As a result, some enterprises would benefit from techniques that allowed such enterprises to piggy back on consumer device or service purchases while maintaining an enterprise and consumer billing allocation for wireless communication device service usage activities.

Also, some consumers prefer to select their own wireless communication device that may not be an enterprise approved wireless communication device or a specialized enterprise device specified by enterprise IT managers. For example, certain enterprises may only offer certain Blackberry smart phone devices, and certain employees may prefer Apple iPhone and/or various Android based smart phone devices. Another trend suggests that a growing number of enterprise employees desire to use a single wireless communication device for their enterprise mobile communication, enterprise information access, and enterprise network access as well as for, for example, their personal mobile communication, access, and application needs (e.g., consumer/personal, that is, non-enterprise, use of cellular calls, text messaging, web browsing, social networking, games, and various other service usage activities). Such dual persona devices, where a first persona is oriented to enterprise access and/or application needs and a second persona is oriented to personal access and/or application needs, are enabled by the disclosure herein.

As a result, enterprise network managers generally need a way to safely allow consumers to perform consumer mobile access services that the enterprise can specify that will not be paid for by the enterprise. Various network architectures and techniques are described herein that allow an enterprise to determine how much service usage (e.g., how much of a corresponding service bill) should be allocated to device user services or consumer services and how much should be allocated to enterprise services in which the enterprise sponsors the enterprise access. Various design approaches and techniques are described herein for allocating enterprise and consumer billing in a secure manner that works with both specialized enterprise wireless communication devices as well as other wireless communication devices. For example, crediting a user bill with sponsored enterprise service usage is provided using various techniques described herein. As another example, providing enterprise employee reimbursement for enterprise services used on the employee wireless communication device or allowing an enterprise to deduct employee consumer service usage from their paycheck is provided using various techniques described herein. As yet another example, allowing a consumer to select from an instant activation platform on a wireless communication device that comes pre-loaded with various enterprise services is provided using various techniques described herein. As yet a further example, providing for a capability to install or download an enterprise application that provides secure enterprise mobile services access and allocating enterprise and consumer billing for consumer wireless communication devices is provided using various techniques described herein.

Various techniques for monitoring service usage and providing for secured and verifiable device assisted services (DAS), including DAS based service usage monitoring, are disclosed in co-pending U.S. patent application Ser. No. 12/380,758,entitled VERIFIABLE DEVICE ASSISTED SERVICE USAGE MONITORING WITH REPORTING, SYNCHRONIZATION, AND NOTIFICATION, filed on Mar. 2, 2009, published as U.S. Pub. App. No. 20100191612, co-pending U.S. patent application Ser. No. 12/695,019, entitled DEVICE ASSISTED CDR CREATION, AGGREGATION, MEDIATION and BILLING, filed on Jan. 27, 2010, published as U.S. Pub. App. No. 20100197266, co-pending U.S. patent application Ser. No. 12/695,020,entitled ADAPTIVE AMBIENT SERVICES, filed on Jan. 27, 2010, published as U.S. Pub. App. No. 20100198698, co-pending U.S. patent application Ser. No. 12/694,445, entitled SECURITY TECHNIQUES FOR DEVICE ASSISTED SERVICES, filed on Jan. 27, 2010, published as U.S. Pub. App. No. 20100199325, co-pending U.S. patent application Ser. No. 12/694,451,entitled DEVICE GROUP PARITIONS AND SETTLEMENT PLATFORM, filed on Jan. 27, 2010, published as U.S. Pub. App. No. 20100197267, which are incorporated herein by reference for all purposes.

In some embodiments, allocating enterprise and consumer billing for service usage activities on a wireless communication device is provided for service usage activities that an enterprise configures as approved and/or sponsored for enterprise billing (e.g., such service usage activities are paid for at least in part by the enterprise) and consumer applications and service usage activities that the device user chooses to use from the wireless communication device and that the enterprise does not sponsor. Various embodiments are disclosed herein describing a wide range of devices that users and enterprises may desire to use for such dual-purpose application scenarios. In some embodiments, devices for such applications can include a less specialized and secure device program execution environment as further described herein.

Accordingly, enterprise and consumer billing allocation for wireless communication device service usage activities is provided. In some embodiments, enterprise and consumer billing allocation for wireless communication device service usage activities includes monitoring a service usage activity of a wireless communication device (e.g., the monitoring can be performed in the wireless communication device and/or the monitoring of enterprise application service usage can be performed using a secure application server in the enterprise network), and determining an enterprise and consumer billing allocation for the monitored service usage activity. In some embodiments the allocation is determined by classifying the service usage activities as associated with a consumer service usage activity (e.g., in a consumer service usage activity list) or associated with an enterprise service usage activity (e.g., in an enterprise service usage activity list; or, as another example, if the monitored service usage activity is not included in the enterprise service usage activity list, then it can be automatically classified as a consumer service usage activity by default).

In some embodiments, enterprise and consumer billing allocation for wireless communication device service usage activities includes providing a service design center (SDC) for configuring an enterprise and consumer billing allocation of monitored service usage activities for a plurality of wireless communication devices associated with an enterprise account, and implementing the configured enterprise and consumer billing allocation for monitored service usage activities for the plurality of wireless communication devices associated with the enterprise account.

In some embodiments, enterprise and consumer billing allocation for wireless communication device service usage activities includes monitoring service usage of a wireless communication device, and determining whether a user is acting as a consumer (e.g., personal service usage activities on the wireless communication device) or a professional (e.g., enterprise service usage activities on the wireless communication device, that is, the user is working on the wireless communication device in his or her capacity as an employee for an enterprise, in which the wireless communication device is associated with an enterprise account for the enterprise) based on the monitored service usage activity (e.g., based on place, time of day, application or service activity, and/or other criteria or factors). In some embodiments, enterprise and consumer billing allocation for wireless communication device service usage activities differentially charges and/or allocates billing between the enterprise and the consumer based on a classification of the monitored service usage activity as allocated to the enterprise or to the consumer for billing/charging purposes. Such embodiments enable a dual persona device user experience.

In some embodiments, enterprise and consumer billing allocation for wireless communication device service usage activities includes monitoring a service usage activity of a wireless communication device, and reporting the monitored service usage activity to a network element (e.g., a service controller, a service usage reconciliation function, another service control or billing/charging function in the network, or another network element), in which the network element determines an enterprise and consumer billing allocation for the monitored service usage activity. In some embodiments, the network element (e.g., a service controller, a service usage reconciliation function, another service control or billing/charging function in the network, or another network element) determines an enterprise and consumer billing allocation for the monitored service usage activity. In some embodiments, a service usage reconciliation function determines how much service usage is due to enterprise service usage activities and how much is due to consumer service usage activities. In some embodiments, after determining the allocation between consumer and enterprise service usage activities, the service usage reconciliation function provides the information to a service usage accounting function (e.g., a carrier billing server or an enterprise service usage accounting server), which in turn delivers a consumer usage report or bill and/or an enterprise usage report or bill. In some embodiments, the service usage reconciliation function determines the amount of enterprise service usage and creates a service usage credit record so that a device user's account can be credited or a device user can be compensated or reimbursed for enterprise service usage costs. In some embodiments, a service usage monitor is configured to monitor service usage activities of a device. In some embodiments, the service usage monitor is configured to classify the monitored service usage activities as enterprise service usage activities. In some embodiments, the service usage monitor is configured to classify the monitored service usage activities as consumer service usage activities. In some embodiments, the service usage monitor is configured to monitor a first group of service usage activities for service usage allocation to a device user (e.g., using a list of service usage activities associated with a consumer service usage), and a second group of service usage activities for service usage allocation to an enterprise (e.g., using a list of service usage activities associated with an enterprise service usage). In some embodiments, service usage activities (e.g., service activities, such as applications, network, and/or voice based activities that use wireless network service usage resources) are classified using various techniques described herein, such as based on application (e.g., application credential), device (e.g., device credential), time of day, network destination, network traffic protocol and/or port, and various other criteria/factors. In some embodiments, the service usage monitor is implemented in the network (e.g., on one or more network elements in the carrier network and/or enterprise network, as described herein). In some embodiments, the service usage monitor is implemented in the device (e.g., using various techniques described herein, including verifiable and/or secured device-based implementations). In some embodiments, the service usage monitor is implemented using both network-based and device-based techniques, as described herein with respect to various embodiments.

In some embodiments, a set of service activities that will be sponsored by an enterprise (e.g., a specified or configured list of enterprise sponsored service activities) is managed by an enterprise service design center. In some embodiments, a list of service activities and the associated service policies for each service activity are compiled to form an enterprise sponsored service activity policy set. For example, enterprise email, enterprise calendar, and enterprise contacts can be configured as sponsored service activities. In some embodiments, the sponsored enterprise services list includes a list of network destinations that are associated with the services (e.g., an enterprise mail server address and/or an enterprise internal corporate network). For example, the enterprise email can be a sponsored service that is associated with an enterprise sponsored email service policy, which can limit destinations for corporate email, sizes of emails and/or email attachments, and/or other email related usage criteria or factors (e.g., a service usage charging policy).

In some embodiments, the monitored service usage is reported to the reconciliation function by a carrier network service usage monitoring element (e.g., a home agent (HA), access network gateway, or other network element, such as a deep packet inspection (DPI) function). In some embodiments, the monitored service usage is reported to the reconciliation function by an enterprise network service usage monitoring element (e.g., a carrier network gateway or a mobile services gateway/server or other element in the enterprise network that can measure service usage and associate it with a given device credential or application credential). In some embodiments, the monitored service usage is reported to the reconciliation function by an element in the mobile device (e.g., a service usage monitor in a secure enterprise mobile services application or a Service Processor function, which can be securely implemented and/or verified using various techniques described herein).

In some embodiments, a service design center for implementing enterprise and consumer billing allocation for wireless communication device service usage activities is provided. For example, an enterprise manager can use the service design center to select one or more services that the enterprise agrees to pay for/is responsible for paying for and to select one or more other services that the employees of the enterprise must agree to pay for/are responsible for paying for (e.g., if the employee elects to use/have such services that are not charged to the enterprise, or included as enterprise services that are charged to or paid for by the enterprise).

In some embodiments, a service design center that facilitates configuration of sponsored enterprise services for implementing enterprise and consumer billing allocation for wireless communication device service usage activities is provided. In some embodiments, a service design center for implementing enterprise and consumer billing allocation for wireless communication device service usage activities includes providing a service design center for a carrier network and another service design center for an enterprise network (e.g., in some cases, these service design centers can be combined).

In some embodiments, an enterprise sponsored service activity policy set is created by an enterprise network administrator through an enterprise service design center user interface (UI). In some embodiments, the enterprise sponsored service activity policy set includes a list of network destination addresses that corresponds to the desired sponsored service activity list, along with an access policy or service usage charging policy for the service activities. In some embodiments, all service activities in the enterprise sponsored service activity policy set receive the same access policies or charging policies. In some embodiments, a first subset of one or more of the service activities in the enterprise sponsored service activity policy set receive access policies or charging policies that are different than that of a second subset of service activities. For example, a sponsored enterprise email service can be in the first subset, and sponsored mobile voice services can be in the second subset, as certain employees (e.g., traveling sales personnel and/or executives) can be granted international and/or roaming mobile voice services, and other employees can be granted more limited sponsored mobile voice services.

In some embodiments, the enterprise network administrator uses the enterprise service design center to create an enterprise sponsored service device group list that includes device credentials or device application credentials that the carrier network and/or the enterprise network can use to identify a device or an application on a device as belonging to the group of devices for which the enterprise desires to sponsor enterprise service activities. In some embodiments, a sponsored service activity policy set is created by an enterprise network administrator through an enterprise service design center UI, and an enterprise sponsored service device group list is created by an enterprise network administrator through an enterprise service design center UI, and the two lists are stored in the enterprise service design center in which they are associated with one another for the purpose of provisioning the carrier network, the enterprise network, and/or the devices to provide the desired enterprise sponsored services policy set to the enterprise sponsored services device group, as described herein with respect to various embodiments.

In some embodiments, the association between an enterprise sponsored services device group and an enterprise sponsored service policy set is used by a service design center to create a provisioning table, in which the provisioning table is a list of the provisioning programming required for the various carrier network elements, enterprise network elements, and/or device elements to implement the desired sponsored service activity policy set for the enterprise sponsored services device group.

For example, an enterprise can use the service design center to configure certain destinations/services as enterprise services or potentially enterprise services based on various factors (e.g., corporate sites, corporate email/email servers, corporate web pages/intranet, and can, for example, agree to pay for a certain level of general web browsing by usage/time of day and/or other factors, corporate contacts/calendars, corporate videoconferencing; and certain applications, such as web conferencing applications or other applications; certain telephone service usages, etc.). As another example, the service design center can present a configuration interface that allows users to select from one or more service plans that include various consumer and enterprise allocations and/or to select an enterprise only service plan.

In some embodiments, the service design center specifies one or more service plans the device user can select from and these service plan selection options are configured into a configuration interface on a device software application that allows users to select from one or more service plans that includes various consumer and enterprise allocations and/or to select an enterprise only service plan. In some embodiments, the configuration interface is made available directly on the device via a device client that provides a service plan selection user interface that displays one or more service plan options configured in the service design center or the enterprise service design center. In some embodiments, the configuration interface is presented directly on a device user interface (UI) when the user attempts to use an access service usage activity that requires a service plan to be activated or purchased. In some embodiments, the configuration interface presented via the device UI accepts a user response, transmits it to a carrier network element responsible for provisioning a new user service plan that in turn activates the service plan chosen by the user, possibly after confirming service payment credit for the user or enterprise entity. In some embodiments, the carrier network element responsible for provisioning a new user service plan is a carrier usage accounting server. In some embodiments, the carrier network element responsible for provisioning a new user service plan is a consumer internet services element. In some embodiments, the carrier network element responsible for provisioning a new user service plan is a carrier gateway or home agent. In some embodiments the carrier network element responsible for provisioning a new user service plan is a billing system or service plan provisioning system. In some embodiments, the configuration interface is made available to the user in the form of a web site that provides a service plan selection user interface that displays one or more service plan options configured in the service design center or the enterprise service design center.

In some embodiments, the initial configuration of the end-user device includes one or more enterprise access service plans that allow the user to access certain applications or network destinations associated with enterprise access services, and the user can choose from one or more additional consumer oriented service plans offered directly on the device UI by a device software application in communication with a carrier network element responsible for provisioning a new user service plan that in turn activates the service plan chosen by the user, possibly after confirming service payment credit for the user or enterprise entity. In some embodiments, these access service plan options are configured with a service design center. In some embodiments, these access service plan options are configured with an enterprise service design center.

In some embodiments, enterprise data locally stored on the wireless communication device is secured and access to an enterprise network from the wireless communication device is secured so that only authorized devices or applications can access the network. In some embodiments, security for enterprise data and network access is accomplished by connecting the wireless communication device to the enterprise network via a secure mobile services application on the wireless communication device that connects via a secure channel to a secure mobile services gateway server in the enterprise network. In some embodiments, the SDC is programmed to provision the network and/or device apparatus to detect service usage communication with the mobile services gateway server and record that as a usage charge for network services. In some embodiments, such service usage communication with the mobile services gateway server is credited to the user's carrier account or used as a reimbursement to the user bill.

In some embodiments, determining the enterprise and consumer billing allocation for wireless communication device service usage activities is performed using a classifier implemented on the wireless communication device that classifies the monitored service usage activity (e.g., service usage can also be measured by the classifier and/or another function implemented on the wireless communication device, which can similarly be implemented in a secure execution area or in a secure memory), in which the classifier is executed in a secure execution area or a secure memory of the wireless communication device. In some embodiments, the security of the classifier is verified, periodically or at other times, using various techniques, such as by comparing a local service usage measure with a network based service usage measure and/or comparing a secured local service usage measure with another local service usage measure. In some embodiments, a secured application protects one or more enterprise applications (e.g., email, calendar, contacts, intranet access, and/or other enterprise specified applications, such as applications configured as approved or authorized enterprise applications for a particular enterprise by an enterprise manager using a service design center) from unauthorized use or tampering.

In some embodiments, the secure mobile services application also provides for usage monitoring of the enterprise service usage of the device. In some embodiments, the secure mobile services application also provides for service access control for the enterprise services of the device so that enterprise network access policies can be locally enforced on the device.

In some embodiments, security for enterprise data and network access is provided by connecting to the enterprise network via a secure mobile services application executed securely (e.g., in a virtual machine or in a hardware secured execution partition) on the wireless communications device that connects via a secure channel to a secure mobile services gateway server in the enterprise network. In some embodiments, security for enterprise data and network access is provided by connecting to the enterprise network via a secure mobile services application executed on a wireless communications device that includes a service processor, as described herein, that connects via a secure channel to a secure mobile services gateway server in the enterprise network. In some embodiments, the SDC is programmed to provision the network and/or wireless communications device apparatus to detect service usage communication with the mobile services gateway server, and record that as a usage charge for network services. In some embodiments, such service usage communication with the mobile services gateway server is credited to the user's carrier account or used as a reimbursement to the user bill.

In some embodiments, the service processor also provides for service usage monitoring of the enterprise service usage of the device, as described herein with respect to various embodiments. In some embodiments, the service processor also provides for service access control for the enterprise services of the device so that enterprise network access policies can be enforced on the device, as described herein with respect to various embodiments.

In some embodiments, enterprise and consumer billing allocation for wireless communication device service usage activities includes associating the wireless communication device and/or an authorized user of the wireless communication device (e.g., using device/user credentials) with an enterprise account (and, in some embodiments, a consumer account), associating an application with a service, and associating the service with the enterprise account (e.g., a service for the wireless communication device that the enterprise agreed to pay for). In some embodiments, enterprise and consumer billing allocation for wireless communication device service usage activities further includes using application-based monitoring and/or control using, for example, device assisted services.

In some embodiments, enterprise and consumer billing allocation for wireless communication device service usage activities includes crediting an associated consumer account for service usage allocated to an enterprise account. In some embodiments, enterprise and consumer billing allocation for wireless communication device service usage activities includes billing the enterprise for service usage allocated to the enterprise account. In some embodiments, enterprise and consumer billing allocation for wireless communication device service usage activities includes reporting to the enterprise (and, in some embodiments, the consumer) service usage allocated to the enterprise account, and the enterprise can, for example, provide an expense reimbursement to the consumer (e.g., employee, partner, associate, or contractor of the enterprise).

In some embodiments, enterprise and consumer billing allocation for wireless communication device service usage activities includes associating the wireless communication device with an enterprise account and a consumer account, associating an application with a service, and associating the service with the consumer account (e.g., a service for the wireless communication device that the consumer, such as an employee of the enterprise, agreed to personally pay for). In some embodiments, enterprise and consumer billing allocation for wireless communication device service usage activities further includes using application-based monitoring and/or control using, for example, device assisted services.

In some embodiments, enterprise and consumer billing allocation for wireless communication device service usage activities includes crediting an associated enterprise account for service usage allocated to a consumer account. In some embodiments, enterprise and consumer billing allocation for wireless communication device service usage activities includes billing the consumer for service usage allocated to the consumer account. In some embodiments, enterprise and consumer billing allocation for wireless communication device service usage activities includes reporting to the enterprise (and, in some embodiments, the consumer) service usage allocated to the consumer account, and the enterprise can, for example, deduct the cost for such service usage as an expense from the consumer's periodic/next paycheck.

In some embodiments, enterprise and consumer billing allocation for wireless communication device service usage activities does not require a network element or a device element to control services. For example, a user with a device associated with a bulk service usage plan can be automatically credited for sponsored enterprise service usage. If the bulk service usage plan has a service plan cap associated with the user's consumer service plan, then the service usage classified as sponsored enterprise service usage can be deducted from the total service usage such that the sponsored enterprise service usage does not count towards the user's capped consumer service plan usage. As another example, an enterprise account associated with the wireless communication device and/or user can allow the user to exceed a monthly or other service plan cap for sponsored enterprise service usage (e.g., based on various criteria and/or other factors, such as a more restrictive enterprise service policy to avoid potential misuse of sponsored enterprise services for personal use).

In some embodiments, enterprise and consumer billing allocation for wireless communication device service usage activities is provided using network-based and/or device-based techniques as described herein with respect to various embodiments. For example, using various techniques described herein, an enterprise manager can control the services for wireless communication devices for the enterprise, including access to such services and/or charging for such services (e.g., services used by employees in which some are charged to the enterprise on behalf of the employee and some are charged to the employee as a consumer of such services) and user notification messages. For example, the enterprise manager or another network element/function can cap and/or control service usage for consumer services and/or enterprise services.

In some embodiments, a service usage reconciliation function is provided. In some embodiments, the service usage reconciliation function implements the rules for a billing split for the enterprise and consumer billing allocation for wireless communication device service usage activities, as described herein with respect to various embodiments. In some embodiments, the service usage reconciliation function also facilitates fraud detection, as described herein with respect to various embodiments.

Carrier Managed Billing Allocation with Service Usage Monitoring in Carrier Network FIG. 1 illustrates a functional diagram of a network architecture 100 for providing enterprise and consumer billing allocation for wireless communication device service usage activities in accordance with some embodiments. In some embodiments, a wireless communication device 110 includes a memory, an application processor (e.g., or more than one application processor or general processor), and a wireless modem, shown as an access modem 151. As shown, the wireless communication device 110 includes an operating system application space 131 for executing applications and communicating wirelessly using operating system lower layers 130, network stack 136, and the access modem 151. As used herein, application space refers to a portion of memory and a portion of a processor operating system execution environment for executing application programs. As also shown, the wireless communications device 110 includes operating system lower layers 130. As used herein, operating system lower layers refers to one or more OS layers that typically implement networking functions (e.g., network stack 136). In some embodiments, operating system lower layers 130 is where certain application data and communications security functions are implemented as described herein. In some embodiments, operating system lower layers 130 is where certain service usage monitoring and reporting functions are implemented as described herein. In some embodiments, operating system application space 131 executes various user applications, including one or more of user data application 111 and user voice application 112, and various enterprise applications, including enterprise data application 124 and enterprise voice application 126. In some embodiments, the execution environment for user applications and enterprise applications is the same (e.g., as shown in FIGS. 1 through 7). For example, a consumer Internet browser can execute in the operating system application space 131 for providing Internet web site browsing or web based email service via network stack 136 and wireless access modem 151 (e.g., a wireless modem), and an enterprise email program can also execute in the operating system application space 131 to communicate with an enterprise email server also via network stack 136 and wireless access modem 151. In some embodiments, the execution environment for user applications and enterprise applications are not the same (e.g., as shown in FIGS. 8 through 12).

In some embodiments, device 110 accesses various network-based voice services, such as consumer voice services 167 and/or enterprise sponsored/paid-for consumer voice services usage, via voice network 165. As shown, voice network 165 is in communication with carrier access network 150 via carrier gateway/home agent (HA) 152. In some embodiments, device 110 accesses various Internet based services, such as consumer Internet services 162 and/or enterprise sponsored/paid-for consumer Internet services usage, via Internet 160.

As also shown in FIG. 1, device 110 is in wireless communication (e.g., 2G/3G/4G access) with carrier access network 150. The carrier provides a carrier usage accounting server 154 (e.g., a carrier billing server) in communication with carrier access network 150. Carrier network access 150 is shown in communication with both Internet 160 and enterprise network 170 via Internet 160. Enterprise network 170 is shown in communication with Internet 160 as via enterprise firewall and secure access gateway 171 for protecting enterprise network 170 from unauthorized access. In some embodiments, to access enterprise network 170 through enterprise firewall and secure access gateway 171, device 110 includes a secure data application or a virtual private network application/function to facilitate secure authorization with enterprise firewall and secure access gateway 171 and to also protect the communication (e.g., encrypt such data communications). As also shown, behind enterprise firewall and secure access gateway 171, enterprise network 170 provides communication with secure enterprise mobile services gateway/server 172 in communication with enterprise network 170. As shown, secure enterprise mobile services gateway server 172 includes various enterprise applications/functions, including as shown, mobile email 173, mobile synchronization 174, mobile contacts 175, mobile calendar 176, mobile communications 177, and mobile intranet 178. In some embodiments, secure enterprise mobile services gateway server 172 provides mobile device mobile access to various enterprise network intranet services via enterprise intranet servers 180. In some embodiments, the enterprise mobile services include email, contacts, calendar, enterprise communications, mobile device synchronization services, intranet internal web sites, internal enterprise applications, enterprise file systems, and/or other enterprise networking services. In some embodiments, secure enterprise mobile services gateway server 172 provides optimized mobile application formatting of the enterprise information or synchronization services to synchronize the enterprise database for the above services in an efficient and/or timely manner.

In some embodiments, carrier usage accounting server 154 (e.g., the carrier billing server) communicates (e.g., using secure communication techniques) with service usage reconciliation server function 158 to obtain reconciled service charging reports (e.g., reconciled billing reports) and/or enterprise service usage charging credit reports. In some embodiments, the reconciled service charging reports (e.g., reconciled billing reports) and/or enterprise service usage charging credit reports are processed by carrier usage accounting server 154 and reported as user usage record(s) 155 and/or enterprise usage record(s) 156. For example, mediating such charging and credit reports can be based on various factors as described herein (e.g., by application, time of day/day of week, and/or other factors). For example, the service usage charges that occur due to communication with the servers or services that are part of enterprise network 170, including secure enterprise mobile services gateway server 172 and intranet servers 180, can be counted as an enterprise service usage credit.

In some embodiments, enterprise service design center 194 issues device provisioning instructions for the device credential list from the enterprise services device group, and for each of the credentials, a service control policy is set on enterprise firewall/secure gateway 171 to allow properly authorized devices to reach the desired destinations listed on the enterprise service activity policy set. The provisioning of enterprise firewall/secure gateway 171 with the enterprise service device group credentials and the enterprise service policy set is illustrated in FIG. 1 by the "C" input designator.

In some embodiments, enterprise service design center UI 196 and enterprise service design center 194 are provided as shown in FIG. 1. In some embodiments, enterprise service design center UI 196 and enterprise service design center 194 provide dedicated enterprise control of the network policy provisioning for configuring the service charging, accounting or billing allocation policies for differentiating between enterprise device service usage activities and consumer device service usage activities. Furthermore, in some embodiments, the portion of the enterprise network policy provisioning information that is needed to provision the carrier network elements to implement various techniques for allocating device service usage between enterprise and consumer activities is communicated between enterprise service design center 194 and carrier service design center 190.

A carrier provisioning system is typically not capable of providing direct access to an enterprise network administrator (e.g., carrier or enterprise personnel) for the purpose of provisioning such service charging capabilities. For example, such direct access is often not provided due to concerns related to the risk to the entire network that exists if network provisioning controls are made available to many different administrators to program charging allocation policies for many enterprises. However, as described herein, by isolating the required carrier network provisioning information to a secure service design center UI and policy configuration that only influences a small portion of the carrier network policy provisioning available to the carrier service design center and UI, the risk of causing such problems with the carrier network configuration is significantly reduced. Additionally, the process of performing the carrier side of the necessary provisioning is simplified for an administrator or in some cases can be automated.

The service design centers (e.g., carrier service design center 190 and enterprise service design center 194) are shown in FIG. 1 and various other figures as separate network elements in order to more clearly define and discuss the functions of the service design centers. In some embodiments, enterprise service design center 194 is implemented in various other network elements (e.g., in enterprise network management apparatus, such as management functions of secure enterprise mobile services gateway server 172 or other enterprise network management apparatus). In some embodiments, enterprise service design center 194 is implemented as a securely partitioned and managed device group interface to a subset of the provisioning capabilities of carrier network service design center 190. In some embodiments, enterprise service design center 194 is implemented as a securely partitioned and managed device group interface to a subset of the provisioning capabilities of a cloud-based secure enterprise mobile services network that is run by a centralized enterprise services provider such as an ASP or MVNO. As would be appreciated by one of ordinary skill in the art in view of the various embodiments described herein, enterprise service design center 194 can be implemented using various network and software/hardware architectures while providing for secure and controlled access as described herein.

In some embodiments, the enterprise service design center administrator creates or imports the enterprise service device group credentials and the enterprise service policy set using enterprise service design center UI 196. In some embodiments, the information included in the enterprise service device group credentials and the enterprise service policy set is also communicated from enterprise service design center 194 to carrier service design center 190 via the "C" connection designator as shown. For each of the device credentials listed in the enterprise services device group, carrier service design center 190 determines the information it needs to properly provision carrier gateway/home agent 152 with the proper access policy allowances and service usage charging policies to provide enterprise service access and usage credit for communications from device 110 to the enterprise network destination addresses specified in the enterprise service policy set. Programming of this provisioning information to carrier gateway/home agent 152 is indicated by the "A" information connector from carrier service design center 190 to carrier gateway/home agent 152. In some embodiments, this provisioning (e.g., programming) information sent via provisioning communication link "A" to carrier gateway/home agent 152 includes information to facilitate programming the enterprise device group credentials to: (i) receive the desired access service policy permissions, and (ii) implement the desired service usage accounting/charging policy settings. From the enterprise device group credentials list and the enterprise service activity policy set information provided in "C," carrier service design center 190 determines the information needed to properly provision the service usage reconciliation server function 158. Programming of this provisioning information to service usage reconciliation server function 158 is indicated by the "B" information connector from carrier service design center 190 to service usage reconciliation server function 158. In some embodiments, service usage reconciliation function 158 is part of the carrier network, and service usage reconciliation function 158 implements the charging reconciliation rules to determine how much of the recorded device 110 service usage to place on the user's usage record or service bill (e.g., consumer service usage cost allocation) and how much to place on the enterprise's usage record or service bill (e.g., enterprise service usage cost allocation).

An enterprise may wish to allow consumer services on an end-user device that also allows an employee to access enterprise services over the access network. In some such embodiments, service design center 190 specifies one or more service plans from which the device user can select, and these service plan selection options are configured into a configuration interface on a device software application (e.g., user data app 111, user voice app 112 or service processor framework program 139 (shown, e.g., in FIG. 16)) that allows users to select from one or more service plans, for example, one or more plans with both consumer and enterprise allocations, and/or an enterprise-only service plan. In some embodiments, the configuration interface is made available directly on the device via a device client that provides a service plan selection user interface that displays one or more service plan options configured in service design center 190 or enterprise service design center 194. In some embodiments, the configuration interface is presented directly on the device user interface (UI) when the user attempts an access service usage activity that requires a service plan to be activated or purchased. In some embodiments, the configuration interface presented to the device UI accepts a user response and assists in sending the user response to a carrier network element responsible for provisioning a new user service plan that in turn activates the service plan chosen by the user, possibly after confirming service payment credit for the user or enterprise entity. In some embodiments, the carrier network element responsible for provisioning a new user service plan is carrier usage accounting server 154. In some embodiments, the carrier network element responsible for provisioning a new user service plan is consumer Internet services elements 162. In some embodiments, the carrier network element responsible for provisioning a new user service plan is a carrier gateway/home agent 152. In some embodiments, the carrier network element responsible for provisioning a new user service plan is a billing system or service plan provisioning system. In some embodiments, the configuration interface is made available to the user in the form of a web site that provides a service plan selection user interface that displays one or more service plan options configured in service design center 190 or enterprise service design center 194.

In some embodiments, the initial configuration of device 110 includes one or more enterprise access service plans that allow the user to access certain applications or network destinations associated with enterprise access services, and the user can choose from one or more additional consumer-oriented service plans offered directly on the device UI by a device software application (e.g., user data app 111, user voice app112, or service processor framework program 139) in communication with a carrier network element responsible for provisioning a new user service plan that in turn activates the service plan chosen by the user, possibly after confirming service payment credit for the user or enterprise entity. In some embodiments, these access service plan options are configured using service design center 190. In some embodiments, these access service plan options are configured using enterprise service design center 194.

In some embodiments in which a user has selected a consumer-oriented service plan in addition to an enterprise service plan, service usage reconciliation function 158 distinguishes between data usage within the enterprise service plan and data usage within the consumer-oriented service plan. In some embodiments, the enterprise does not pay for, backhaul, process, or police data usage associated with the consumer-oriented plan. In some embodiments, service usage reconciliation function 158 determines how much data usage by device 110 is enterprise data usage, and how much data usage by device 110 is consumer data usage. In some embodiments, service usage reconciliation function 158 allocates data usage associated with applications and/or services specified by the enterprise service plan to the enterprise, and data usage associated with applications and/or services specified by the consumer-oriented data plan to the consumer.

The various embodiments described herein with respect to FIG. 1 support a variety of techniques for allocating service usage accounting or billing between enterprise services and consumer services. For example, service usage reconciliation function 158 can report measured total usage, measured consumer usage, and/or measured enterprise usage to carrier usage accounting server 154. In some embodiments, the reconciliation service usage function (e.g., provided by service usage reconciliation function 158 and/or another element/function) implements the business rules that determine how much of the service usage to charge the user (e.g., a consumer service usage allocation) and how much of the service usage to charge the enterprise (e.g., an enterprise service usage allocation). In some embodiments, the service usage reconciliation service usage function records total device service usage, records total enterprise service activity service usage, and then subtracts the enterprise service usage from the total device service usage to determine a consumer service usage (e.g., a consumer service usage allocation). In some embodiments, service usage reconciliation function 158 passes on the enterprise service usage as a credit to the consumer account. In some embodiments, this credit is accounted for by the carrier billing the user at a reduced amount according to the credit and billing the enterprise for an increased amount according to the credit. In some embodiments, the credit is accounted for by communicating the credit to the enterprise so the enterprise can reimburse the consumer (e.g., generating an expense reimbursement for the credit to the consumer as an employee or contractor of the enterprise, directly paying the enterprise allocation of the carrier bill for the consumer, and/or various other approaches as described herein). In some embodiments, the credit is reported to the enterprise so that the enterprise can seek payment for the non-enterprise service usage (e.g., consumer service usage allocation) from the consumer (e.g., who can be an employee or contractor of the enterprise).

As another example, an enterprise allocation can also include providing an allowance for a certain level of monthly usage of data and/or voice. In some embodiments, carrier usage accounting server 154 generates a bill for the associated consumer account (e.g., associated with device 110, such as based on the device/user credentials) that reflects the cost of the service usage allocated to consumer service usage and a credit for the cost of service usage allocated to enterprise service usage (e.g., to offset the cost of the enterprise service usage, which can be billed to the enterprise account associated with the enterprise service usage for the device 110). As described herein, based on an allocation of enterprise and consumer service usage, various techniques for billing/charging and generating credits/reporting (e.g., the enterprise can generate the user/employee monthly expense reimbursements to compensate the user/employee for the determined cost of the enterprise service usage and/or other approaches as described herein) can be provided using the network architecture 100 and/or other network architectures, as described herein.

In some embodiments, an enterprise manager manages service usage by specifying an access network service usage limit for a service usage activity (such as data service, voice service, text service, a roaming service, or a more detailed classification of data service such as one or more websites or one or more device applications), and, when that usage limit is reached for a device that is managed by the enterprise manager, a service usage notification message is generated. In some embodiments, the service usage notification message is configured through enterprise service design center UI 196. In some embodiments, the service usage notification message is delivered to device 110. In some embodiments, the service usage notification message is presented to the user via a user interface of device 110.

In some embodiments, the service usage notification message provides information about data usage or the status of device 100. In some embodiments, the service usage notification message is triggered by an event, e.g., detection that device 110 reaches a data usage ceiling, determination that device 110 is roaming, etc. In some embodiments, the service usage notification message provides real-time or near-real-time information about data usage. In some embodiments, the service usage notification message provides information about remaining data usage availability or entitlement. In some embodiments, the service usage notification message comprises a detailed report of enterprise usage by user, user group, device, device group, or location.

In some embodiments, secure enterprise mobile services gateway server 172 is a dedicated enterprise application server for a particular enterprise (e.g., company, government organization, school/university, or another entity). In some embodiments, secure enterprise mobile services gateway server 172 is a carrier or a third party service provider (e.g., a carrier for wireless network services, such as AT&T, Sprint, T-Mobile, and/or various other wireless network service providers/carriers or third party service providers) controlled/managed application server that performs the application server functions for various different enterprises (e.g., as a service/outsourced IT services model). In some embodiments, device 110 is partitioned (e.g., associated with a particular enterprise/MVNO partition and associated enterprise account) based on device credentials and/or VPN to determine a service plan for managing (e.g., to determine how to allocate enterprise/consumer service usage for) device 110. In some embodiments, based on the partition determination of device 110, and the associated service plan for managing device 110, appropriate service usage monitoring and classification can be determined for providing an enterprise and consumer allocation for service usage activities of device 110 based on the associated service plan(s).

For example, by programming the business rules in service usage reconciliation function 158 that determine the service usage accounting allocation between enterprise services and consumer services, many approaches can be provided for creating a service that provides an enterprise service to a device when the device user has selected a consumer service plan or elected to pay for a consumer service plan. As an example, if the device user has chosen a service plan, the enterprise service usage accounted for in enterprise usage record 156 can be billed to the enterprise rather than the consumer. As another example, if the device user has chosen a service plan, the consumer service usage accounted for in user usage record 155 can be billed to the device user rather than the enterprise. As yet another example, if the device user has selected a service plan, the enterprise service usage can be communicated to the enterprise (e.g., and/or the device user), and the enterprise can issue a reimbursement to the device user for the enterprise portion of the user's bill, or pay the carrier directly for a portion of the user's bill, thus reducing the amount the user must pay. In some embodiments, the business rules in service usage reconciliation function 158 are programmed to provide the device user with a certain amount of service usage that may or may not be directly related to enterprise services.

For example, the user can be allocated a certain amount of general purpose browsing that includes network destinations that are not specified in the enterprise service activity policy set. In some embodiments, there is a cap to such general purpose browsing, and carrier service design center 190 can provision the network and/or the device to alert the user regarding how much of the enterprise sponsored browsing remains or when the enterprise sponsored Internet browsing cap is reached or exceeded. In some embodiments, the business rules in service usage reconciliation function 158 are programmed to deduct the service usage associated with the enterprise sponsored general purpose browsing, up to the specified cap, from the user's bill. In this way, the user can be allocated an allowance for services that either the enterprise sponsors to account for enterprise related service usage that may not be included in the enterprise service activity policy set or that the enterprise simply desires to sponsor to reduce the device user's consumer service plan billing.

In a similar manner, services other than browsing that are not necessarily associated with enterprise service usage can also be sponsored by the enterprise by properly provisioning the business rules in service usage reconciliation function 158. For example, a catch-all enterprise sponsored allowance (e.g., or cap) for "bulk" internet usage can be provided. The fact that the user is provided with such an allowance may be pointed out to the user if the user disputes how much of his or her device service usage cost should be covered by the enterprise and how much the user should cover personally. Another example is to provide a certain amount of voice minutes to any phone number or to phone numbers not in the enterprise service activity policy set.

In some embodiments, the business rules in service usage reconciliation function 158 are provisioned so that the enterprise specifically does not allow, sponsor, or pay for certain device service usage activities. In some embodiments, these service usage activities can include access to network destinations, applications, or services that pose security risks to enterprise data stored on device 110 or pose security risks to enterprise network 170. In some embodiments, these activities include access to network destinations, applications, or services that the enterprise does not wish to sponsor or that are potentially associated with user activity that violates enterprise policy or laws. For example, the business rules may be configured to allow only transmission of business data on approved networks, e.g., excluding free or unknown WiFi hotspots, or only when device 110 is connected to the network via a VPN. In some embodiments, such service usage activities that violate enterprise security policies or other service usage policies are blocked by the business rules programmed into the network or the device as specified in the enterprise service activity policy set.

By programming the business rules in service usage reconciliation function 158 that determine the service usage accounting allocation between enterprise services and consumer services, many approaches can be provided for creating a service that provides an enterprise service to a device when the device user has not selected a consumer service plan or elected to pay for a consumer service plan. For example, if the device user has not chosen to select or pay for a consumer service plan, carrier gateway/home agent 152 can be programmed to allow service usage for the enterprise service policy set but deny all other access until the user chooses a consumer service plan. In some embodiments, when/if the consumer chooses a consumer service plan then access would be expanded beyond just the enterprise services, because when the service plan activation occurs, consumer service policy set in carrier gateway/home agent 152 will be updated to allow service (e.g., as the carrier administrator user of carrier service design center 190 programs a different set of consumer service access policies for each consumer service plan that can be chosen). In some embodiments, the user is allocated a certain amount of general purpose data access or voice minutes as described above even though the user does not have a consumer data plan. Another example is to provide the user with a certain monetary allowance that is sponsored by the enterprise rather than a service usage amount.

Although enterprise service design center 194 is shown provisioning mobile server usage counter 179 (e.g., shown in FIG. 5) and enterprise firewall/secure gateway 171, it should be understood that not all device provisioning connections as shown from secure enterprise mobile services gateway/server 172 to device 110 are shown for device functions including secure mobile services application access, communication link provisioning (e.g., cryptographic encryption keys, VPN settings, and various other security/communication provisioning), security programs, service control programs, and program settings for enterprise service applications, such as email, calendar, contacts, mobile synchronization services, and traffic control. As shown, the labeled provisioning connections are provided as exemplary embodiments to assist in identifying the network elements that are provisioned for network access control and network service usage charging reporting. Those of ordinary skill in the art will appreciate that these additional device provisioning functions are not necessarily specifically called out with provisioning connection labels in each figure, and it will be apparent to one of ordinary skill in the art which of these device provisioning functions and connections are needed from enterprise service design center 194 and device 110. It will also be apparent to one of ordinary skill in the art in view of the various embodiments described herein that the various device provisioning connections and device element programming configurations needed to provision these device functions can be managed by secure enterprise mobile services gateway/server 172 via a device management communications link. It will also be apparent to one of ordinary skill in the art that, in some embodiments, the flow of policy provisioning information for the various device elements that participate in establishing service usage monitoring and reporting policies or service access control policies starts in enterprise service design center 194 and flows through secure enterprise mobile services gateway/server 172 over a device management link, and through the device management link on device 110 to the device 110 functional elements that need to be provisioned. In various embodiments described herein, the device elements that are provisioned in some embodiments to set up enterprise services, service usage monitoring and reporting policies, or service usage access control policies include one or more of enterprise data application 124, enterprise voice application 126, secure mobile enterprise application environment 120 (shown, e.g., in FIG. 8), secure network interface 128 (shown, e.g., in FIG. 8), secure enterprise mobile services application 125 (shown, e.g., in FIG. 13), virtual machine #2 secure enterprise application environment 118 (shown, e.g., in FIG. 14), enterprise application secured hardware execution partition 106 (shown, e.g., in FIG. 15), device service usage monitor 119 (shown, e.g., in FIG. 17), service processor framework program 139 (shown, e.g., in FIG. 16), and/or service processor kernel program 138 (shown, e.g., in FIG. 16).

In some embodiments, service usage reconciliation function 158, or secure enterprise mobile services gateway/server 172, or another similar network function, is programmed to review traffic usage patterns of mobile device 110 for the purpose of determining if the device may have fallen into unauthorized hands or if the device secure enterprise communications and data management software may have been hacked or tampered with in a way that endangers enterprise security or causes the enterprise to be billed for usage that is not enterprise usage. For example, service usage reconciliation function 158 (e.g., or secure enterprise mobile services gateway/server 172) can be programmed to monitor "bulk" enterprise service usage for the enterprise device group and trigger a fraud detection alert for a device that exhibits enterprise usage that is higher than a pre-determined "normal" limit. As another example, service usage reconciliation function 158 can be programmed to monitor "bulk" enterprise service usage for the enterprise device group and trigger a fraud detection alert for a device that exhibits enterprise usage access patterns that are determined to be outside of "normal" limits. Examples of usage patterns can include usage as a function of time of day, duration of usage, usage above a certain limit for a subset of service usage activities, and/or usage above a certain limit for all service usage activities.

In some embodiments, enterprise service design center 194 is configured to receive or accept a specification for an access network service usage limit (e.g., a service amount in minutes, bytes, or cost) for a service usage activity (such as a data service, a voice service, a text service, a roaming service, or a more detailed classification of a data service, such as one or more websites or one or more device applications), and the service usage limit is applied to one or more devices 110 or device groups (or users or user groups) managed by enterprise service design center 194. In some embodiments, enterprise service design center 194 is further configured to receive service usage records for device 110, which is managed by enterprise service design center 194, from a network element configured to monitor and report device 110 service usage (e.g., carrier usage accounting server 154, enterprise firewall/security gateway 171, or another network element), and when the usage limit is reached, to generate a service usage notification message. In some embodiments, enterprise service design center 194 is configured to deliver the service usage notification message to enterprise service design center UI 196. In some embodiments, enterprise service design center 194 is configured to deliver the service usage notification message to a software application of device 110 (e.g., service processor framework program 139 or user data app 111) for presentation to the device user through a user interface of device 110.

In some embodiments, enterprise service design center 194 is configured to receive or accept a specification for an access network service notification event consisting of a network access pattern achieved or attempted by device 110 that belongs to a device group (or user group) managed by enterprise service design center 194, wherein the network access pattern is access attempted or achieved by one or more pre-defined device applications, or access attempted or achieved by device 110 to one or more network destinations, websites or network servers. In some embodiments, enterprise service design center 194 is further configured to receive service usage records for device 110, which is managed by enterprise service design center 194, from a network element configured to monitor and report device 110 service usage (e.g., carrier usage accounting server 154, enterprise firewall/security gateway 171, or another network element), and when the service usage indicates that the network access pattern has occurred, enterprise service design center 194 is further configured to send a notification message to enterprise service design center UI 196.

Figure 2:
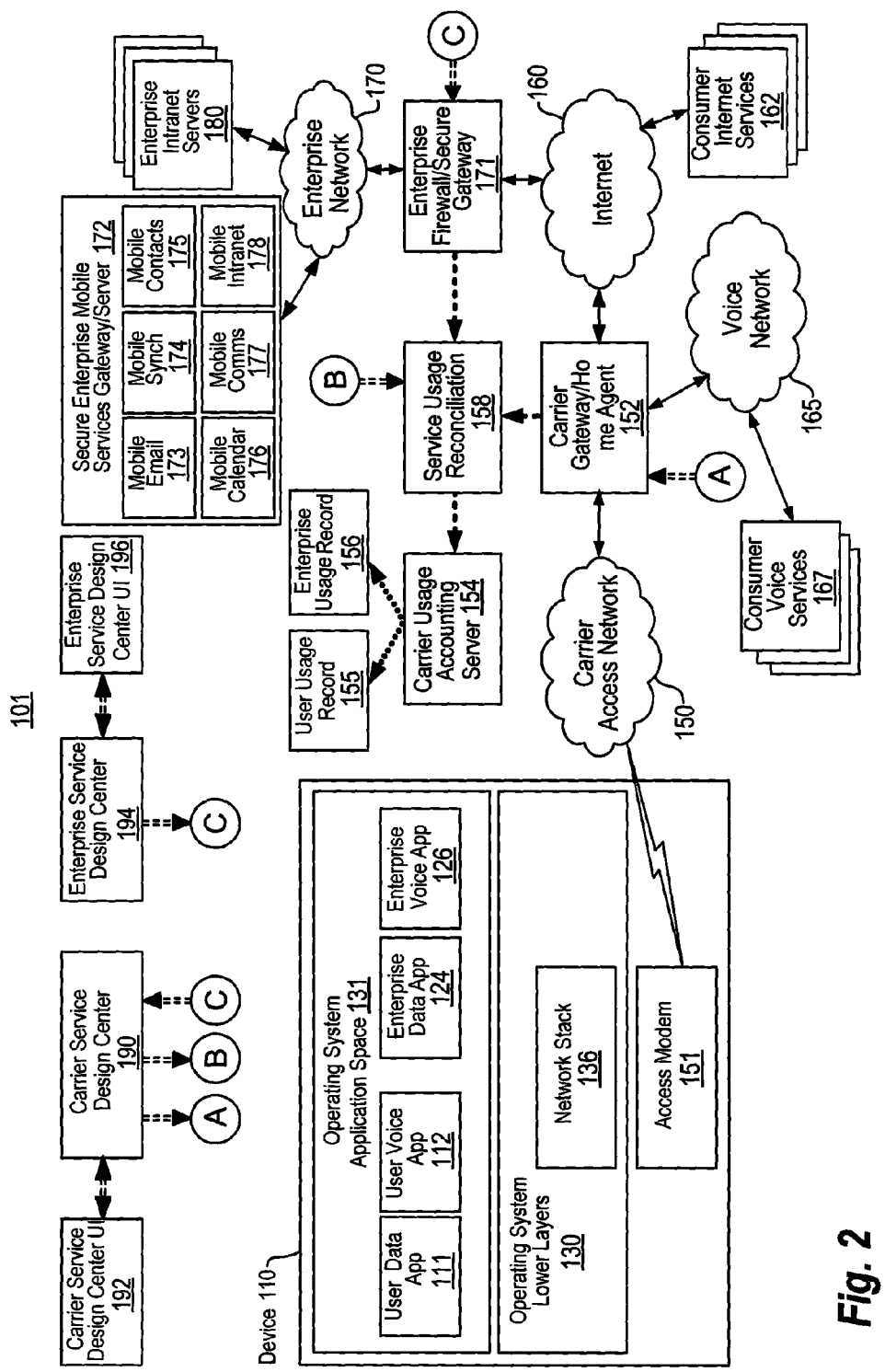
FIG. 2 illustrates a functional diagram of another network architecture for providing enterprise and consumer billing allocation for wireless communication device service usage activities in accordance with some embodiments.

Carrier Managed Billing Allocation with Service Usage Monitoring in Carrier Network and Enterprise Firewall/Gateway FIG. 2 illustrates a functional diagram of another network architecture 101 for providing enterprise and consumer billing allocation for wireless communication device service usage activities in accordance with some embodiments. Network architecture 101 of FIG. 2 is similar to network architecture 100 of FIG. 1, except that in network architecture 101 of FIG. 2, service usage reconciliation function 158 receives service usage information from enterprise firewall/secure gateway 171 in addition to carrier gateway/home agent 152. This allows for various techniques that augment the capabilities of carrier gateway/home agent 152. For example, in networks in which it is impractical or infeasible for carrier gateway/home agent 152 to keep track of the service usage accounting allocation between the enterprise service policy set and consumer services for the devices in the device group, service usage reconciliation function 158 can receive total device service usage from carrier gateway/home agent 152, and receive the enterprise service usage from enterprise firewall/secure gateway 171. With this information, service usage reconciliation service usage function 158 can perform the allocation between enterprise service usage and consumer service usage without any detailed service usage reports from carrier gateway/home agent 152.

There are several reasons that the carrier network may not support numerous enterprise service customers with an enterprise/consumer allocation architecture that requires carrier gateway/home agent 152 to perform the necessary traffic classification or service usage classification as in the FIG. 1 embodiment. For example, these reasons can include: (i) carrier gateway/home agent 152 does not have the detailed service usage classification capability (e.g., deep packet inspection function(s)) required to allocate service usage between the enterprise service policy set and consumer services for the devices in the device group, (ii) carrier gateway/home agent 152 is capable of performing the service monitoring required but can only do it for a limited number of devices (e.g., scaling issues), and/or (iii) there are too many device groups being managed by enterprise partners of the carrier creating a situation where the number of specialized profiles that must be supported by carrier gateway/home agent 152 is larger than can be accommodated by the profile management capacity of the gateway system (e.g., scaling issues). As would now be apparent to those of ordinary skill in the art in view of the embodiments described herein, there are other reasons that can make it advantageous to provide the enterprise service usage from the enterprise network.

In some embodiments, provisioning with the service design centers and UIs for the embodiment shown in FIG. 2 is similar to that of FIG. 1. In some embodiments, the billing allocation capabilities of the two embodiments are similar if carrier gateway/home agent 152 is fully capable of differentiating service usage between the enterprise service policy set and the consumer services, but if not, then as discussed above, the billing allocation capabilities of the FIG. 2 embodiment can be preferable in such environments.

Because the enterprise service usage is monitored by the enterprise network elements in the embodiments depicted in FIG. 2, various service accounting or billing policies are available to the enterprise or carrier. For example, the amount of service usage resulting from enterprise services that occur during roaming conditions can be accounted for even when the carrier network does not receive detailed classification of service usage from roaming network partners. The business rules programmed into service usage reconciliation function 158 that are determined by the enterprise service activity policy set can break-out enterprise-service-related roaming charges separately from consumer-service-related roaming charges so that the enterprise-service-related roaming charges are sponsored or paid by the enterprise and consumer roaming service usage activities are not subsidized or are only partially subsidized. In addition, in some embodiments, secure enterprise mobile services gateway/server 172 includes the capability to determine if device 110 is roaming so that the access control policies specified in the enterprise service activity policy set can include modification or denial of access to enterprise network 170 services allowed by enterprise firewall/secure gateway 171 or secure enterprise mobile services gateway/server 172 during roaming conditions even though the access is not controlled by the carrier home network.

In some embodiments, an active network detection function is included on the device to assist the network policy enforcement elements to determine the type of network the device is connected to or to determine if the device is on a home or roaming network, as described herein. For example, the service usage policy allowances provided by the enterprise service activity policy set can be programmed so that the allowances change depending on the availability of a particular network or set of networks, the time of day, the congestion state of a network, or the current cost of service on the network. For example, if the carrier home network is not available and only a roaming network is available, the allowance may be decreased or removed. As another example, if a certain network type is not available but another network type is (e.g., 2G is available instead of 3G or 3G is available instead of 4G), then the allocation can be reduced. As yet another example, if a variable charging policy is in place with the carrier for access when the network is busy or during certain times of day, then the enterprise sponsored allowance can be reduced during times of higher charging.

Figure 3:
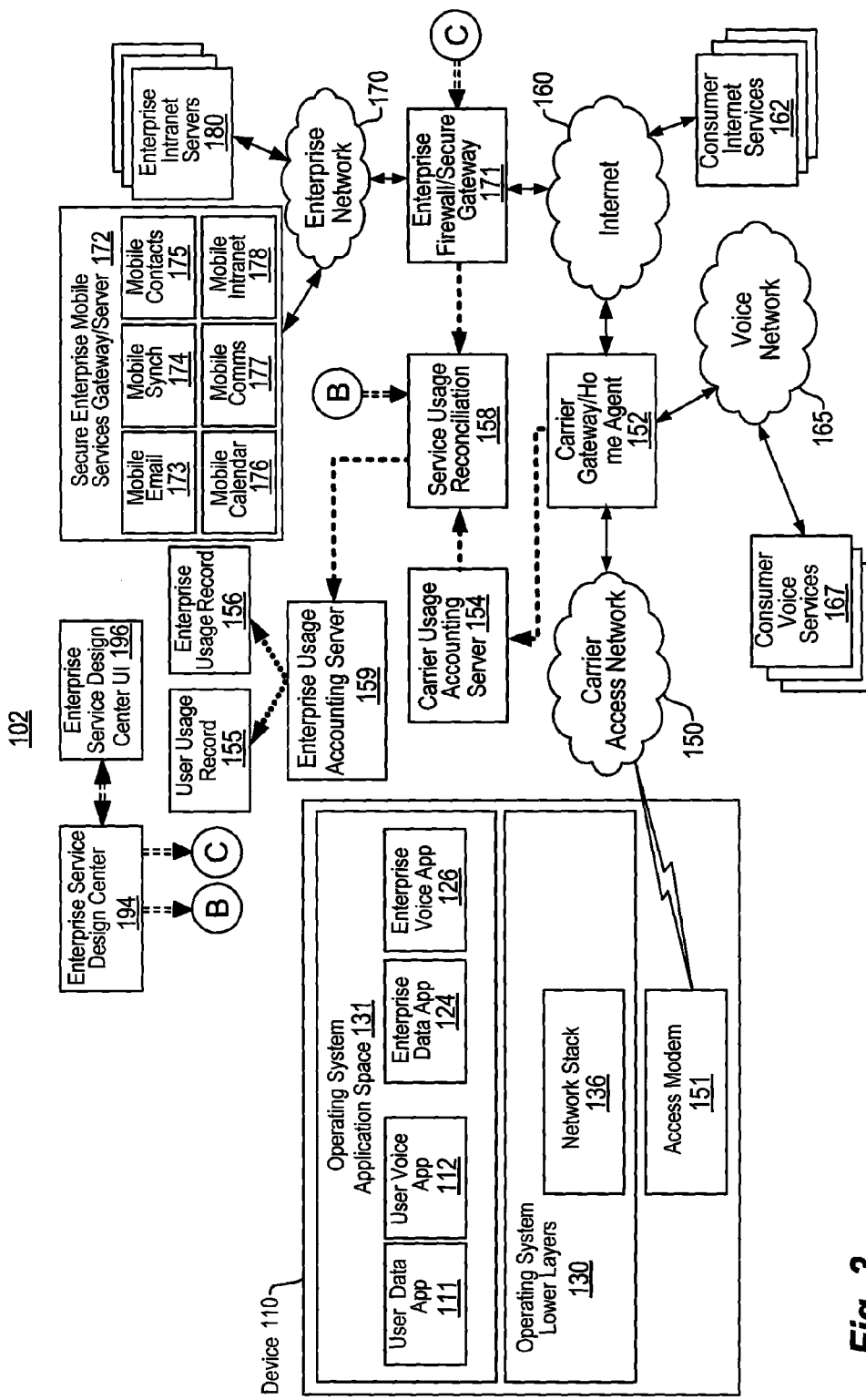
FIG. 3 illustrates a functional diagram of another network architecture for providing enterprise and consumer billing allocation for wireless communication device service usage activities in accordance with some embodiments.

Enterprise Managed Billing Allocation with Service Usage Monitoring in Carrier Network and Enterprise Firewall/Gateway FIG. 3 illustrates a functional diagram of another network architecture 102 for providing enterprise and consumer billing allocation for wireless communication device service usage activities in accordance with some embodiments. Network architecture 102 of FIG. 3 is similar to network architecture 101 of FIG. 2, except that in network architecture 102 of FIG. 3, service usage reconciliation function 158 receives overall device service usage information from carrier usage accounting server 154 and also receives enterprise device service usage information from enterprise firewall/secure gateway 171. In some embodiments, there is no interaction between the provisioning of the carrier network and the provisioning of the enterprise network, and it is assumed that service usage reconciliation function 158 and enterprise usage accounting server 159 are both under the control of the enterprise administrator. This approach allows for various techniques that provide for enterprise allocation of consumer service usage and enterprise service usage without the need to interface to the carrier network other than to get the overall usage summary. For example, service usage reconciliation function 158 can receive total or "bulk" usage from carrier usage accounting server 154, receive enterprise service usage from enterprise firewall/secure gateway 171, and determine the amount of consumer service usage, enterprise service usage, and/or an enterprise service usage credit.

In some embodiments, provisioning with the service design centers and UIs for the embodiment shown in FIG. 3 is similar to that of FIG. 1 except that no provisioning of enterprise service parameters is required in the carrier network. The billing allocation capabilities are also similar if carrier gateway/home agent 152 is fully capable of differentiating service usage between the enterprise service policy set and the consumer services, but if not, then as discussed above, the billing allocation capabilities of the FIG. 3 embodiment can be preferable in such environments. For example, using network architecture 102, the enterprise can deal directly with its employees without the need to bring the carrier into the consumer-versus-enterprise allocation process. As an example, the enterprise could have a policy in which consumers purchase their own mobile device services and then get credit for enterprise mobile device services at the end of each billing period. This credit can be provided back to the employee in the form of an expense reimbursement or an increase in their next paycheck.

Figure 4:
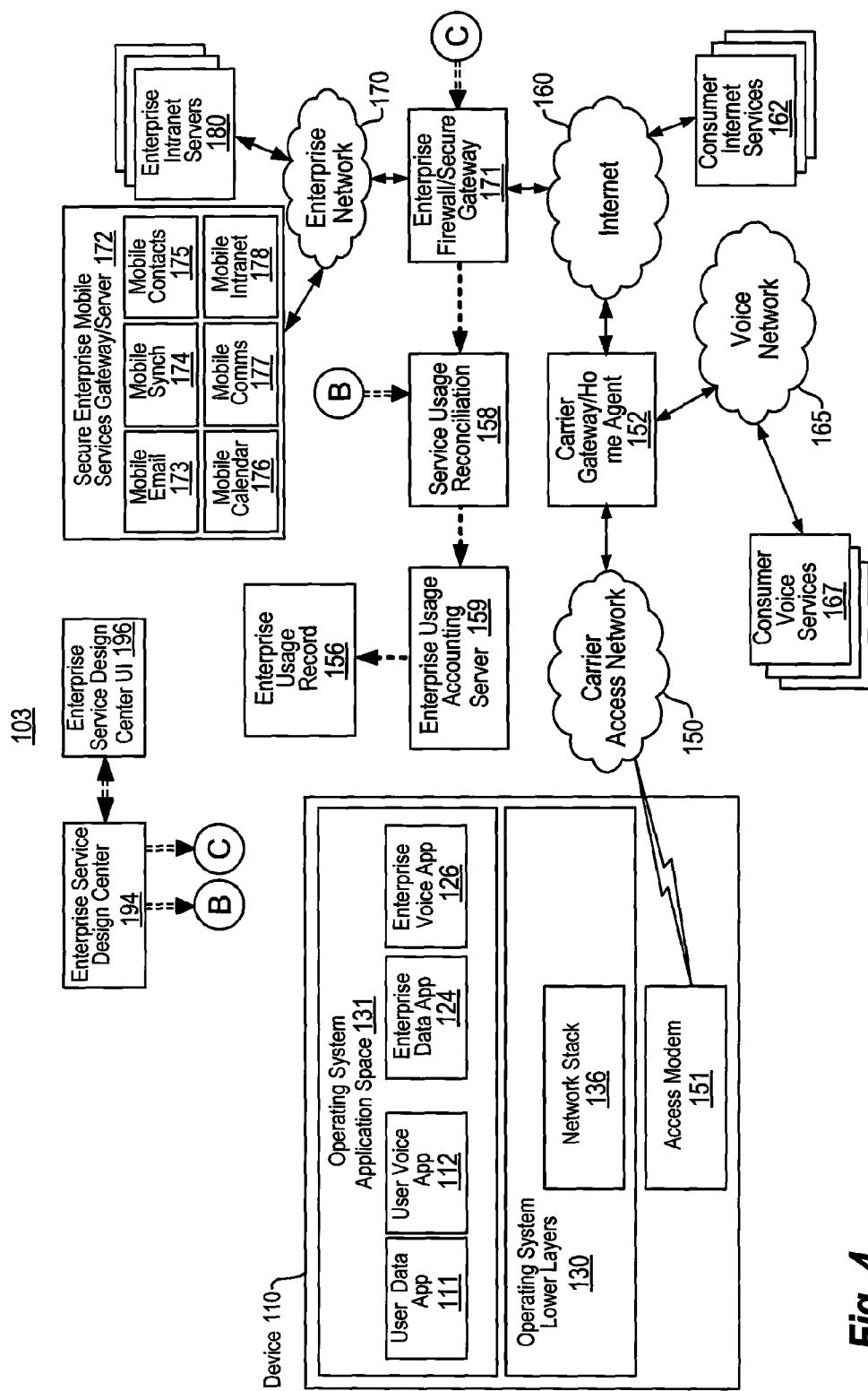
FIG. 4 illustrates a functional diagram of another network architecture for providing enterprise and consumer billing allocation for wireless communication device service usage activities in accordance with some embodiments.

Enterprise Usage Credit with Service Usage Monitoring in Enterprise Firewall/Gateway FIG. 4 illustrates a functional diagram of another network architecture 103 for providing enterprise and consumer billing allocation for wireless communication device service usage activities in accordance with some embodiments. Network architecture 103 of FIG. 4 is similar to network architecture 102 of FIG. 3, except that in network architecture 103 of FIG. 4, service usage reconciliation server function 158 receives no overall device service usage information from the carrier network. As shown in FIG. 4, the source of service usage information is enterprise network 170 (e.g., via the enterprise firewall/secure gateway 171). In some embodiments, there is no interaction between the provisioning of the carrier network and the provisioning of the enterprise network, and it is assumed that service usage reconciliation function 158 and enterprise usage accounting server 159 could both be under the control of the enterprise administrator. For example, network architecture 103 of FIG. 4 can be less dependent on the carrier than network architecture 102 of FIG. 3 in that no billing information feed is provided. Using various techniques described herein, an enterprise service usage credit can be determined, and the determined enterprise service usage credit can be reimbursed to the device user.

Figure 5:
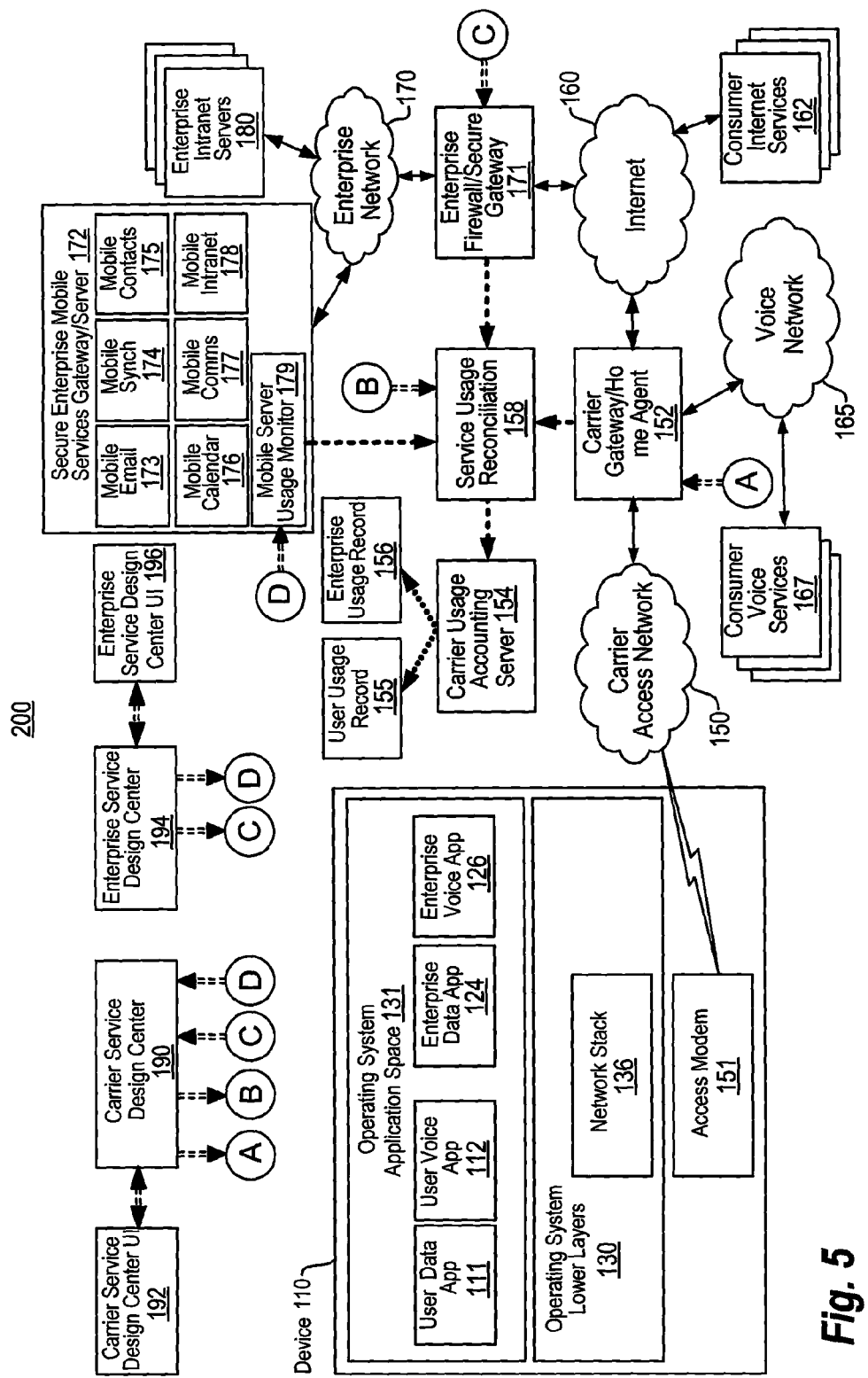
FIG. 5 illustrates a functional diagram of another network architecture for providing enterprise and consumer billing allocation for wireless communication device service usage activities in accordance with some embodiments.

Carrier Managed Billing Allocation with Service Usage Monitoring in Carrier Gateway/Home Agent and Enterprise Mobile Services Gateway Server FIG. 5 illustrates a functional diagram of another network architecture 200 for providing enterprise and consumer billing allocation for wireless communication device service usage activities in accordance with some embodiments. Network architecture 200 of FIG. 5 is similar to network architecture 101 of FIG. 2, except that in network architecture 200 of FIG. 5, secure enterprise mobile services gateway/server 172 includes mobile server usage monitor 179, and the enterprise service usage reports from this function are sent to service usage reconciliation function 158 instead of usage reports being sent from enterprise firewall/secure gateway 171. In some embodiments, various specialized needs of monitoring, recording, and reporting enterprise service usage are confined to the special-purpose secure enterprise mobile services gateway/server 172 rather than requiring the often more general-purpose enterprise firewall/secure gateway 171 to perform these functions.

Figure 6:
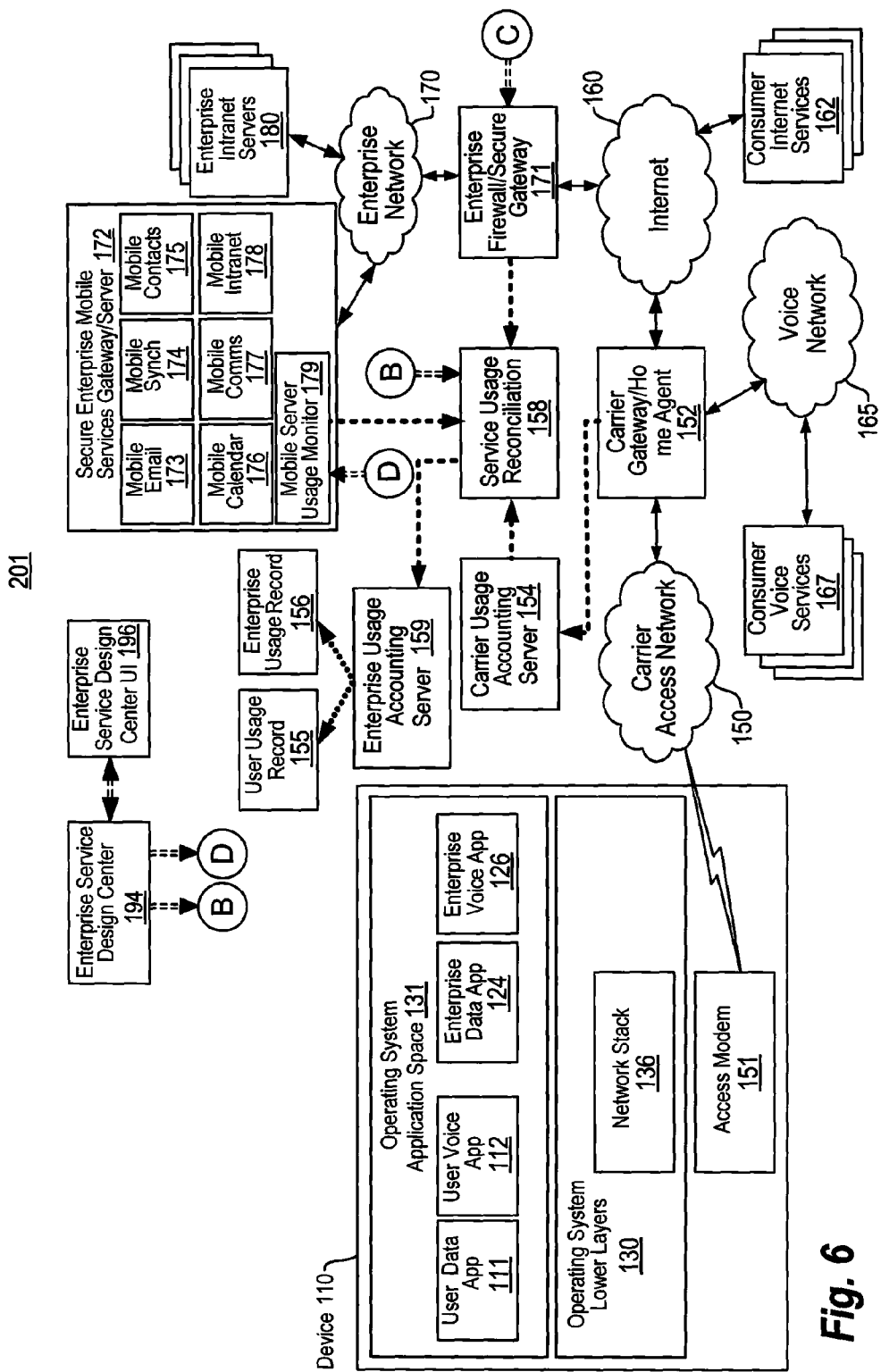
FIG. 6 illustrates a functional diagram of another network architecture for providing enterprise and consumer billing allocation for wireless communication device service usage activities in accordance with some embodiments.

Enterprise Managed Billing Allocation with Service Usage Monitoring in Carrier Network and Enterprise Mobile Services Gateway Server FIG. 6 illustrates a functional diagram of another network architecture 201 for providing enterprise and consumer billing allocation for wireless communication device service usage activities in accordance with some embodiments. Network architecture 201 of FIG. 6 is similar to network architecture 102 of FIG. 3, except that in network architecture 201 of FIG. 6, secure enterprise mobile services gateway/server 172 includes mobile server usage monitor 179, and the enterprise service usage reports from this function are sent to service usage reconciliation function 158 instead of usage reports being sent from enterprise firewall/secure gateway 171. For example, this approach allows for the specialized needs of monitoring, recording, and reporting enterprise service usage to be performed by the special-purpose secure enterprise mobile services gateway/server 172 rather than requiring the often more general-purpose enterprise firewall/secure gateway 171 to perform such functions.

Figure 7:
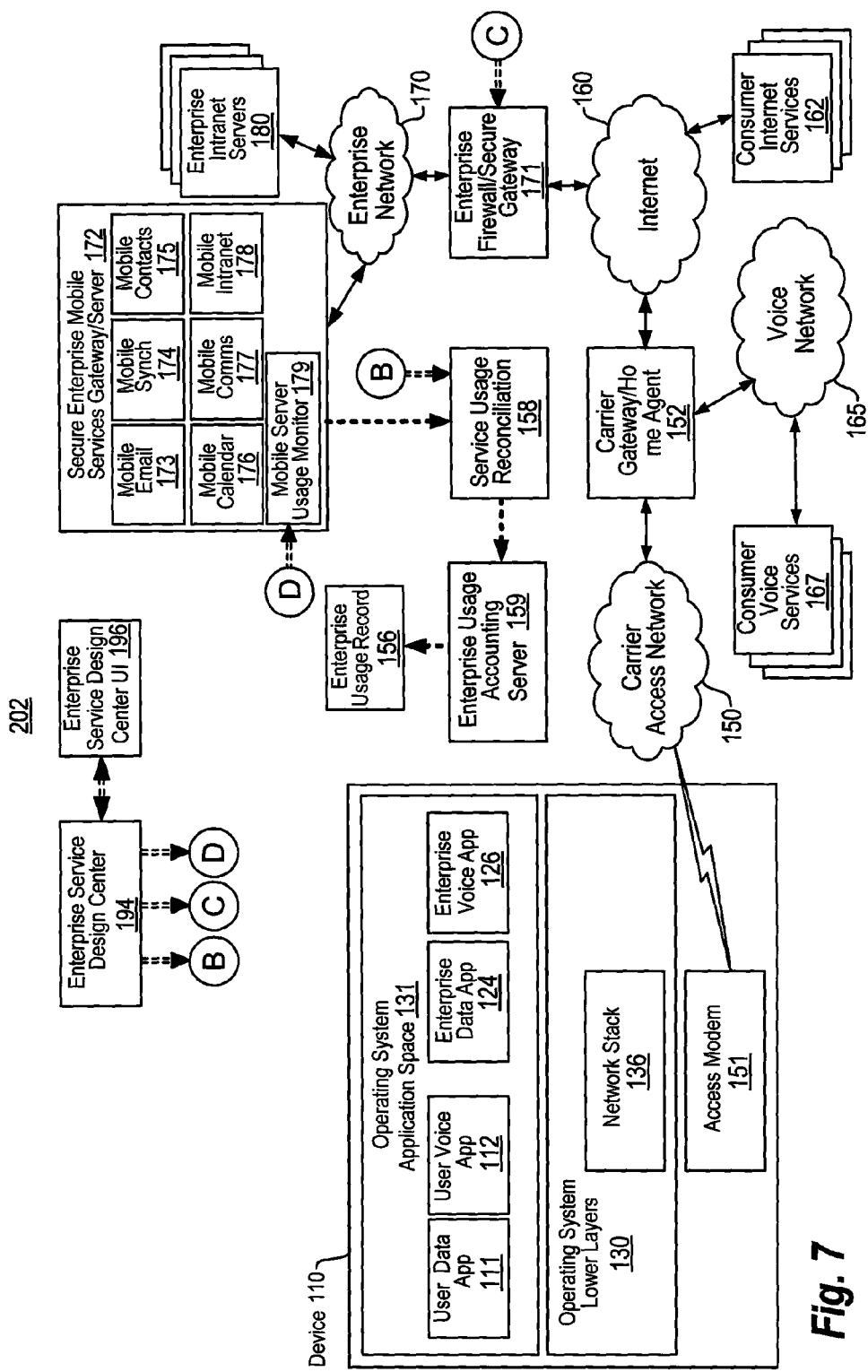
FIG. 7 illustrates a functional diagram of another network architecture for providing enterprise and consumer billing allocation for wireless communication device service usage activities in accordance with some embodiments.

Enterprise Usage Credit with Service Usage Monitoring in Enterprise Mobile Services Gateway Server FIG. 7 illustrates a functional diagram of another network architecture 202 for providing enterprise and consumer billing allocation for wireless communication device service usage activities in accordance with some embodiments. Network architecture 202 of FIG. 7 is similar to network architecture 103 of FIG. 4, except that in network architecture 202 of FIG. 7, secure enterprise mobile services gateway/server 172 includes mobile server usage counter 179, and the enterprise service usage reports from this function are sent to service usage reconciliation function 158 instead of usage reports being sent from enterprise firewall/secure gateway 171. For example, this approach allows for the specialized needs of monitoring, recording and reporting enterprise service usage to be performed by the special-purpose secure enterprise mobile services gateway/server 172 rather than requiring the often more general-purpose enterprise firewall/secure gateway 171 to perform such functions.

Figure 8:
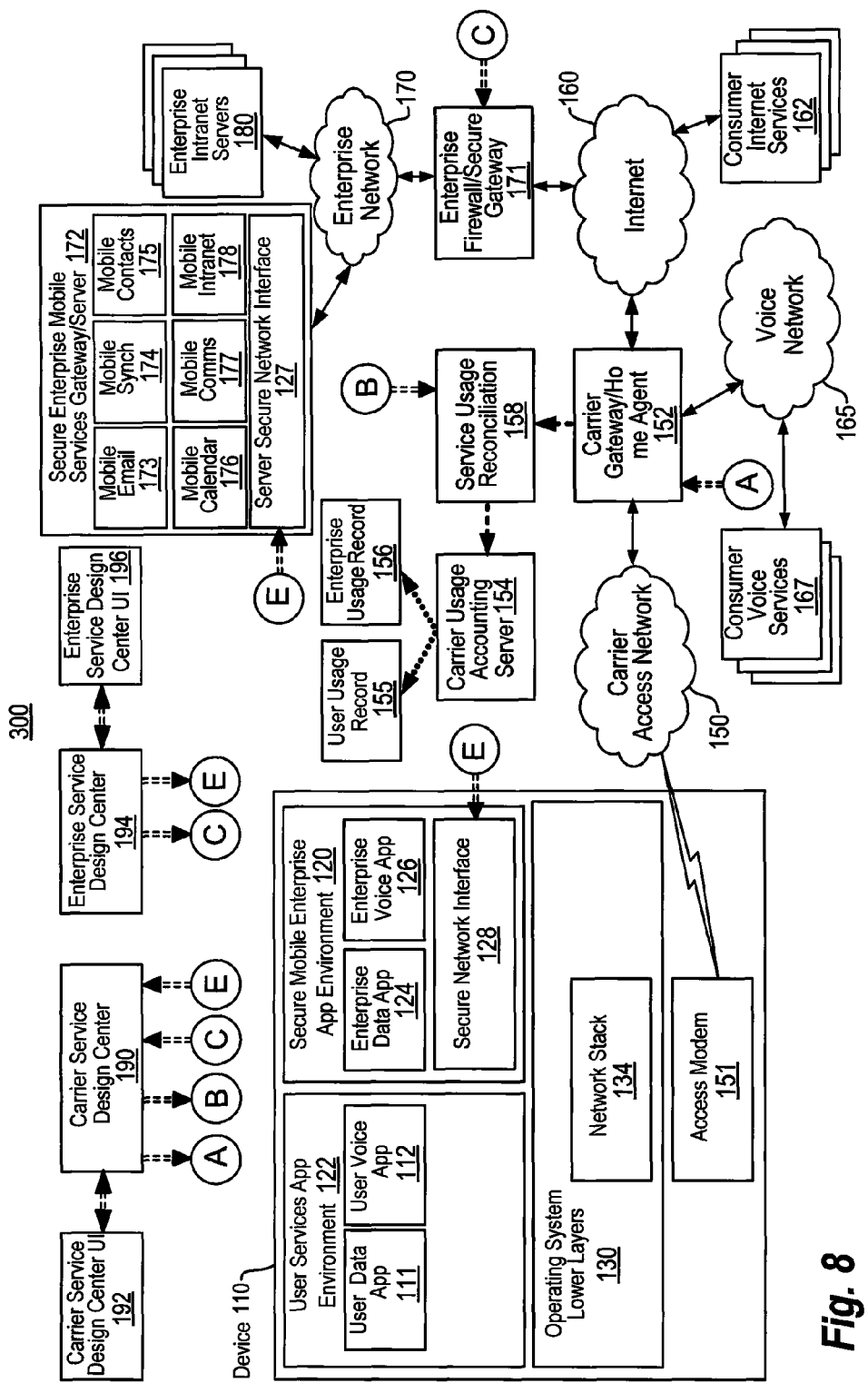
FIG. 8 illustrates a functional diagram of another network architecture for providing enterprise and consumer billing allocation for wireless communication device service usage activities in accordance with some embodiments.

Carrier Managed Billing Allocation with Device Mobile Enterprise Services Application Environment and Service Usage Monitoring in Carrier Network FIG. 8 illustrates a functional diagram of another network architecture 300 for providing enterprise and consumer billing allocation for wireless communication device service usage activities in accordance with some embodiments. As shown, secure mobile enterprise application environment 120 and secure network interface 128 within secure mobile enterprise application environment 120 are included in device 110. Also, server secure network interface 127 is included in secure enterprise mobile services gateway/server 172. In some embodiments, secure mobile enterprise application environment 120 protects sensitive enterprise information that is stored on device 110 (e.g., email text and downloads, calendar information, contacts, intranet data, or any other enterprise data) and provides a secure communication channel function to allow for authentication with server secure network interface 127 on secure enterprise mobile services gateway/server 172. As also shown, a user services application environment in device 110 includes various user applications, such as user data application 111 and user voice application 112.

In some embodiments, provisioning of the various network architecture elements to facilitate the allocation between enterprise service usage accounting or billing and consumer service usage accounting or billing is established as follows. The device portion of secure network interface 128 and the enterprise server portion of server secure network interface 127 are provisioned with connection "E." In some embodiments, this provisioning operation with the connection labeled "E" includes programming information for secure network interface 128 to direct enterprise network 170 access traffic associated with application functions running in secure mobile enterprise application environment 120 to enterprise network 170 destinations that are to be sponsored (and, in some embodiments, possibly intermediate network routes) according to the enterprise services policy set, including, for example, the addresses (e.g., IP, IP/port or other higher layer address identifiers) of secure enterprise mobile services gateway/server 172 or enterprise intranet servers 180. In some embodiments, the provisioning operation designated with the connection label "E" also establishes the parameters required for the secure communication of information between secure network interface 128 and server secure network interface 127. In some embodiments, this provisioning step sets up the policies for the authentication process, data encryption, and cryptographic key exchange processes take place to establish secure communication between secure mobile enterprise application environment 120 and secure enterprise services gateway/server 172.

In some embodiments, the enterprise network destinations that are to be sponsored according to the enterprise services policy set identified by provisioning connection "E" are also communicated to carrier service design center 190. For example, this allows carrier service design center 190 to determine and transmit the proper provisioning information to establish the access control policies or service usage accounting policies for these aspects of the enterprise services policy set. Carrier service design center provisioning connections "A" communicate the provisioning information (programming) to carrier gateway/home agent 152. Carrier service design center provisioning connections "B" communicate the provisioning information (programming) to service usage reconciliation function 158.

In some embodiments, the provisioning operation associated with the provisioning connection label "C" provisions enterprise firewall/secure gateway 171 to admit devices 110 with device credentials or application credentials that belong to the desired enterprise services device group associated with the enterprise service policy set. In some embodiments, the provisioning information labeled as "C" includes enterprise network 170 destinations that are to be sponsored (and, in some embodiments, possibly intermediate network routes) according to the enterprise services policy set. In some embodiments, the provisioning information labeled as "C" includes only the network destinations for secure enterprise mobile services gateway/server 172, and devices 110 are not allowed access to other parts of enterprise network 170.

In some embodiments, network architecture 300 for providing enterprise and consumer billing allocation for wireless communication device service usage activities includes executing an enterprise application as a secure enterprise data application 124 in secure mobile enterprise application environment 120 of device 110 in which the secure applications are in network communication (e.g., secure network communication, such as via a virtual private network (VPN) or other secure network communication techniques) with secure enterprise mobile services gateway/server 172 (e.g., executing an enterprise server side of the enterprise authorized/sponsored applications, such as an enterprise email server, an enterprise calendar server, an enterprise contacts server, and/or an enterprise network access server) of the enterprise. In some embodiments, the secure enterprise mobile services gateway/server 172 performs application monitoring that includes counting application service usage (e.g., bytes used in communicating with the device's execution of secure enterprise application 124). In some embodiments, secure enterprise mobile services gateway/server 172 performs application monitoring that further includes classifying application service usage (e.g., classifying secure enterprise application 124 by application/service usage activity such as based on application name or using signed code/hash techniques, by time of day/day of week, enterprise server, destinations, enterprise intranet, and/or other factors).

Figure 9:
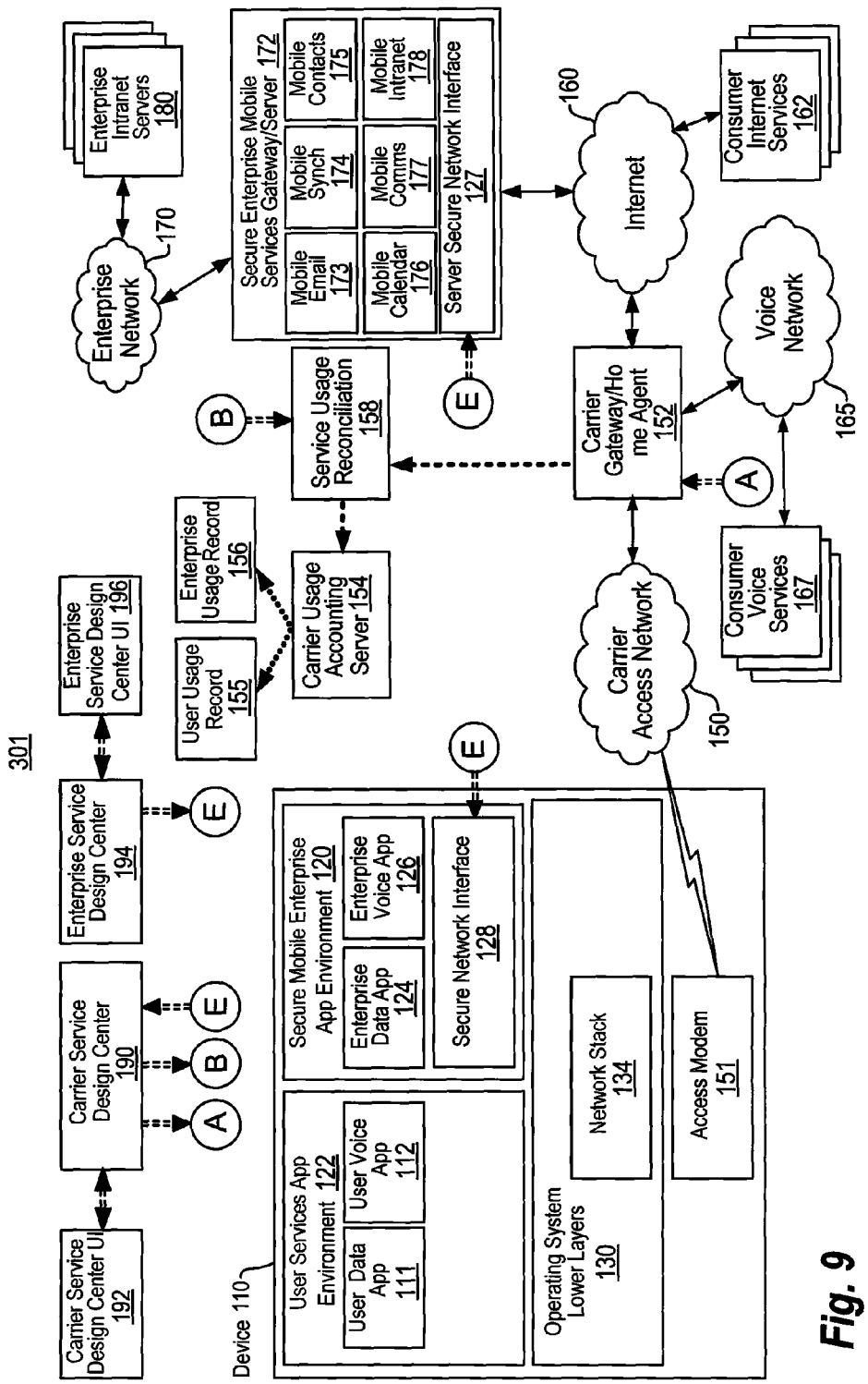
FIG. 9 illustrates a functional diagram of another network architecture for providing enterprise and consumer billing allocation for wireless communication device service usage activities in accordance with some embodiments.

Carrier Managed Billing Allocation with Device Mobile Enterprise Services Application Environment and Mobile Services Gateway Server with Service Usage Monitoring in Carrier Network FIG. 9 illustrates a functional diagram of another network architecture 301 for providing enterprise and consumer billing allocation for wireless communication device service usage activities in accordance with some embodiments. Network architecture 301 of FIG. 9 is similar to network architecture 300 of FIG. 8, except that in network architecture 301 of FIG. 9, secure enterprise mobile services gateway/server 172 is located between the Internet 160 and enterprise network 170. For example, this approach allows for server secure network interface 127 of secure enterprise mobile services gateway/server 172 to restrict access to enterprise network 170 and enterprise intranet servers 180 based on device authentication and/or various other security techniques (e.g., secure access, authentication, and/or communication techniques), as would be apparent to one of ordinary skill in the art in view of the various embodiments described herein.

Figure 10:
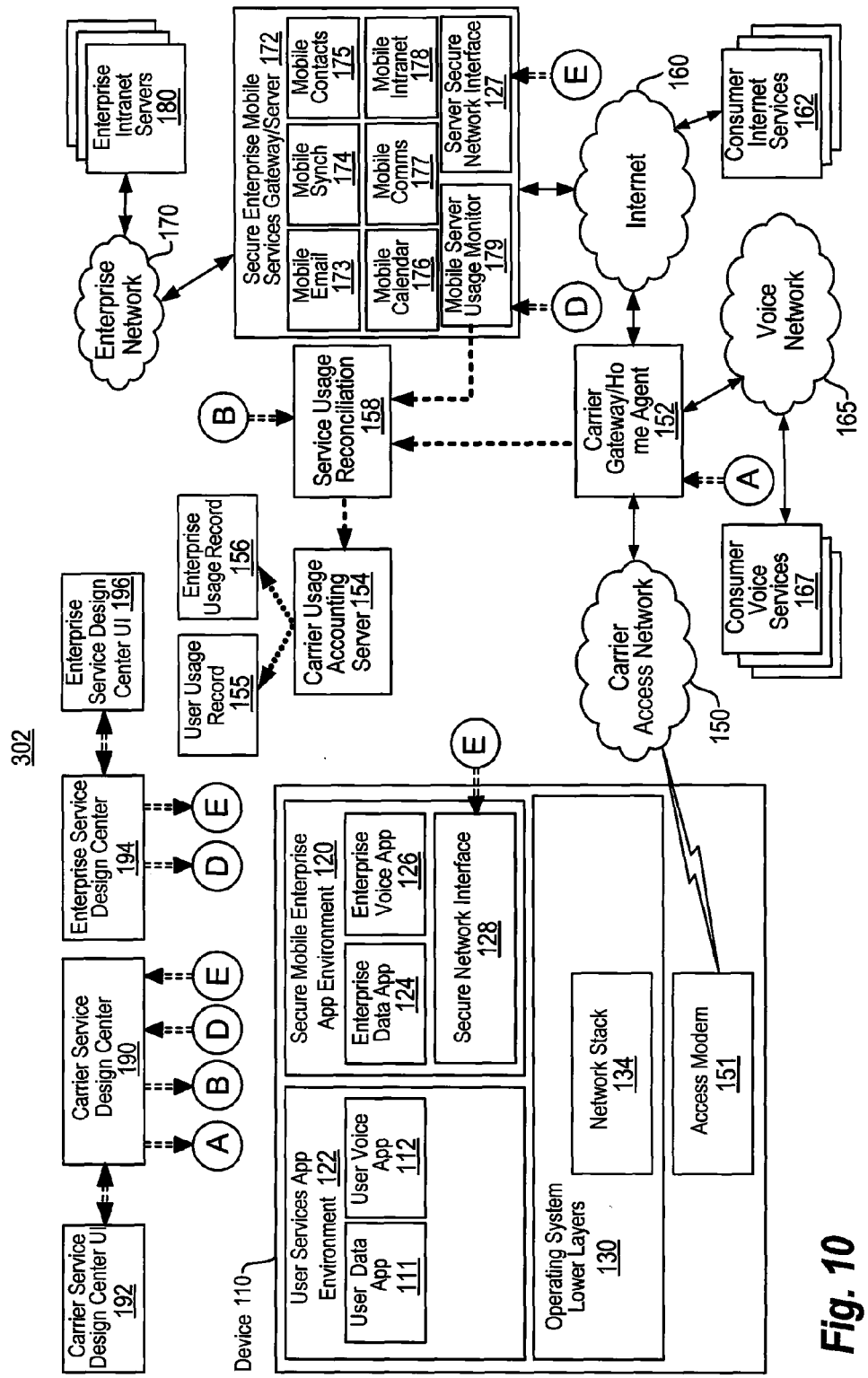
FIG. 10 illustrates a functional diagram of another network architecture for providing enterprise and consumer billing allocation for wireless communication device service usage activities in accordance with some embodiments.

Carrier Managed Billing Allocation with Device Mobile Enterprise Services Application Environment and Mobile Services Gateway Server with Service Usage Monitoring in Carrier Network and Mobile Services Gateway Server FIG. 10 illustrates a functional diagram of another network architecture 302 for providing enterprise and consumer billing allocation for wireless communication device service usage activities in accordance with some embodiments. Network architecture 302 of FIG. 10 is similar to network architecture 301 of FIG. 9, except that in network architecture 302 of FIG. 10, secure enterprise mobile services gateway/server 172 includes mobile service usage monitor 179 that reports enterprise service usage to the service usage reconciliation function 158. In some embodiments, various specialized needs of monitoring, recording, and reporting enterprise service usage are confined to the special-purpose enterprise mobile services gateway/server 172 rather than requiring the often more general-purpose enterprise firewall/secure gateway 171 and/or other network elements/functions to perform such functions.

Figure 11:
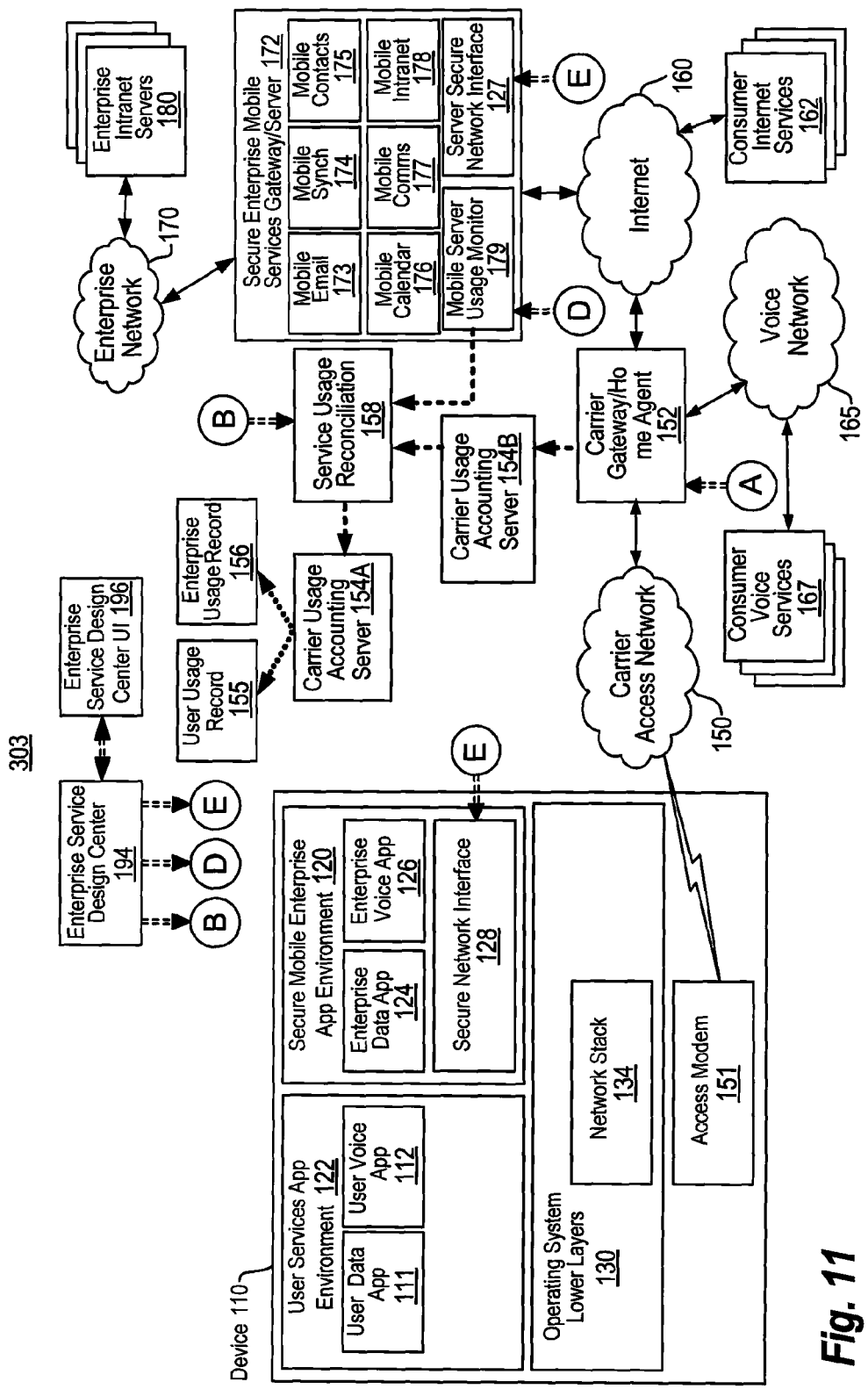
FIG. 11 illustrates a functional diagram of another network architecture for providing enterprise and consumer billing allocation for wireless communication device service usage activities in accordance with some embodiments.

Enterprise Managed Billing Allocation with Device Mobile Enterprise Services Application Environment and Mobile Services Gateway Server with Service Usage Monitoring in Mobile Services Gateway Server FIG. 11 illustrates a functional diagram of network architecture 303 for providing enterprise and consumer billing allocation for wireless communication device service usage activities in accordance with some embodiments. Network architecture 303 of FIG. 11 is similar to network architecture 302 of FIG. 10, except that network architecture 303 of FIG. 11 includes another carrier usage accounting server 154B that reports service usage to service usage reconciliation function 158. In some embodiments, carrier usage accounting server 154B receives overall or bulk service usage data from carrier gateway/home agent 152 and forwards such information to service usage reconciliation function 158. Service usage reconciliation function 158 reconciles the overall or bulk service usage received from carrier accounting server 154B and the enterprise service usage received from mobile server usage monitor 179 and provides such reconciled service usage information to carrier usage accounting server 154A.

Figure 12:
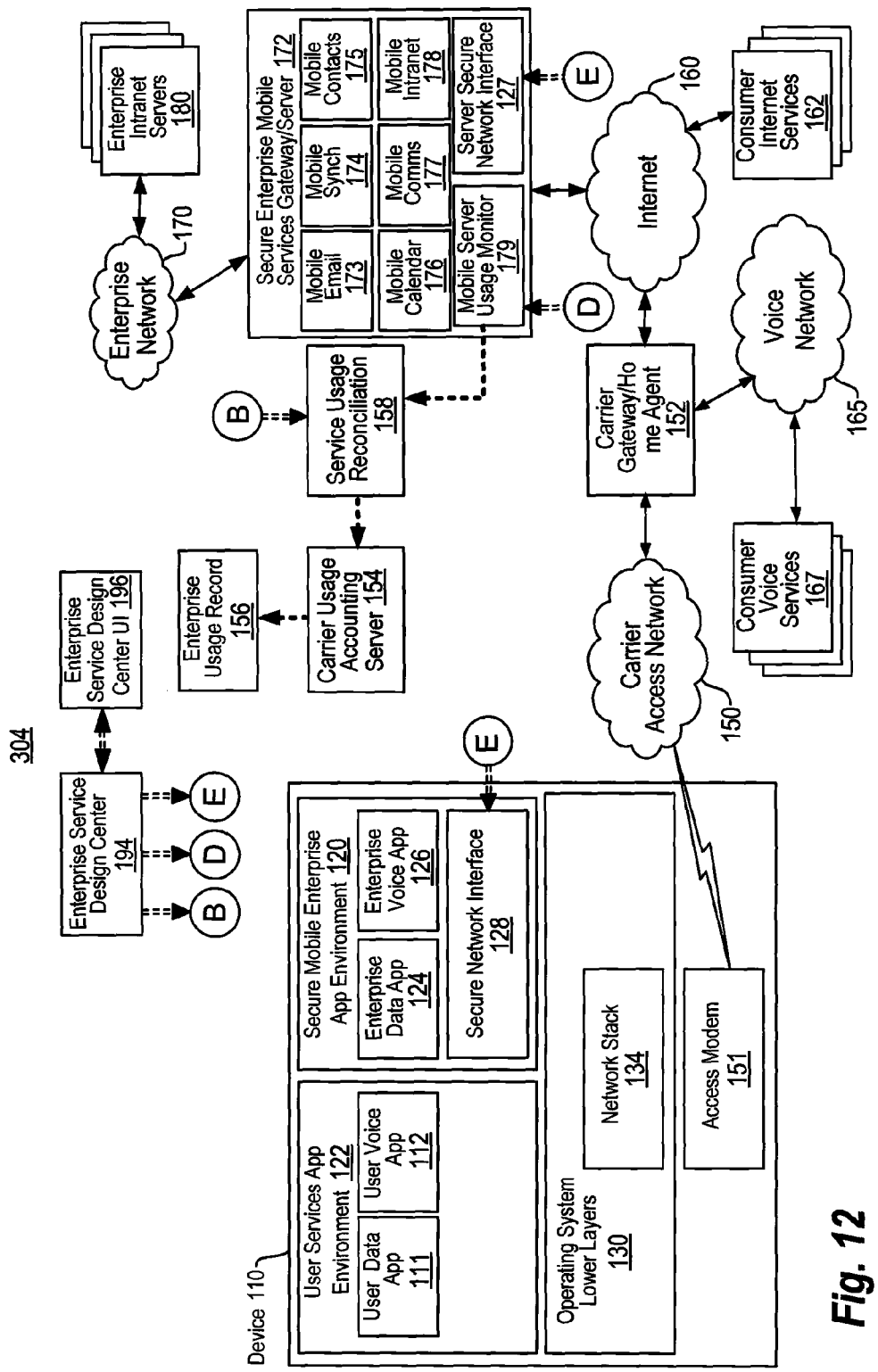
FIG. 12 illustrates a functional diagram of another network architecture for providing enterprise and consumer billing allocation for wireless communication device service usage activities in accordance with some embodiments.

Enterprise Usage Credit with Device Mobile Enterprise Services Application Environment and Mobile Services Gateway Server with Service Usage Monitoring in Mobile Services Gateway Server FIG. 12 illustrates a functional diagram of network architecture 304 for providing enterprise and consumer billing allocation for wireless communication device service usage activities in accordance with some embodiments. Network architecture 304 of FIG. 12 is similar to network architecture 303 of FIG. 11, except that in network architecture 304 of FIG. 12, the only service usage reported to service usage reconciliation function 158 is the enterprise service usage received from mobile server usage monitor 179. In some embodiments, service usage reconciliation function 158 reconciles the enterprise service usage received from mobile server usage monitor 179 and provides such reconciled service usage information to carrier usage accounting server 154, which generates enterprise service usage record(s) 156.

Device Configurations without Service Usage Monitoring and Reporting

Figure 13:
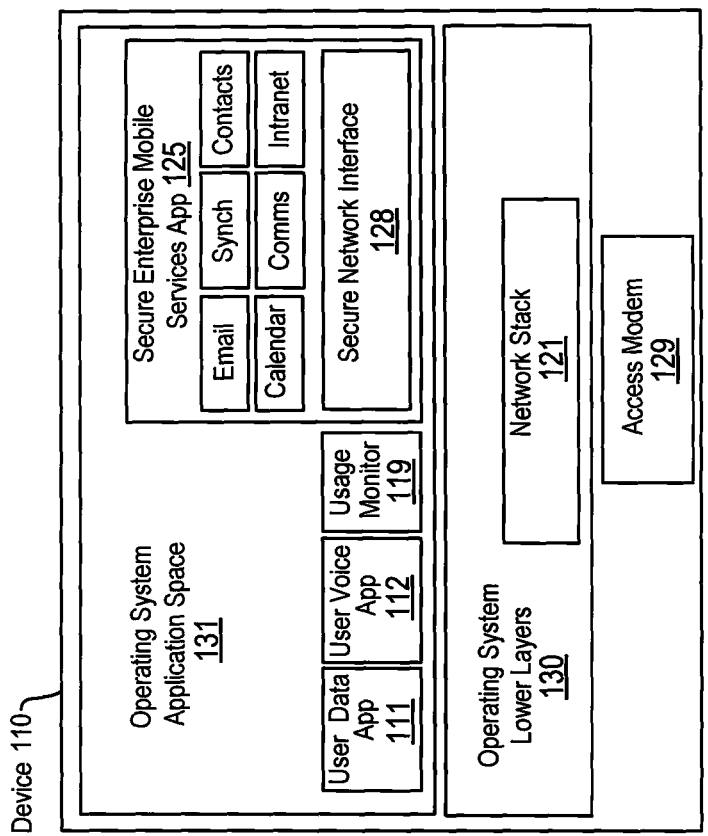
FIG. 13 illustrates a functional diagram of a secure device application architecture for providing enterprise and consumer billing allocation for wireless communication device service usage activities in accordance with some embodiments.

FIG. 13 illustrates a functional diagram of a secure device application architecture for providing enterprise and consumer billing allocation for wireless communication device service usage activities in accordance with some embodiments. As shown, device 110 includes an operating system application space 131, operating system lower layers 130 including network stack 121, and access modem (e.g., wireless modem) 129. As also shown, operating system application space 131 includes various user applications, such as user data application 111 and user voice application 119, and service usage monitor 119. Operating system application space 131 also includes secure enterprise mobile services application 125, which includes various enterprise applications, such as email, synchronization, contacts, calendar communications, and intranet. Secure enterprise mobile services application 125 also includes secure network interface 128 (e.g., for securely communicating with an enterprise network).

Figure 14:
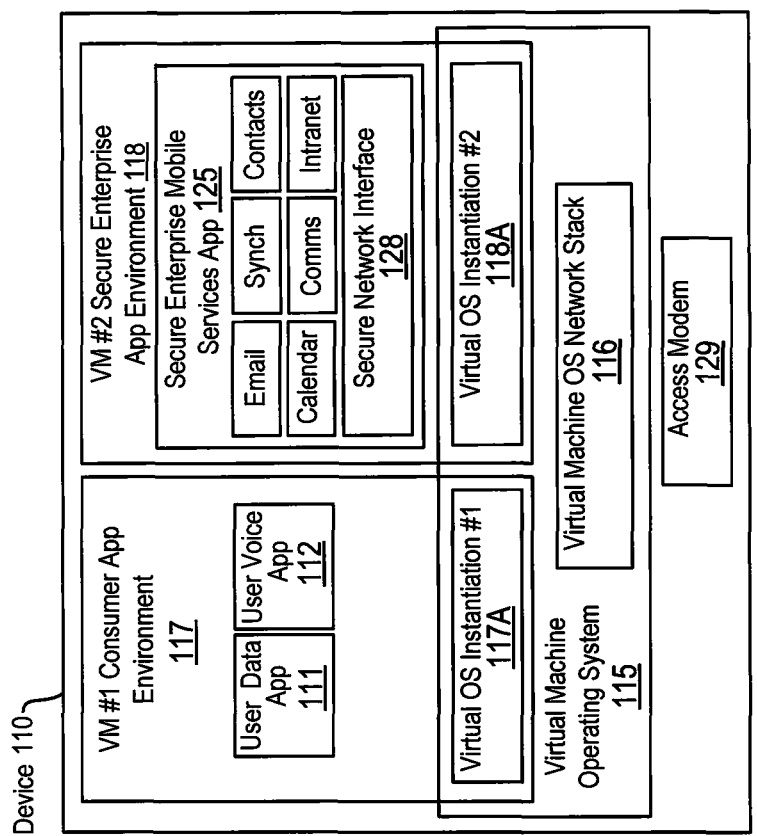
FIG. 14 illustrates a functional diagram of another secure device virtual machine architecture for providing enterprise and consumer billing allocation for wireless communication device service usage activities in accordance with some embodiments.

FIG. 14 illustrates a functional diagram of another secure device virtual machine architecture for providing enterprise and consumer billing allocation for wireless communication device service usage activities in accordance with some embodiments. FIG. 14 is similar to FIG. 13, except that in FIG. 14 the user applications are executed/stored within virtual machine (VM) #1 consumer application environment 117, and secure enterprise mobile services application 125 is included within virtual machine (VM) #2 secure enterprise application environment 118. Device 110 also includes virtual machine operating system 115 that includes virtual OS instantiation #1 117A for VM #1 consumer application environment 117 and virtual OS instantiation #2 118A for VM #2 secure enterprise application environment 118. As also shown, virtual machine operating system 115 includes virtual machine OS network stack 116.

Figure 15:
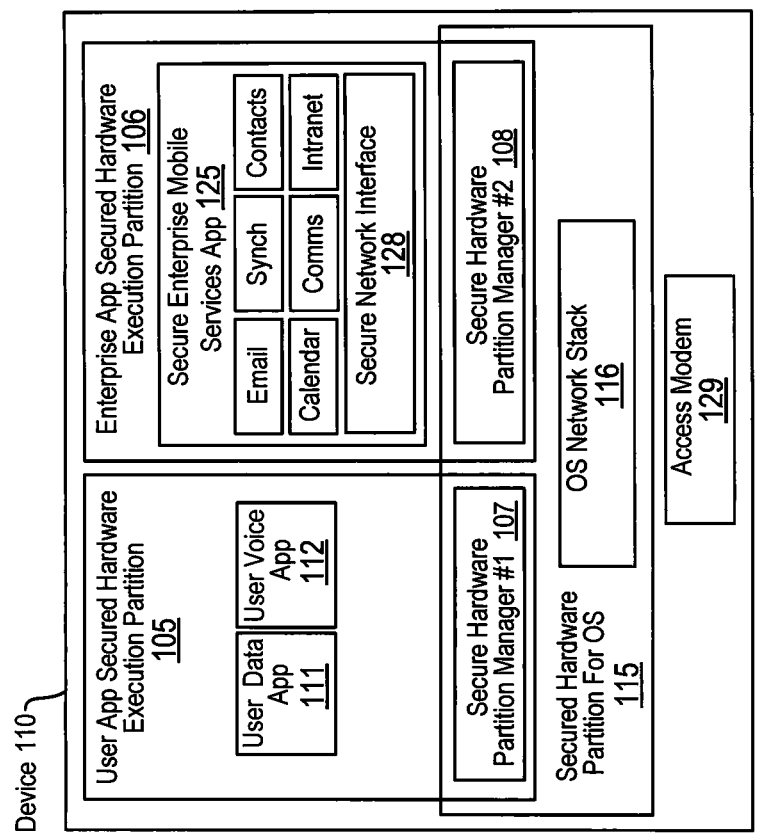
FIG. 15 illustrates a functional diagram of another secure device hardware execution partition architecture for providing enterprise and consumer billing allocation for wireless communication device service usage activities in accordance with some embodiments.

FIG. 15 illustrates a functional diagram of another secure device hardware execution partition architecture for providing enterprise and consumer billing allocation for wireless communication device service usage activities in accordance with some embodiments. FIG. 15 is similar to FIG. 14, except that in FIG. 15 hardware partitions are provided instead of virtual partitions. As shown, the user applications are executed/stored within user application secured hardware execution partition 105 and secure enterprise mobile services application 125 is included within enterprise application secured hardware execution partition 106. Device 110 also includes secured hardware partition for OS 115 that includes secure hardware partition manager #1 107 for user application secured hardware execution partition 105 and secure hardware partition manager #2 108 for enterprise application secured hardware execution partition 106. As also shown, secured hardware partition for OS 115 includes OS network stack 116.

Figure 16:
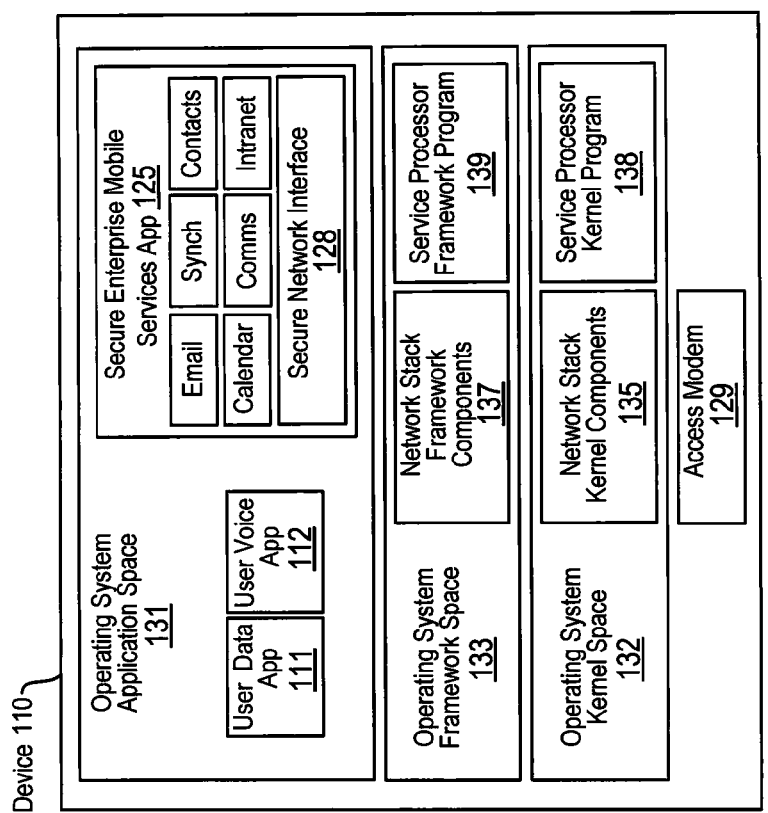
FIG. 16 illustrates a functional diagram of another secure device service processor architecture for providing enterprise and consumer billing allocation for wireless communication device service usage activities in accordance with some embodiments.

FIG. 16 illustrates a functional diagram of another secure device service processor architecture for providing enterprise and consumer billing allocation for wireless communication device service usage activities in accordance with some embodiments. As similarly described herein with respect to various embodiments, the device architecture of FIG. 16 includes service processor framework program 139 (e.g., framework space agent/function) and network stack framework components 137 in operating system framework space 133, and service processor kernel program 138 (e.g., kernel space agent/function) and network stack kernel components 135 in operating system kernel space 132. In some embodiments, the service processor functions provide a user interface function to communicate to a user of device 110 whether or not a service usage activity is an approved/authorized service usage activity, or whether it is a disallowed service usage activity for device 110 (e.g., the enterprise has disallowed the usage of device 110 for such service usage activities, such as online gaming and/or certain other online activities or certain long distance calling or voice usage during certain days, such as weekends) or whether such would/will be charged/billed to the user as a consumer under the user's consumer plan. In some embodiments, the service processor functions provide a user interface function to communicate to a user of device 110 an associated cost of certain service usage activities allocated to consumer service usage. In some embodiments, the service processor functions provide a user interface function to communicate to a user of device 110 an associated credit of certain service usage activities allocated to enterprise service usage. In some embodiments, the service processor functions provide a user interface function to communicate to a user of device 110 various other information as described herein with respect to providing an enterprise and consumer allocation for service usage activities. In some embodiments, the service processor shown in FIG. 16 communicates with a service controller, such as described herein with respect to various embodiments.

Figure 17:
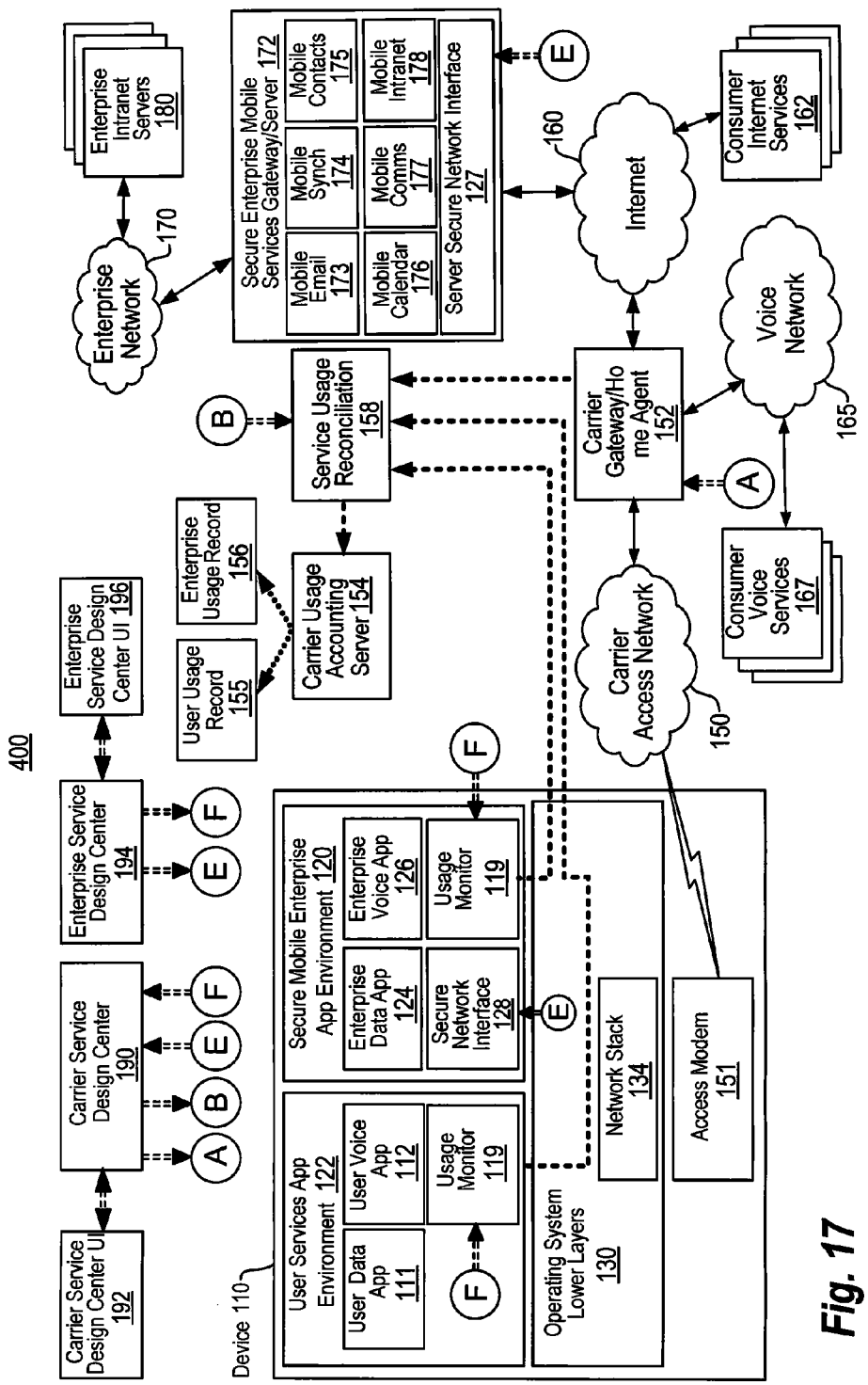
FIG. 17 illustrates a functional diagram of another network architecture for providing enterprise and consumer billing allocation for wireless communication device service usage activities in accordance with some embodiments.

Carrier Managed Billing Allocation with Device Mobile Enterprise Services Application Environment and Mobile Services Gateway Server with Service Usage Monitoring in Carrier Network and on Device FIG. 17 illustrates a functional diagram of another network architecture 400 for providing enterprise and consumer billing allocation for wireless communication device service usage activities in accordance with some embodiments. Network architecture 400 of FIG. 17 is similar to network architecture 302 of FIG. 10, except that as shown in FIG. 17, device 110 also includes service usage monitor 119 (e.g., agent/function) in secure mobile enterprise application environment 120. In some embodiments, service usage monitor 119 performs application monitoring that includes counting application service usage for secure data application 124 and secure voice application 126 (and, in some embodiments, for also counting application service usage for user applications that are not enterprise or secure enterprise applications 124 or 126). In some embodiments, counting application service usage includes counting bytes or network connection time used in communicating via carrier access network 150 during the device's execution of monitored data applications. In some embodiments, counting application service usage includes counting voice network connection time used in communicating via carrier access network 150 during the device's execution of monitored voice applications. In some embodiments, service usage monitor 119 performs application monitoring that further includes classifying application service usage for secure enterprise applications 124, 126 (e.g., classifying various secure enterprise applications 124, 126 and in some embodiments, including ambient services classification/determination, by application/service usage activity such as based on application name or using signed code/hash techniques, by time of day/day of week, enterprise server, destinations, enterprise intranet, and/or other factors).

In some embodiments, carrier usage accounting server 154 communicates (e.g., using secure communication techniques) with service usage monitor 119 to mediate billing/charging and credit reports, for example, using the various approaches and techniques as described herein.

In some embodiments, service usage monitor 119 and/or another function/agent executed in secure mobile enterprise application environment 120 of device 110 blocks user access for non-enterprise activities that the user has not agreed to pay for.

Because the enterprise service usage is monitored by the device network elements in the embodiments depicted in FIG. 17, various service accounting or billing policies are available to the enterprise or carrier. For example, the amount of service usage resulting from enterprise services that occur during roaming conditions may be accounted for even when the carrier network does not receive detailed classification of service usage from roaming network partners. The business rules programmed into service usage reconciliation function 158 that are determined by the enterprise service activity policy set can break-out enterprise service related roaming charges separate from consumer service related roaming charges. In addition, in some embodiments, the device secure mobile enterprise environment includes an access control function so that the access control policies specified in the enterprise service activity policy set can be enforced on roaming networks that have access that is not controlled by the carrier home network.

For example, the allowances provided by the enterprise service activity policy set can be programmed so that the allowances change depending on the availability of a particular network or set of networks, the time of day, the congestion state of a network, or the current cost of service on the network. As another example, if the carrier home network is not available and only a roaming network is available, the allowance can be decreased or removed. As yet another example, if a certain network type is not available but another network type is (e.g., 2G is available instead of 3G or 3G is available instead of 4G), then the allocation can be reduced. As yet a further example, if a variable charging policy is in place with the carrier for access when the network is busy or during certain times of day, then the enterprise sponsored allowance can be reduced during times of higher charging. As described herein, in some embodiments, an active network detection function can be included on the device to assist the network policy enforcement to determine the type of network the device is connected to or to determine if the device is on a home or roaming network. As also described herein, in some embodiments, a network busy state monitor function can be included on the device to assist the network policy enforcement to determine the network busy state or state of network congestion.

Figure 18:
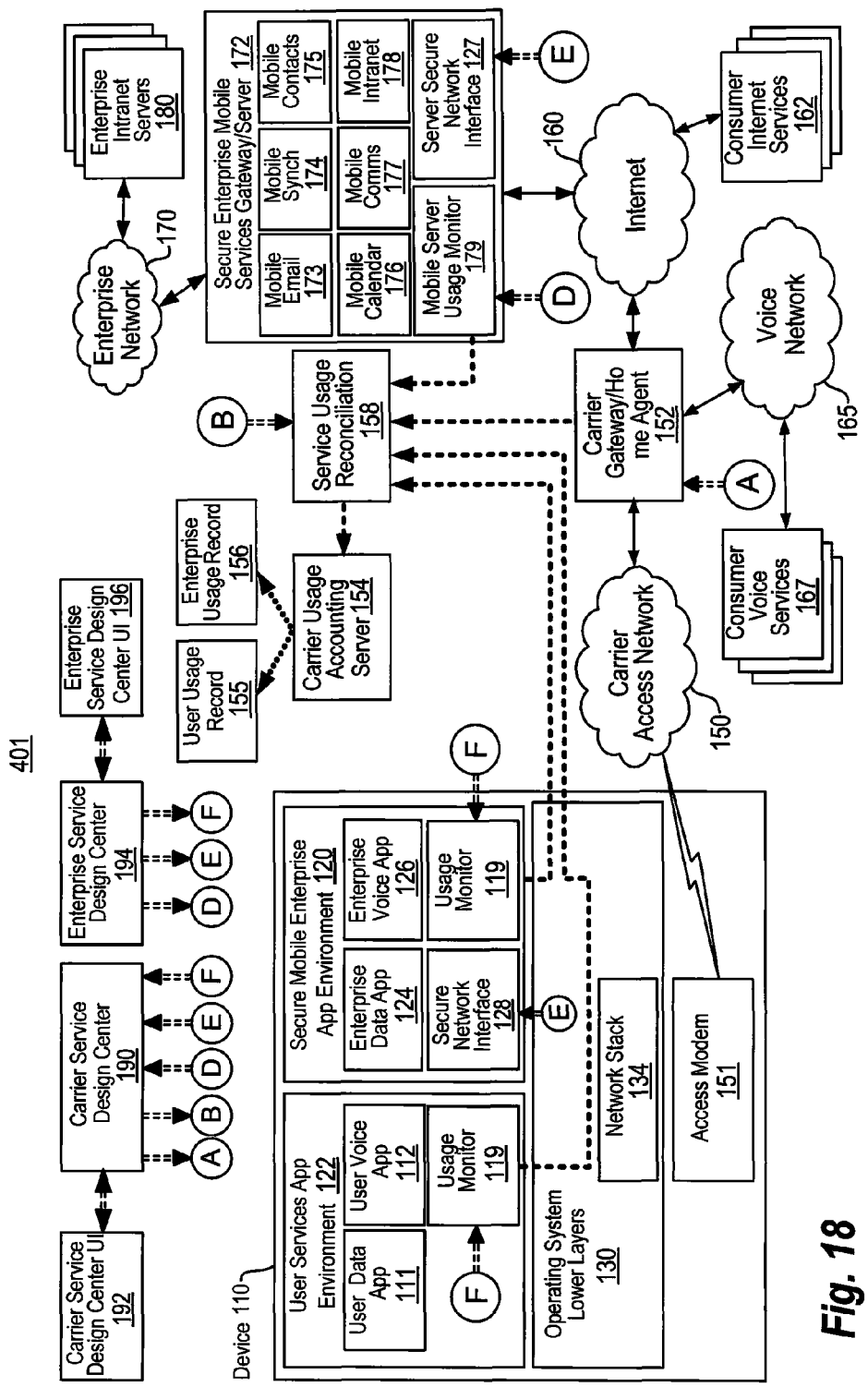
FIG. 18 illustrates a functional diagram of another network architecture for providing enterprise and consumer billing allocation for wireless communication device service usage activities in accordance with some embodiments.

Carrier Managed Billing Allocation with Device Mobile Enterprise Services Application Environment and Mobile Services Gateway Server with Service Usage Monitoring in Carrier Network, on Device, and in Enterprise Mobile Services Gateway Server FIG. 18 illustrates a functional diagram of another network architecture 401 for providing enterprise and consumer billing allocation for wireless communication device service usage activities in accordance with some embodiments. Network architecture 401 of FIG. 18 is similar to network architecture 400 of FIG. 17, except that in network architecture 401 of FIG. 18, secure enterprise mobile services gateway/server 172 includes mobile server usage counter 179, and the enterprise service usage reports from this function are sent to service usage reconciliation function 158. In some embodiments, various specialized needs of monitoring, recording, and reporting enterprise service usage are confined to the special-purpose secure enterprise mobile services gateway/server 172.

Figure 19:
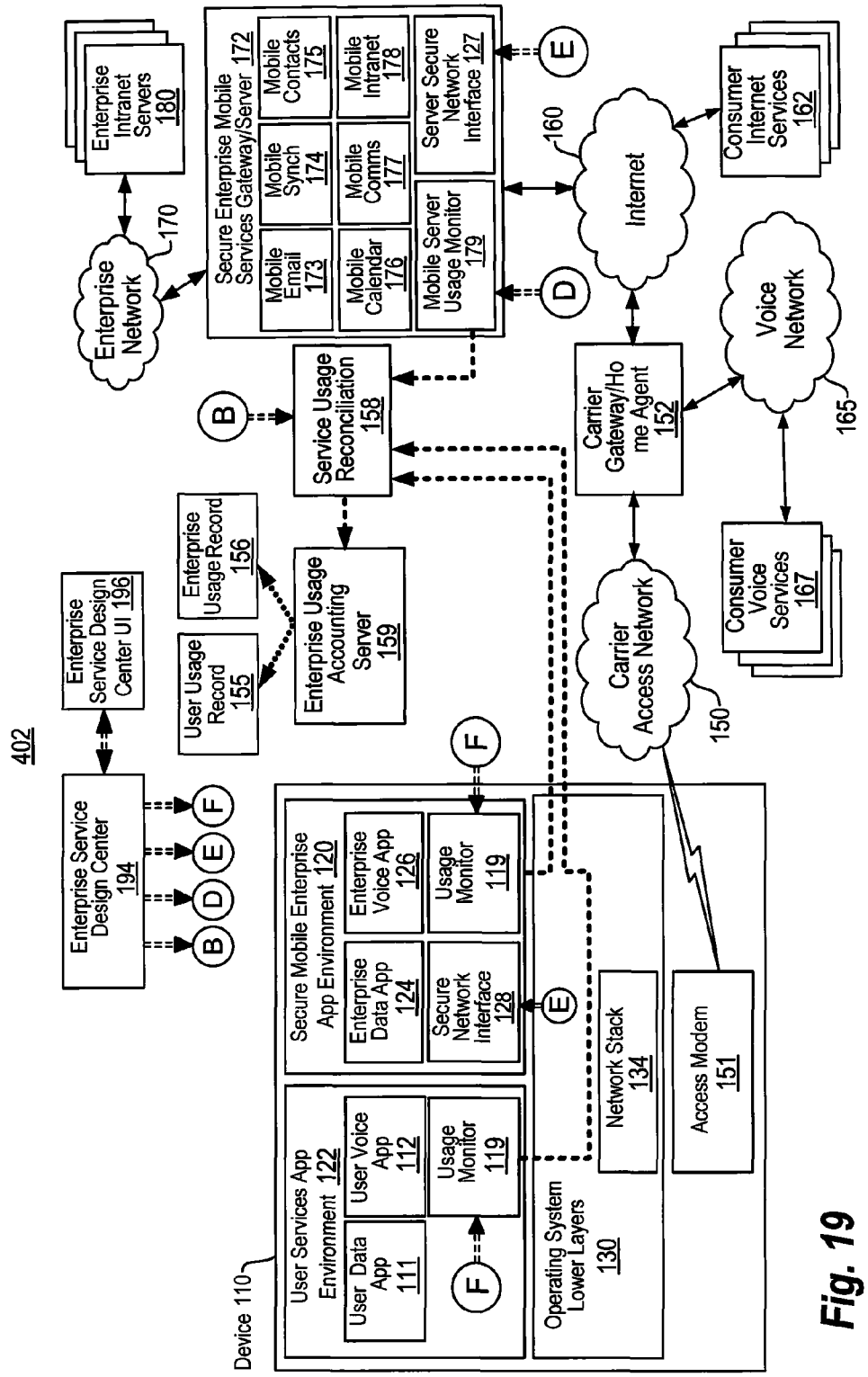
FIG. 19 illustrates a functional diagram of another network architecture for providing enterprise and consumer billing allocation for wireless communication device service usage activities in accordance with some embodiments.

Enterprise Managed Billing Allocation with Device Mobile Enterprise Services Application Environment and Mobile Services Gateway Server with Service Usage Monitoring on Device and in Enterprise Mobile Services Gateway Server FIG. 19 illustrates a functional diagram of another network architecture 402 for providing enterprise and consumer billing allocation for wireless communication device service usage activities in accordance with some embodiments. Network architecture 402 of FIG. 19 is similar to network architecture 401 of FIG. 18, except that network architecture 402 of FIG. 19 does not include the service usage feed from carrier gateway/home agent 152, and service usage reconciliation function 158 relies solely on a device service usage feed from device 110 usage monitors 119 and secure enterprise mobile services gateway/server 172 mobile service usage monitor 179. In some embodiments, service usage reconciliation function 158 and enterprise service usage accounting server 159 are under the control of the enterprise or the carrier. For example, an enterprise entity can establish enterprise service and consumer service usage allocation accounting without the need to tie into the carrier network for usage feeds and usage accounting. Using various techniques described herein, an enterprise service usage credit can be determined, and the determined enterprise service usage credit can be reimbursed to the device user.

Figure 20:
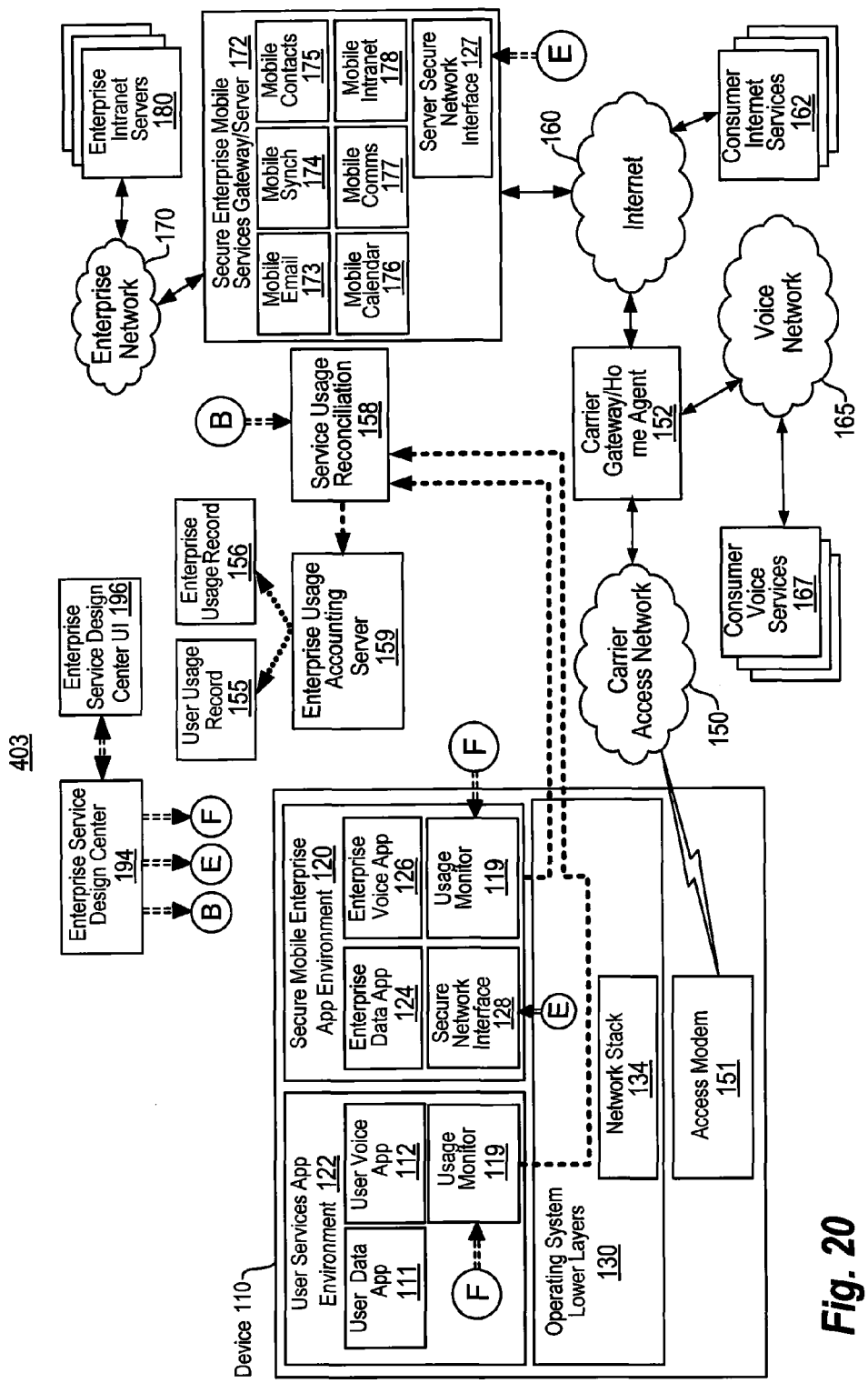
FIG. 20 illustrates a functional diagram of another network architecture for providing enterprise and consumer billing allocation for wireless communication device service usage activities in accordance with some embodiments.

Enterprise Managed Billing Allocation with Device Mobile Enterprise Services Application Environment and Mobile Services Gateway Server with Service Usage Monitoring on Device FIG. 20 illustrates a functional diagram of another network architecture 403 for providing enterprise and consumer billing allocation for wireless communication device service usage activities in accordance with some embodiments. Network architecture 403 of FIG. 20 is similar to network architecture 402 of FIG. 19, except that in network architecture 403 of FIG. 20, service usage reconciliation function 158 receives feeds from device 110 service usage monitors 119 and there is no feed from the secure enterprise mobile services gateway server.

Figure 21:
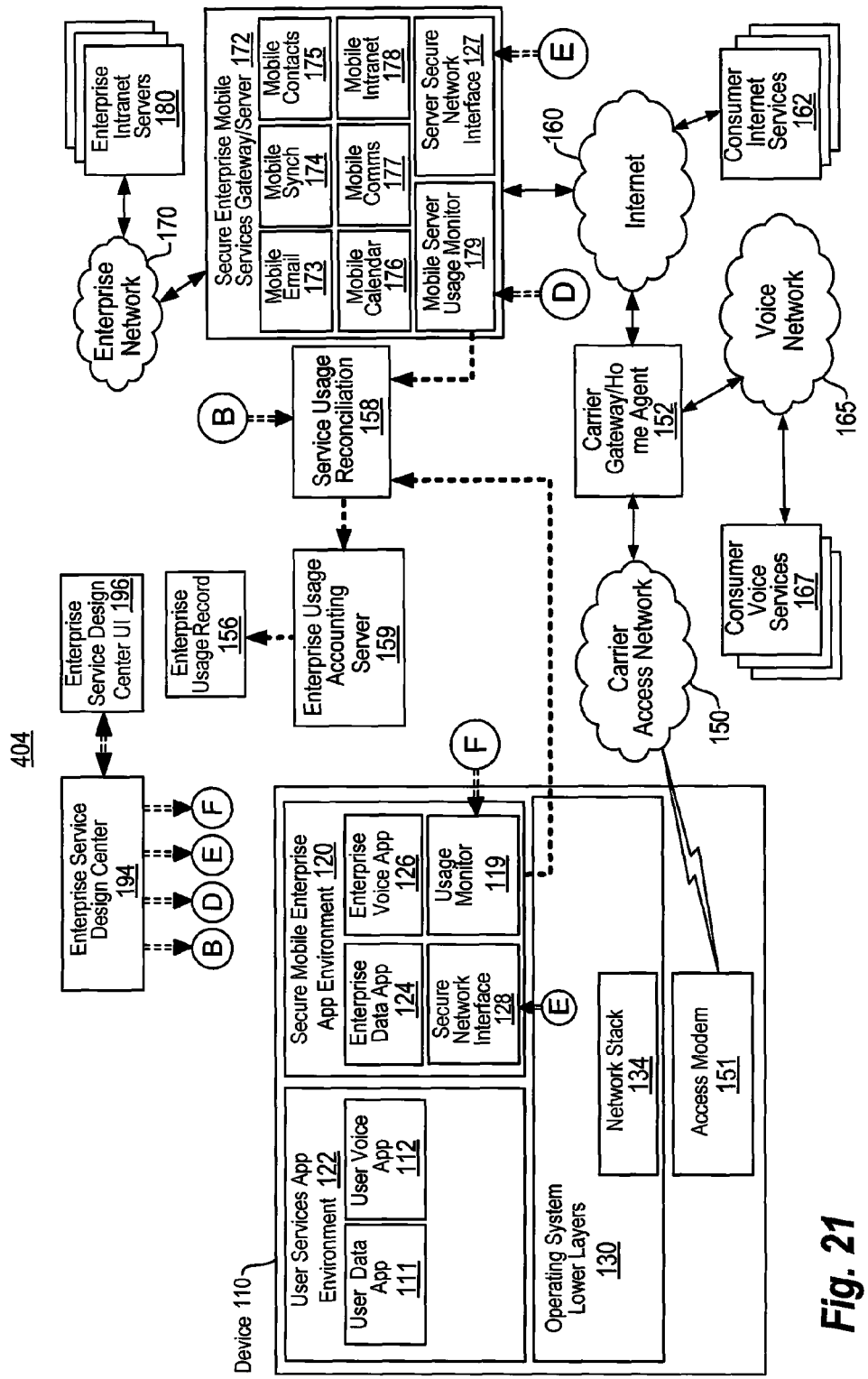
FIG. 21 illustrates a functional diagram of another network architecture for providing enterprise and consumer billing allocation for wireless communication device service usage activities in accordance with some embodiments.

Enterprise Usage Credit with Device Mobile Enterprise Services Application Environment and Mobile Services Gateway Server with Service Usage Monitoring on Device and in Enterprise Mobile Services Gateway Server FIG. 21 illustrates a functional diagram of another network architecture 404 for providing enterprise and consumer billing allocation for wireless communication device service usage activities in accordance with some embodiments. Network architecture 404 of FIG. 21 is similar to network architecture 402 of FIG. 19, except that in network architecture 404 of FIG. 21, there is no service usage monitor function 119 in user services application environment 122 providing service usage reports/information to service usage reconciliation function 158, and enterprise usage accounting server 159 only generates enterprise usage records 156.

Figure 22:
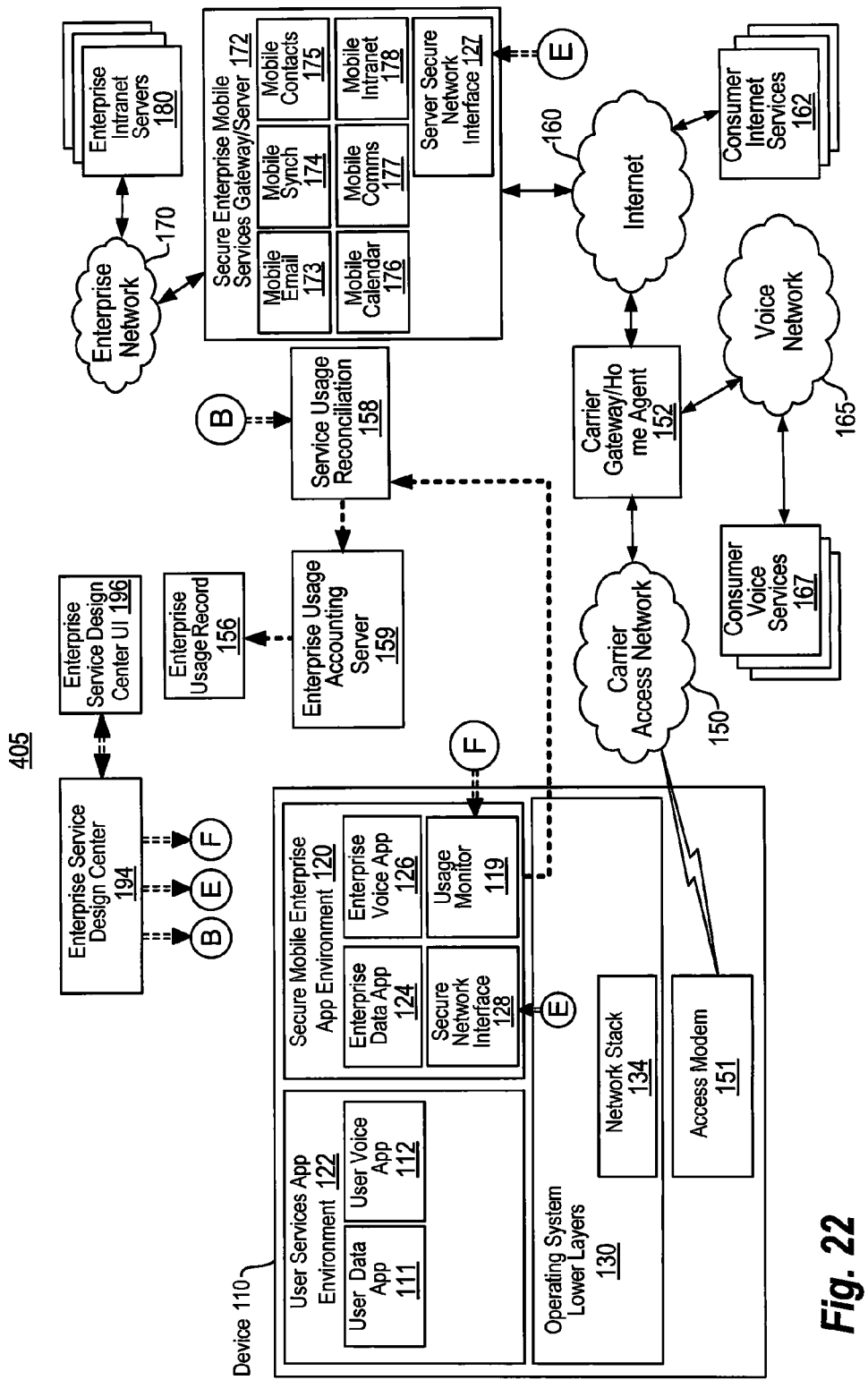
FIG. 22 illustrates a functional diagram of another network architecture for providing enterprise and consumer billing allocation for wireless communication device service usage activities in accordance with some embodiments.

Enterprise Usage Credit with Device Mobile Enterprise Services Application Environment and Mobile Services Gateway Server with Usage Monitoring on Device FIG. 22 illustrates a functional diagram of another network architecture 405 for providing enterprise and consumer billing allocation for wireless communication device service usage activities in accordance with some embodiments. Network architecture 405 of FIG. 22 is similar to network architecture 404 of FIG. 21, except that network architecture 405 of FIG. 22 does not include mobile server usage monitor 179 providing enterprise service usage reports/information to service usage reconciliation function 158.

Device Configurations with Service Usage Monitoring and Reporting

In some embodiments, secure enterprise mobile services application 125 and network stack 121 can be implemented in access modem 129, as described below with respect to FIGS. 23 through 26.

Figure 23:
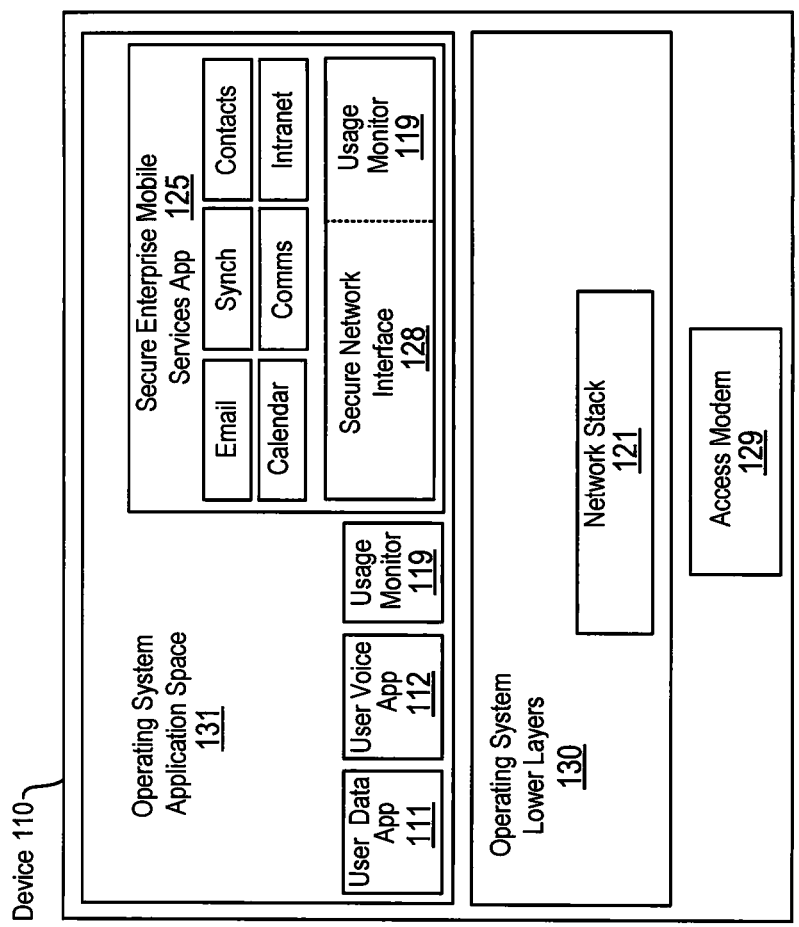
FIG. 23 illustrates a functional diagram of a secure device application architecture with device based service usage monitoring for providing enterprise and consumer billing allocation for wireless communication device service usage activities in accordance with some embodiments.

FIG. 23 illustrates a functional diagram of a secure device application architecture with device-based service usage monitoring (and in some embodiments, access control) for providing enterprise and consumer billing allocation for wireless communication device service usage activities in accordance with some embodiments. FIG. 23 is similar to FIG. 13 except that in FIG. 23 usage monitor 119 is provided as shown, and secure enterprise mobile services application 125 and network stack 121 can be implemented in access modem 129 as also shown.

Figure 24:
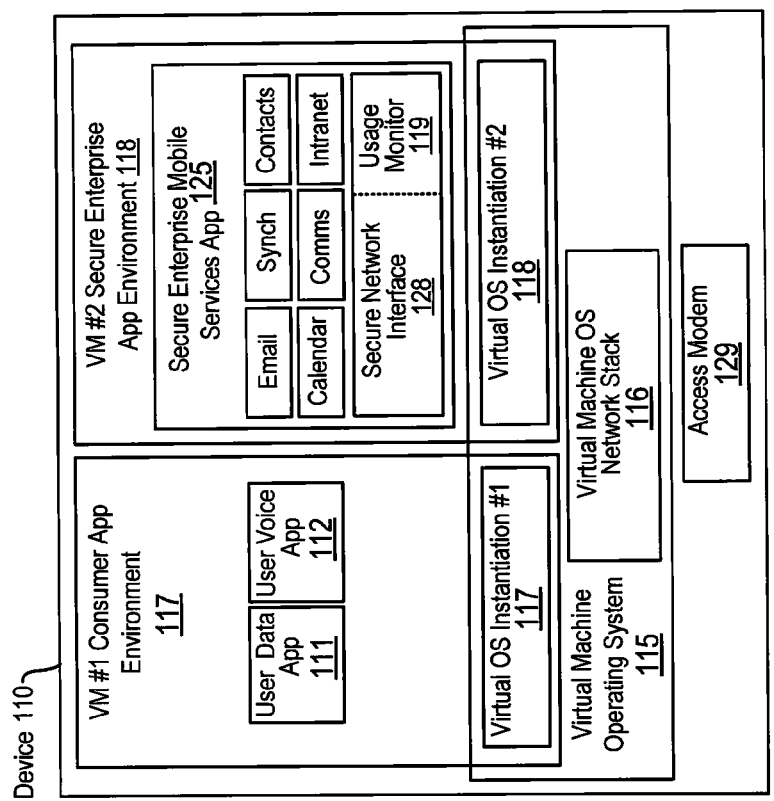
FIG. 24 illustrates a functional diagram of a secure device virtual machine architecture with device based service usage monitoring for providing enterprise and consumer billing allocation for wireless communication device service usage activities in accordance with some embodiments.

FIG. 24 illustrates a functional diagram of a secure device virtual machine architecture with device-based service usage monitoring (and in some embodiments, access control) for providing enterprise and consumer billing allocation for wireless communication device service usage activities in accordance with some embodiments. FIG. 24 is similar to FIG. 14 except that in FIG. 24, usage monitor 119 is provided as shown, and secure enterprise mobile services application 125 and virtual machine OS network stack 116 can be implemented in access modem 129 as also shown.

Figure 25:
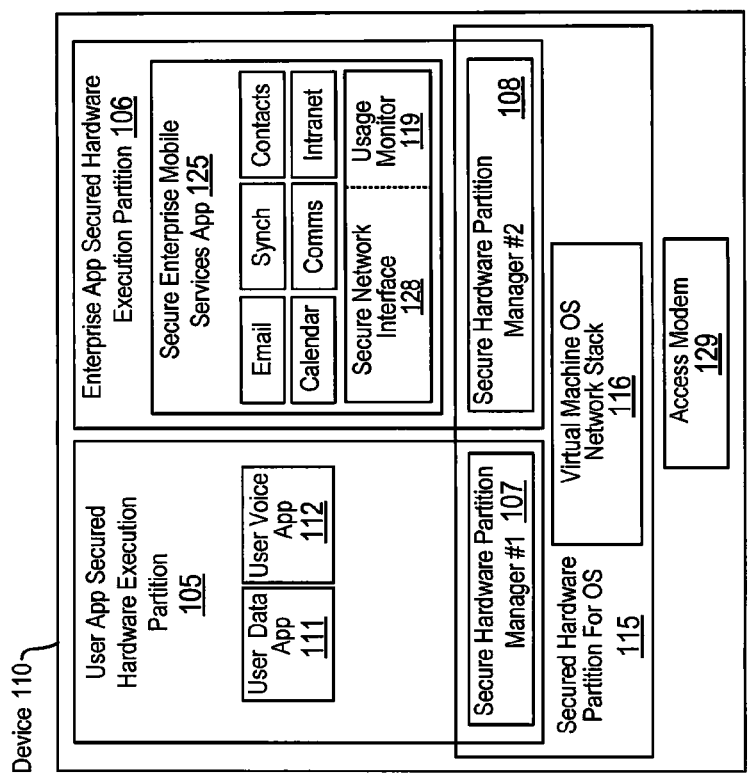
FIG. 25 illustrates a functional diagram of a secure device hardware execution partition architecture with device based service usage monitoring for providing enterprise and consumer billing allocation for wireless communication device service usage activities in accordance with some embodiments.

FIG. 25 illustrates a functional diagram of a secure device hardware execution partition architecture with device-based service usage monitoring (and in some embodiments access control) for providing enterprise and consumer billing allocation for wireless communication device service usage activities in accordance with some embodiments. FIG. 25 is similar to FIG. 15 except that in FIG. 25 usage monitor 119 is provided as shown, and secure enterprise mobile services application 125 and virtual machine OS network stack 116 can be implemented in access modem 129 as also shown.

Figure 26:
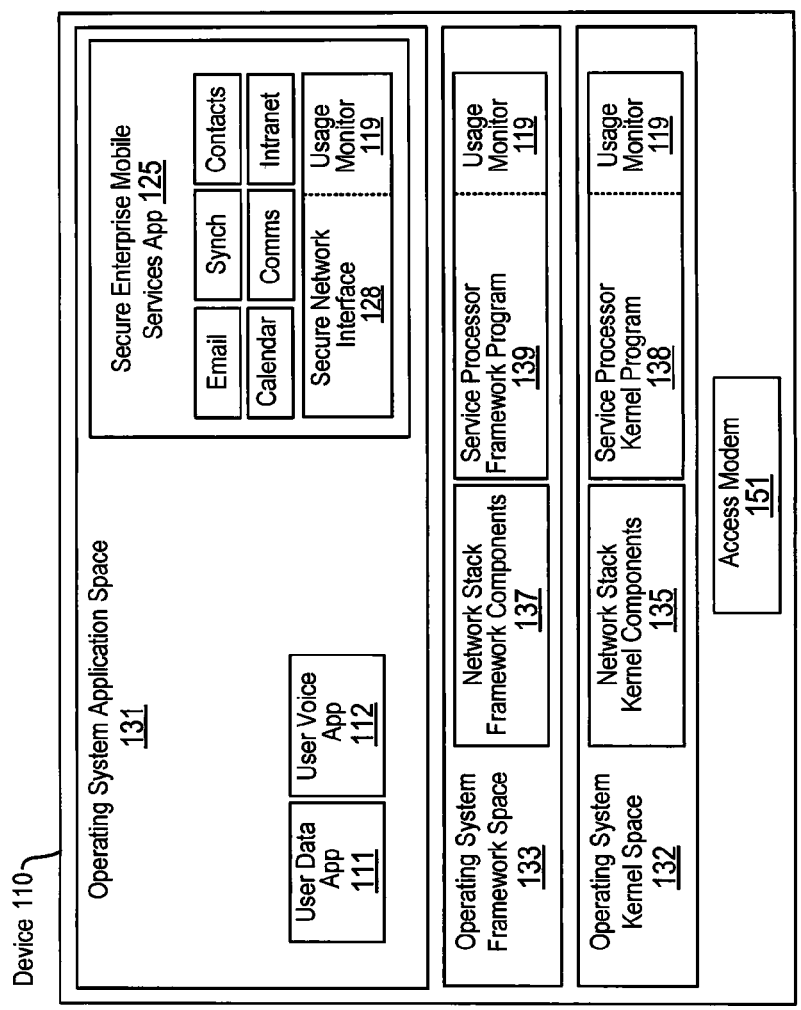
FIG. 26 illustrates a functional diagram of a secure device service processor architecture with device based service usage monitoring for providing enterprise and consumer billing allocation for wireless communication device service usage activities in accordance with some embodiments.

FIG. 26 illustrates a functional diagram of a secure device service processor architecture with device based service usage monitoring (and in some embodiments, access control) for providing enterprise and consumer billing allocation for wireless communication device service usage activities in accordance with some embodiments. FIG. 263 is similar to FIG. 16 except that in FIG. 26 usage monitor 119 is provided as shown, and secure enterprise mobile services application 125, service processor framework 139, and service processor kernel program 138, can be implemented in the access modem 129 as also shown.

In some embodiments, service processor framework program 139 (or service processor kernel program 138) interacts with network stack framework components 137 or network stack kernel components 135 to inspect traffic for service usage classification and service policy enforcement (e.g., access control policy enforcement, traffic control policy enforcement, service usage accounting, charging policy enforcement, or service notification policy enforcement) purposes. In some embodiments, one or more of network stack framework components 137 and network stack kernel components 135 provides classification information on one or more traffic flows to service processor framework program 139 (or service processor kernel program 138). In some embodiments, service processor framework program 139 (or service processor kernel program 138) seeks to match the classification information to one or more classification parameters contained in the service policy definitions in order to determine the service policy enforcement actions that may be required for a traffic flow. In some embodiments, a traffic flow is a flow of data packets. In some embodiments, a traffic flow is a flow of one or more data packets that are associated with a device application, the association of a traffic flow to a device application being identified by network stack framework components 137 or network stack kernel components 135 or service processor framework program 139 (or service processor kernel program 138). In some embodiments, the service usage classification determines that the traffic flow is associated with a combination of one or more of: a device application, a network destination, a traffic type, a content type, a QoS level, a roaming network, a home network.

In some embodiments, the association of traffic flow to a specific device application is used to determine a service policy enforcement action that is dependent on the specific device application. In some embodiments, a specific device application identifier (e.g., an application name, application signature, application hash or application certificate) forms an application credential that is used to index a service policy enforcement action that is intended to be implemented following a service usage activity or attempted service usage activity by the specific device application. In some embodiments, a specific device application is verified as consistent with an application credential in order to ensure that an application service policy enforcement action intended to be applied to the specific device application is applied to the correct application. In some embodiments, the verification that a specific application is consistent with an application credential associated with a service policy enforcement action is performed in service processor framework program 139 (or service processor kernel program 138) to ensure that ensure that an application service policy enforcement action intended to be applied to the specific device application is applied to the correct application. In some embodiments, the verification that a specific application is consistent with an application credential associated with a service policy enforcement action is performed in network stack framework components 137 or network stack kernel components 135, and service processor framework program 139 (or service processor kernel program 138) ascertains the application credential verification to ensure that ensure that an application service policy enforcement action intended to be applied to the specific device application is applied to the correct application.

In some embodiments, the association of traffic flow to a specific device application is used to determine a service policy enforcement action that is dependent on the specific device application, and service processor framework program 139 (or service processor kernel program 138) instructs network stack framework components 137 or network stack kernel components 135 to implement the service policy enforcement action on the traffic flow associated with the specific device application. In some embodiments, the association of traffic flow to a specific device application is used to determine a service policy enforcement action that is dependent on the specific device application, and service processor framework program 139 (or service processor kernel program 138) implements the service policy enforcement action. In some embodiments, a traffic flow is buffered pending classification (e.g., buffered in one or more of network stack framework components 137, network stack kernel components 135, service processor framework program 139, or service processor kernel program 138). In some embodiments, upon classification of the traffic flow (e.g., determination of an association of the traffic flow to a specific device application), a service policy enforcement action that is dependent on the specific device application is determined by service processor framework program 139 (or service processor kernel program 138) and implemented in one or more of network stack framework components 137, network stack kernel components 135, service processor framework program 139, and service processor kernel program 138. In some embodiments, the service policy enforcement action for the traffic flow is implemented in service processor framework program 139 (or service processor kernel program 138). In some embodiments, service processor framework program 139 (or service processor kernel program 138) instructs a device UI program that displays a device service notification (e.g., a service usage notification, a service plan offer notification, or an indication of a service usage event or attempted service usage event that requires a user notification) to implement the service policy enforcement action for the traffic flow. In some embodiments, service processor framework program 139 (or service processor kernel program 138) instructs a service usage monitor (e.g., accounting traffic to bulk classification or a more detailed classification of service usage) to implement the service policy enforcement action for the traffic flow.

In some embodiments, the network destination of a traffic flow is used to determine if a service policy enforcement action that is dependent on a specific network destination should be applied to the traffic flow. In some embodiments, a traffic flow is inspected by network stack framework components 137 or network stack kernel components 135, and one or more traffic characteristics (e.g., an address, a socket/flow tuple, a layer-7 packet information, or a packet header string) are passed to service processor framework program 139 (or service processor kernel program 138), wherein the one or more traffic characteristics are matched against one or more classification parameters contained in a service policy definition, and if a match is present then a service policy enforcement action is implemented for the traffic flow. In some embodiments, a traffic flow is inspected by service processor framework program 139 (or service processor kernel program 138), and one or more traffic characteristics (e.g., an address, a socket/flow tuple, a layer-7 packet information, or a packet header string) are matched against one or more classification parameters contained in a service policy definition, and if a match is present then a service policy enforcement action is implemented for the traffic flow. In some embodiments, the service policy enforcement action for the traffic flow is implemented in service processor framework program 139 (or service processor kernel program 138). In some embodiments, service processor framework program 139 (or service processor kernel program 138) instructs network stack framework components 137 or network stack kernel components 135 to implement the service policy enforcement action for the traffic flow. In some embodiments, the service policy enforcement action for the traffic flow is implemented by a device UI program that displays a device service notification (e.g., a service usage notification, a service plan offer notification, or an indication of a service usage event or attempted service usage event that requires a user notification). In some embodiments, the service policy enforcement action for the traffic flow is implemented by a service usage monitor (e.g., accounting traffic to bulk classification or a more detailed classification of service usage).

In some embodiments, an enterprise manger can define or select service plan policies that confine enterprise-sponsored access services to a pre-defined list of device applications. For example, an enterprise manager might choose to define or select a service plan wherein only corporate applications may be accessed (e.g., email, contacts, intranet services, text, and/or voice). In such embodiments, enterprise service design user interface 196 may be used by the enterprise manager to define or select the allowable applications that are to have access. In some embodiments, an enterprise access manager may define or select a different set of applications to be accessible when device 110 is roaming than when device 110 is on a home network or on a WiFi network. In some embodiments, an enterprise manager may define or select a set of applications that are to be not allowed access when a device is on a certain network (e.g., a roaming network). For example, many modern smart phone, tablet, and laptop operating systems have background services that have the potential to incur large roaming charges during roaming conditions (e.g., Google Android "gallery" functions that share device data with the Google network, Microsoft "system" functions that do the same, software update programs, etc.). In such cases, enterprise service design center 194 may be used to specify the device applications that are not allowed to access the network during certain network conditions.

In some embodiments, the identification and network access control for a device application is performed with a device software program or agent (e.g., service processor framework program 139 or service processor kernel program 138), and enterprise service design center 194 programs the device agent with the application identification parameters and associated access policies. In some embodiments, the device agent identifies the application using an application name, certificate, signature, or hash for an application running on the device and a policy instruction stored on the device.

In some embodiments, the identification and network access control for a device application is performed with one or more network access policy enforcement elements (e.g., carrier gateway/home agent 152, carrier usage accounting server 154, enterprise firewall/security gateway 171), and enterprise service design center 194 causes the one or more network access policy enforcement elements to be provisioned with the application identification parameters and associated access policies. In some embodiments, the one or more network access policy enforcement elements identify an application by observing the traffic headers inserted by the application. In some embodiments, the one or more network access policy enforcement elements identify an application by observing the network destinations or destination patterns accessed by the application. In some embodiments, the one or more network access policy enforcement elements identify an application by routing or tunneling the application traffic to one or more network gateways or servers associated with the application (e.g., APN routes, dedicated application addressing, or a device agent that steers the application traffic to a server). In some embodiments, the device assists in this routing or tunneling with a device agent that is programmed to route or re-direct the traffic for an application.

In some embodiments, an enterprise manger can define or select service plan policies that confine enterprise-sponsored access services to a pre-defined list of network destinations, servers, or resources. For example, an enterprise manager might choose to define or select a service plan wherein only corporate network destinations may be accessed (e.g., email server, contacts server, intranet servers, text service servers, and VOIP servers). In some embodiments, enterprise service design center interface 196 may be used by an enterprise manager to define or select the allowable network destinations that device 110 may access. In some embodiments, the enterprise access manager may define or select a different set of network destinations when device 110 is roaming than when device 110 is on a home network or on a WiFi network. In some embodiments, an enterprise manager may define or select a set of network destinations that device 110 cannot access when device 110 is on a certain network (e.g., a roaming network). For example, many websites and enterprise services exhibit network access service usage behavior that can incur large roaming charges during roaming conditions (e.g., software update websites or servers, contact database synchronization websites, email download synchronization websites, video conference websites, etc.). In such cases, enterprise service design center 194 may be used to specify the device applications, services, and/or websites that are not to be accessed or used during certain network connection conditions.

In some embodiments, a device agent identifies the network destination and applies the appropriate access policy by comparing traffic characteristics with pre-defined characteristics in the access policy instructions provisioned on device 110, and then applies the corresponding traffic control rule, and enterprise service design center 194 performs the provisioning of the device agent. In some embodiments, the identification and network access control for a network destination is performed with one or more network access policy enforcement elements (e.g., carrier gateway/home agent 152, carrier usage accounting server 154, enterprise firewall/security gateway 171) and enterprise service design center 194 performs the provisioning of the one or more network elements.

In some embodiments, enterprise service design center 194 is configured to receive or accept a specification for an access network service usage limit (e.g., a service amount in minutes, bytes, or cost) for a service usage activity (such as a data service, a voice service, a text service, a roaming service, or a more detailed classification of data service such as one or more websites or one or more device applications), and the service usage limit is applied to one or more devices 110 or device groups (or users or user groups) managed by enterprise service design center 194. In some embodiments, enterprise service design center 194 is further configured to receive service usage records for device 110, which is managed by enterprise service design center 194, from a device-based element that monitors and reports device 110 service usage (e.g., one or more device usage monitors 119, device service processor framework program 139, or service processor kernel program 138, network stack 134, or access modem 151), and when the usage limit is reached a service usage notification message is generated. In some embodiments, enterprise service design center 194 is configured to deliver the service usage notification message to enterprise service design center UI 196. In some embodiments, enterprise service design center 194 is configured to deliver the service usage notification message to a device 110 software application (e.g., service processor framework program 139 or user data app 111) for presentation to the device user via a user interface.

In some embodiments, enterprise service design center 194 is configured to receive or accept a specification for an access network service usage limit (e.g., a service amount in minutes, bytes, or cost) for a service usage activity (such as a data service, a voice service, a text service, a roaming service, or a more detailed classification of data service such as one or more websites or one or more device applications), and the service usage limit is applied to one or more devices 110 or device groups (or users or user groups) managed by enterprise service design center 194. In some embodiments, enterprise service design center 194 is further configured to receive service usage records for device 110, which is managed by the enterprise service design center 194, from a device-based element configured to monitor and report device 110 service usage (e.g., one or more device usage monitors 119, device service processor framework program 139 or service processor kernel program 138, network stack 134, or access modem 151), and when the usage limit is reached a restriction or limitation on further usage is applied by the service design center by provisioning one or more network elements responsible for enforcing network access policy (e.g., carrier gateway/home agent 152, carrier usage accounting server 154, enterprise firewall/security gateway 171). In some embodiments, enterprise service design center 194 is configured to send the user a notification message or a message to contact an enterprise manager.

In some embodiments, secure network interface 128 on device 110 is configured with a VPN device client function to securely communicate between one or more approved enterprise applications (e.g., enterprise data app 124, enterprise voice app 126, secure enterprise mobile services app 125) and a counterpart VPN function that secures access to enterprise network 170 (e.g., enterprise firewall/security gateway 171 or server secure network interface 127). In some embodiments, a device software application or agent (e.g., service processor framework program 139 or service processor kernel program 138, secure network interface 128, secure hardware partition manager 108) is configured to identify network access activity associated with individual applications and allow network access to one or more approved enterprise applications when a VPN device client function is in operation, or not allow network access to one or more approved enterprise applications when a VPN device client function is not in operation. In some embodiments, service design center 190 or enterprise service design center 194 is configured to provision a device 110 software application or agent (e.g., service processor framework program 139 or service processor kernel program 138, secure network interface 128, secure hardware partition manager 108) with application access policy rules to identify network access activity associated with individual applications and allow network access to one or more approved enterprise applications when a VPN device client function is in operation, or not allow network access to one or more approved enterprise applications when a VPN device client function is not in operation. In this manner, enterprise applications that might be subject to spoofing by network elements, websites, servers, or programs operating outside the secure enterprise environment are not placed in communication with such network elements.

In some embodiments, a device software application or agent (e.g., service processor framework program 139 or service processor kernel program 138, secure network interface 128, secure hardware partition manager 108) is configured to identify network access activity associated with individual applications and not allow network access to one or more non-approved applications when a VPN device client function is in operation, or allow network access to one or more non-approved applications when a VPN device client function is not in operation. In some embodiments, service design center 190 or enterprise service design center 194 is configured to provision a device 110 software application or agent (e.g., service processor framework program 139 or service processor kernel program 138, secure network interface 128, secure hardware partition manager 108) with application access policy rules to identify network access activity associated with individual applications and not allow network access to one or more non-approved applications when a VPN device client function is in operation, or allow network access to one or more enterprise applications when a VPN device client function is not in operation. In this manner, applications that might maliciously access enterprise network resources when the VPN is running are not permitted to do so.

In some embodiments, the application access policy rules are enforced by allowing or not allowing an application to access the network. In some embodiments, the application access policy rules are enforced by allowing or not allowing the application to run. In some embodiments, the identification of approved enterprise applications associated with traffic flows is confirmed or secured by identifying the application certificate and comparing it to an application signature or hash on the device. In some embodiments, the identity of an approved enterprise application is confirmed by inspecting an application certificate, signature or hash that is provided by service design center 190 or enterprise service design center 194.

In some embodiments, secure network interface 128 is configured with a split-tunnel VPN device client function, wherein an enterprise side of the split tunnel is configured to securely communicate between one or more enterprise applications (e.g., enterprise data app 124, enterprise voice app 126, secure enterprise mobile services app 125) and a counterpart VPN function that secures access to the enterprise network 170 (e.g., enterprise firewall/security gateway 171 or server secure network interface 127), and a consumer side of the split tunnel is configured to communicate without encryption for access network services provided to consumer applications on the device. In some embodiments, a device software application or agent (e.g. service processor framework program 139 or service processor kernel program 138, secure network interface 128, secure hardware partition manager 108) is configured to identify network access activity associated with individual applications and route or direct traffic associated with one or more enterprise applications to the enterprise side of the split VPN tunnel, and route or direct traffic associated with one or more consumer applications to the consumer side of the VPN tunnel. In some embodiments, service design center 190 or enterprise service design center 194 is configured to provision a device 110 software application or agent (e.g., service processor framework program 139 or service processor kernel program 138, secure network interface 128, secure hardware partition manager 108) with application access policy rules to identify network access activity associated with individual applications and specify which applications are to be routed or directed to the enterprise side of the VPN tunnel and which applications are to be routed or directed to the consumer side of the VPN tunnel. In some embodiments, the identification of applications associated with traffic flows is secured by identifying the application certificate and comparing it to an application signature or hash on the device. In some embodiments, the application certificate, signature or hash is provided by service design center 190 or enterprise service design center 194.

In some embodiments, the policy rules only enable secure applications on device 110 to access enterprise data. In some embodiments, an enterprise manager sets policy rules that do not allow secure applications on device 110 to upload data to unsecure destinations.

In some embodiments, service design center 190 is configured to provide enterprise service design center 194. In some embodiments, enterprise service design center 194 comprises a policy management system configured to select a set of access network policies to be enforced for one or more device groups (or user groups) where the set of access network policies consists of a subset of the full set of access network policies capable of being enforced by the access network policy enforcement elements. In some embodiments, the subset of the full set of policies capable of being enforced by the access network policy enforcement elements comprises a pre-defined subset of the policy configuration capabilities. In some embodiments, the enterprise service design center policy management subset limitations for enterprise service design center 194 provide the ability to define and manage one or more of the policies that define a service policy set or service plan that is applied to a given device, user, device group or user group. In some embodiments, the enterprise service design center policy management subset limitations for enterprise service design center 194 can provide the ability to enroll a device, user, device group or user group in a set limited to one or more pre-defined service policy configurations or service plans.

As an example embodiment, the enterprise service design center policy management subset limitations for enterprise service design center 194 may provide the following policy definition and management capabilities for a device (or user) or device group (or user group): specify service usage limits (caps) for bulk access service or for a specific classification of access service activities, require all traffic or certain traffic associated with enterprise-critical applications or content to be communicated via an enterprise VPN, define controls for which applications that can access the network or certain defined destinations on the network, specify network destinations that are allowed or not allowed, specify roaming service limitations, specify WiFi networks that are allowed or not allowed, specify security settings in the device access control or I/O access control ports, specify service usage notification triggers and notification content associated with the triggers (e.g., warnings when a specified service usage activity occurs, access is not allowed for a given attempted service usage activity, or service usage reaches a limit), and other such examples that are allowed to be managed under the policy management subset limitations. In some embodiments, the charging rates for such services may not be allowed to be managed under the policy management subset limitations.

In some embodiments, enterprise service design center 194 has an allowable subset of the full set of policies capable of being enforced by the access network policy enforcement elements that comprises a pre-defined set of one or more access network policy configurations (e.g., service plans). As an example embodiment, the set of pre-configured service plans may be defined for a certain implementation of enterprise service design center 194 comprising multiple pre-defined service plans, each of which provides variations in one or more of service notification policy, access control policy, service classification policy, service QoS policy, or service charging policy.

In some embodiments, enterprise service design center 194 is configured to allow a service design administrator to select one or more pre-configured access network policy configurations (or service plans) to be applied to a device, a user, a device group or a user group.

In some embodiments, enterprise service design center 194 comprises a device enrollment management system configured to enroll a device credential into a device group (or a user credential into a user group), where the set of device credentials (or user credentials) that enterprise service design center 194 is capable of managing is a subset of the device credentials (or user credentials) allowed on the access network. In some embodiments, the subset of device credentials (or user credentials) that are subject to management by enterprise service design center 194 is defined using service design center 190.

As an example embodiment, the set of pre-defined service plans that are made available to a first enterprise service design center 194 implementation managed by a first enterprise entity might consist of three service plans, wherein the first service plan comprises network policies (e.g., access policies, charging policies, or notification policies) that provide for limited or restricted home network access service but do not provide for roaming access services, the second service plan comprises network policies that provide for unlimited or unrestricted home network access service and also provide for limited roaming access services, and the third service plan comprises network policies that provide for unlimited or unrestricted home network access service and also provide for unlimited or unrestricted roaming access services. In another example embodiment, on the same carrier access network as the previous example, a second enterprise service design center 194 implementation managed by a second enterprise entity might consist of two service plans, wherein the two service plans might be the same as two of the service plans from the previous example embodiment, or they might be completely different.

Given these examples, it will now be understood and appreciated by one of ordinary skill in the art that enterprise service design center 194 provides a convenient means of designing and distributing custom service plans to different enterprise entities that meet the needs of each enterprise entity, wherein the various policy definition capabilities disclosed herein can be used in a large number of combinations to create the service plans, with the number of combinations of service plan design capabilities being too numerous to list here. It will also now be understood and appreciated by one of ordinary skill in the art that each enterprise can effectively manage its devices (or users) and device groups (or user groups) to provide the appropriate level of policy control needed by the enterprise in a simplified manner, without the need to manage all the full policy capabilities of the access network.

For example, the embodiments of service design center 190 and enterprise service design center 194 disclosed herein support a carrier network business process wherein a carrier network manager utilizes service design center 190 to create a set of access network policies that consist of a subset of the full set of access network policies capable of being enforced by the access network policy enforcement elements (referred to as specialized enterprise service plans), and the specialized enterprise service plans are designed and offered to meet the special needs of one or more enterprise entities. In some embodiments, an enterprise manager uses enterprise service design center 194 to apply the one or more specialized enterprise service plans to one or more devices (or users) or device groups (or user groups) that belong to the enterprise entity's mobile device inventory (or employee list). The different needs of various employee groups (or device types) can be among the factors that determine which service plan is assigned to a given user group (or device group). The specific needs of an employee can assist in determining which user group (or device group) the employee should be assigned to. The carrier manager can also create other specialized enterprise service plans for other enterprise entities to meet varied needs among enterprise market customers.

In some embodiments, an enterprise manager controls access network usage, costs, and access limits for an employee user group (e.g., a group of devices that could be as small as a single device or as large as all devices under the enterprise manager's control). In some embodiments, the enterprise manager establishes at least two user groups and establishes and manages different network-access policies for different employee user groups. For example, the enterprise manager may set and manage different policies for data usage on WiFi, 3G, 4G, or other networks for different employee user groups. Likewise, the enterprise manager may set different roaming privileges for different employee user groups.

In some embodiments, an enterprise manager sets expenditure ceilings by limiting allowed data usage for secure business applications to enforce security rules. In some embodiments, an enterprise manager tracks enterprise data access to improve compliance records. For example, the enterprise manager can track enterprise data usage by employee, device, application, location, network, or time of day.

Process Flows for Providing Enterprise and Consumer Billing Allocation for Wireless Communication Device Service Usage Activities FIG. 27 illustrates a flow diagram for providing enterprise and consumer billing allocation for wireless communication device service usage activities in accordance with some embodiments. At 402, the process begins. At 404, a service usage activity of a wireless communication device (e.g., application based service usage that uses a wireless network in which the wireless communication device has an associated service plan) is performed. In some embodiments, the monitoring is performed on the wireless communication device. In some embodiments, the monitoring is performed by a network element, such as a secure application server for monitoring enterprise applications, as described herein with respect to various embodiments. At 406, an enterprise/consumer allocation is determined. In some embodiments, the monitored service usage activity is reported to a network element that determines the enterprise/consumer allocation based on the associated service plan that includes a defined enterprise/consumer allocation based on various factors, such as can be performed by a carrier billing server as described herein with respect to various embodiments. At 408, an associated consumer account is billed for the consumer service usage. At 410, the consumer account is credited for the enterprise service usage. At 412, the process is completed.

FIG. 28 illustrates another flow diagram for providing enterprise and consumer billing allocation for wireless communication device service usage activities in accordance with some embodiments. At 502, the process begins. At 504, a service usage activity of a wireless communication device (e.g., application based service usage that uses a wireless network in which the wireless communication device has an associated service plan) is performed. At 506, an enterprise/consumer allocation is determined. At 508, an associated enterprise account is billed for the enterprise service usage. At 510, the enterprise account is credited for the consumer service usage. At 512, the process is completed.

FIG. 29 illustrates another flow diagram for providing enterprise and consumer billing allocation for wireless communication device service usage activities in accordance with some embodiments. At 602, the process begins. At 604, a service usage activity of a wireless communication device (e.g., application based service usage that uses a wireless network in which the wireless communication device has an associated service plan) is performed. At 606, an enterprise/consumer allocation is determined. At 608, the enterprise service usage is reported. At 610, an expense reimbursement for the enterprise service usage is generated (e.g., by the enterprise for the consumer, who is, for example, an employee of the enterprise). At 612, the process is completed.

FIG. 30 illustrates another flow diagram for providing enterprise and consumer billing allocation for wireless communication device service usage activities in accordance with some embodiments. At 702, the process begins. At 704, a service usage activity of a wireless communication device (e.g., application based service usage that uses a wireless network in which the wireless communication device has an associated service plan) is performed. At 706, the monitored service usage is reported. At 708, an enterprise/consumer allocation is determined. At 710, a bill/charge based on the enterprise/consumer allocation is generated. At 712, the process is completed.

Although the foregoing embodiments have been described in some detail for purposes of clarity of understanding, the invention is not limited to the details provided. There are many alternative ways of implementing the invention. The disclosed embodiments are illustrative and not restrictive. In particular, many of the embodiments are not limited to supporting an enterprise/consumer split. As would be appreciated by one of ordinary skill in the art, the disclosed embodiments may be applied, for example, when a sponsor entity subsidizes a cost associated with an end-user device's use of a sponsored (or ambient) data service or application, and the user pays for the end-user device's use of non-sponsored (or non-ambient) data services or applications. The sponsor entity may use enterprise service design center 194 to configure devices that may use the sponsored service, policies applicable to the sponsored service, etc. Moreover, the disclosed embodiments may be applied when a first sponsor subsidizes a cost associated with an end-user device's use of a first sponsored data service or application, a second sponsor subsidizes a cost associated with the end-user device's use of a second sponsored data service or application, and the user pays for the end-user device's use of non-sponsored data services or applications. The sponsor entities may use one or more enterprise service design centers to configure aspects of the sponsored services. As would be appreciated by one of ordinary skill in the art, there are many other environments in which the disclosed embodiments are useful or applicable.

Several advantageous combination embodiments are now disclosed for allocating enterprise service usage accounting and personal service usage accounting. These combinations are for example purposes, are not meant to be exhaustive or limiting in any way; as will be apparent to one of ordinary skill in the art, these combinations represent only a fraction of the embodiments provided herein.

In some embodiments, a network system for classifying the accounting of access network service usage for an end user device comprises (i) a first service design center configured to receive an accounting split classification policy defining the classification rules for dividing an overall access network service usage into an enterprise service usage allocation and a personal service usage allocation, (ii) a network provisioning instruction translator configured to receive the accounting split classification policy and translate it to a set of network service usage classification and reporting instructions for one or more network elements responsible for classifying service usage, (iii) a network provisioning system for communicating the set of network service usage classification and reporting instructions to the one or more network elements responsible for classifying service usage, (iv) the one or more network elements responsible for classifying service usage configured to classify service usage to determine the enterprise service usage allocation and the personal service usage allocation, and generate service usage reports, and (v) a service usage accounting system that receives the service usage reports and (a) accrues the enterprise service usage allocation, and (b) accrues the personal service usage allocation.

In some embodiments, the network system for classifying the accounting of access network service usage for an end user device can be augmented wherein the first network access notification message policy is associated with a first device group defined by a first list of device credentials or a first user group defined by a first list of user credentials, and the service design center is further configured to obtain a second network access notification message policy comprising a plurality of second network access trigger conditions and, for each of the plurality of second network access trigger conditions, an associated second network access notification message, the second network access notification message policy associated with a second device group defined by a second list of device credentials or a second user group defined by a second list of user credentials.

In some embodiments, the network system for classifying the accounting of access network service usage for an end user device further comprises a master service design center configured to define a first notification policy design capability set for the first service design center, the first notification policy design capability set comprising a first subset of a master policy capability set. This embodiment can be further augmented wherein the master service design center is further configured to define a second notification policy design capability set for a second service design center, the second notification policy design capability set comprising a second subset of the master policy capability set, the second subset of the master policy capability set either identical to or different from the first subset of the master policy capability set.

In some embodiments, the network system for classifying the accounting of access network service usage for an end user device is further augmented wherein the first service design center is hosted on an operator network. In some embodiments, the network system for classifying the accounting of access network service usage for an end user device is optimized for smaller enterprise data center deployments wherein the first service design center is hosted on an enterprise business network.

In some embodiments, the network system for classifying the accounting of access network service usage for an end user device can be augmented wherein the enterprise service usage allocation comprises a classification of service usage that specifies one or more enterprise device software applications. In some embodiments, the enterprise applications can be one or more of email, calendar, contacts, enterprise intranet (e.g., a secure intranet browser with a secure SSL connection or other secure connection to enterprise services), mobile device synchronization or mobile enterprise communications.

In some embodiments, the network system for classifying the accounting of access network service usage for an end user device can be augmented wherein the enterprise service usage allocation comprises a classification of service usage that specifies one or more enterprise network destinations.

In some embodiments, the network system for classifying the accounting of access network service usage for an end user device can be augmented wherein the enterprise service usage allocation comprises a classification of service usage that specifies one or more enterprise network destinations and the one or more enterprise network destinations comprise an address or identifier for a secure enterprise gateway. In some embodiments, the enterprise gateway comprises a VPN server.

In some embodiments, the network system for classifying the accounting of access network service usage for an end user device can be augmented wherein the enterprise service usage allocation comprises a classification of service usage that specifies one or more enterprise network destinations and the one or more enterprise network destinations comprise an address or identifier for one or more secure enterprise mobile services gateways or servers comprising one or more of an email server, a calendar server, a contacts server, an enterprise intranet access server, a mobile device synchronization services server or a mobile enterprise communication server.

In some embodiments, the network system for classifying the accounting of access network service usage for an end user device can be augmented wherein the one or more network elements responsible for classifying service usage and generating service usage reports comprises a service usage monitor located in a wireless operator network.

In some embodiments, the network system for classifying the accounting of access network service usage for an end user device can be augmented wherein the one or more network elements responsible for classifying service usage and generating service usage reports comprises a service usage monitor located in an enterprise access network.

In some embodiments, the network system for classifying the accounting of access network service usage for an end user device can be augmented wherein the one or more network elements responsible for classifying service usage and generating service usage reports comprises a service usage monitor located on a wireless device.

In some embodiments, the network system for classifying the accounting of access network service usage for an end user device can be augmented wherein the service usage accounting system is located in an enterprise network.

In some embodiments, the network system for classifying the accounting of access network service usage for an end user device can be augmented wherein the service usage accounting system is managed by an enterprise manager under the control of the entity that manages an enterprise business.

In some embodiments, the network system for classifying the accounting of access network service usage for an end user device can be augmented wherein the service usage accounting system is located in an operator network.

In some embodiments, the network system for classifying the accounting of access network service usage for an end user device can be augmented wherein the service usage accounting system is managed by an operator manager under the control of the entity that manages a network operator.

In some embodiments, the network system for classifying the accounting of access network service usage for an end user device can be augmented wherein the service usage accounting system is further configured to credit a user account with a service usage credit or monetary credit associated with the accrued enterprise service usage allocation.

In some embodiments, the network system for classifying the accounting of access network service usage for an end user device can be augmented wherein the service usage accounting system is further configured to debit a user account with a service usage debit or monetary cost associated with the accrued personal service usage allocation.

In some embodiments, the network system for classifying the accounting of access network service usage for an end user device can be augmented wherein the service usage accounting system is further configured to credit an enterprise account with a service usage credit or monetary credit associated with the accrued personal service usage allocation.

In some embodiments, the network system for classifying the accounting of access network service usage for an end user device can be augmented wherein the service usage accounting system is further configured to debit an enterprise account with a service usage debit or monetary cost associated with the accrued enterprise service usage allocation.

In some embodiments, the network system for classifying the accounting of access network service usage for an end user device can be augmented by further configuring the service design center to: (i) receive a personal service plan offer comprising one or more service plans for personal network access services accounted to the personal service usage allocation, (ii) configure a device user interface service plan offer notification message, (iii) communicate the device user interface service plan offer notification message to one or more device groups comprising a collection of devices identified by device credentials, (iv) receive a service plan selection option from an end user device user in response to the device user interface service plan offer notification message, and (v) cause one or more network elements responsible for activating service plans to activate the service plan selection chosen by the end user device user.

In some embodiments the end-user device system in communication with the network system for classifying the accounting of access network service usage comprises: (i) a device software application environment comprising: (a) an enterprise application execution environment configured with: (1) an enterprise application execution memory and data memory to support secure execution of enterprise software applications, the enterprise software applications comprising applications approved to execute in the secure execution environment and to communicate with secure enterprise services, (2) a secure enterprise communication link configured to provide communication between the enterprise software applications and enterprise network services, the enterprise network services comprising enterprise network resources and servers, (b) a personal application execution environment configured with execution memory and data memory to support execution of personal software applications not approved to execute in the secure execution environment, (ii) a personal service plan selection user interface comprising a notification software agent configured to receive personal service plan offer from a network element and display the service plan offers, the personal service plan offer comprising one or more service plans for personal network access services accounted to a personal service usage allocation, and receive a service plan selection option from an end user device user and forward the service plan selection option to a network element.

In some embodiments, the end-user device system can be augmented wherein the secure enterprise communication link comprises a VPN client in communication with an enterprise VPN gateway.

In some embodiments, the end-user device system can be augmented wherein the enterprise network services comprise access to one or more secure enterprise mobile services gateways or servers comprising one or more of an email server, a calendar server, a contacts server, an enterprise intranet access server, a mobile device synchronization services server or a mobile enterprise communication server.

In some embodiments, the end-user device system can be augmented wherein the enterprise application execution environment is further configured to: (i) acquire a device software application signature prior to allowing execution of the device software application in the virtual machine operating environment, (ii) compare the signature to an approved list of signatures, (iii) allow the application to execute if it is on the list, and (iv) not allow the application to execute if it is not on the list.

In some embodiments, the end-user device system can be augmented wherein enterprise application execution environment comprises a virtual machine operating environment.

In some embodiments, the end-user device system can be augmented wherein enterprise application execution environment comprises a secure CPU hardware execution partition.

In some embodiments, the end-user device system can be augmented wherein enterprise application execution environment comprises a secure operating system execution partition.

In some embodiments, the end-user device system can be augmented wherein enterprise application execution environment comprises a secure memory area protected by an enterprise application software program that encrypts the enterprise data stored on device memory and runs a secure encrypted communication protocol for communication with a secure mobile enterprise services gateway server.

Several advantageous combination embodiments are now disclosed for providing enterprise control of network access service to an end user device. These combinations are for example purposes, are not meant to be exhaustive or limiting in any way; as would be appreciated by one of ordinary skill in the art, these combinations represent only a fraction of the advantageous embodiment combinations provided herein.

In some embodiments, a network system for providing network access service control for an end user device comprising: (i) a first service design center configured to receive from an administrator user or a configuration file a first network access policy comprising a first set of network access service permissions associated with an end user device or end user device user, (ii) a network provisioning instruction translator configured to receive the first network access policy and translate it to a set of network access policy enforcement instructions for one or more network elements responsible for controlling network access, (iii) a network provisioning system for communicating the set of network access policy enforcement instructions to the one or more network elements responsible for controlling network access, (iv) the one or more network elements responsible for controlling network access configured to execute the set of network access policy enforcement instructions to enforce network access service permissions and limits.

In some embodiments, the network system for providing network access service control can be augmented wherein the first network access policy is associated with a first device group defined by a first list of device credentials or a first user group defined by a first list of user credentials, and the service design center is further configured to obtain a second network access policy comprising a second set of network access service permissions and, the second network access policy associated with a second device group defined by a second list of device credentials or a second user group defined by a second list of user credentials.

In some embodiments, the network system for classifying the accounting of access network service usage for an end user device further comprises a master service design center configured to define a first network access policy design capability set for the first service design center, the first network access policy design capability set comprising a first subset of a master policy capability set. This embodiment can be further augmented wherein the master service design center is further configured to define a second network access policy design capability set for a second service design center, the second network access policy design capability set comprising a second subset of the master policy capability set, the second subset of the master policy capability set either identical to or different from the first subset of the master policy capability set.

In some embodiments, the network system for providing network access service control can be augmented wherein the first network access policy defines a set of one or more service usage limits or service cost limits.

In some embodiments, the network system for providing network access service control can be augmented wherein the first network access policy defines a set of one or more roaming network service usage limits or service cost limits.

In some embodiments, the network system for providing network access service control can be augmented wherein the first network access policy defines a set of one or more network type restrictions, wherein a network type comprises one or more of a cellular network, a 2G network, a 3G network, a 4G network, a WiFi network, a particular WiFi network APN, roaming cellular network, a particular cellular operator network.

In some embodiments, the network system for providing network access service control can be augmented wherein the first network access policy defines a set of one or more device application software network access restrictions.

In some embodiments, the network system for providing network access service control can be augmented wherein the first network access policy defines a set of one or more network destination access restrictions.

In some embodiments, the network system for providing network access service control can be augmented wherein the first network access policy defines a set of one or more enterprise network destination allowances or restrictions.

In some embodiments, the network system for providing network access service control can be augmented wherein the first network access policy defines a set of one or more enterprise network destination allowances or restrictions communicated over a secure VPN communication link.

In some embodiments, the network system for providing network access service control can be augmented wherein the first network access policy defines a set of one or more application or network destination allowances or restrictions communicated over a non-secure communication link.

In some embodiments, the network system for providing network access service control can be augmented wherein the first network access policy defines a set of one or more personal application or network destination allowances or restrictions.

In some embodiments, the network system for providing network access service control can be augmented wherein the first network access policy defines a set of one or more geographic location allowances or restrictions.

In some embodiments, the network system for providing network access service control can be augmented wherein the one or more network elements responsible for controlling network access comprises a service usage monitor located in a wireless operator network.

In some embodiments, the network system for providing network access service control can be augmented wherein the one or more network elements responsible for controlling network access comprises a service usage monitor located in an enterprise access network. In some embodiments, the one or more network elements responsible for controlling network access comprises a service usage monitor located in an enterprise access network comprise a VPN gateway wherein all device traffic is communicated from the device to the VPN gateway configured to control the device traffic. In some embodiments, the VPN gateway performs service usage classification to identify and control enterprise traffic. In some embodiments, the VPN gateway performs service usage classification to identify and control personal traffic.

In some embodiments, the network system for providing network access service control can be augmented wherein the one or more network elements responsible for controlling network access comprises a service usage monitor located on a wireless device.

The invention claimed is:

1. A network system for providing one or more notification messages associated with an end-user device, the network system comprising:
a first set of one or more elements configured to:
obtain a first notification policy comprising a first trigger condition and an associated first notification message, the first trigger condition specifying a condition associated with one or more attempted or successful end-user device activities over a wireless access network, the first notification message comprising notification information to be presented through a user interface,
based on the first trigger condition, determine one or more trigger identification instructions, the one or more trigger identification instructions configured to assist a second set of one or more elements in identifying when the first trigger condition occurs, the second set of one or more elements being responsible for monitoring service usage over the wireless access network associated with the end-user device,
communicate the one or more trigger identification instructions to the second set of one or more elements, receive a trigger condition indication from the second set of one or more elements, the trigger condition indication indicating that the first trigger condition has occurred, and at least assist in presenting the notification information through the user interface; and a communicate interface enabling the first set of one or more elements to communicate with the second set of one or more elements.

2. The network system recited in claim 1, wherein the first set of one or more elements comprise a first service design center, and further comprising a master service design center configured to define a first notification policy design capability set for the first service design center, the first notification policy design capability set comprising a first subset of a master policy capability set.

3. The network system recited in claim 2, wherein the master service design center is further configured to define a second notification policy design capability set for a second service design center, the second notification policy design capability set comprising a second subset of the master policy capability set, the second subset of the master policy capability set either identical to or different from the first subset of the master policy capability set.

4. The network system recited in claim 1, wherein the first trigger condition is that a period of time has elapsed since a previous trigger condition occurred, and wherein the notification information comprises a measure of an amount or a cost of service usage associated with the end-user device.

5. The network system recited in claim 1, wherein the first trigger condition is that the end-user device has consumed a particular amount of service usage, and wherein the notification information comprises a measure of the particular amount of service usage.

6. The network system recited in claim 1, wherein the user interface is a user interface of the end-user device, and wherein at least assist in the presenting the notification information through the user interface comprises send at least a portion of the notification information to the end-user device.

7. The network system recited in claim 1, wherein the first set of one or more elements includes a service design center hosted on an operator network.

8. The network system recited in claim 1, wherein the first set of one or more elements includes a service design center hosted on an enterprise network.

9. The network system recited in claim 1, wherein the first trigger condition is that a service usage by the end-user device has reached a service usage limit, or the end-user device has incurred a specified amount of accrued cost.

10. The network system recited in claim 1, wherein the first trigger condition is that a service usage by the end-user device has reached a roaming service usage limit, or the end-user device has incurred a specified amount of accrued roaming service cost.

11. The network system recited in claim 1, further comprising the second set of one or more elements, and wherein the second set of one or more elements is configured to:

execute the one or more trigger identification instructions to identify when the first trigger condition occurs, and send the trigger condition indication to the first set of one or more elements.

12. The network system recited in claim 11, wherein the second set of one or more elements is further configured to classify service usage by network destination, and wherein the first trigger condition is associated with one or more device network destination access activities.

13. The network system recited in claim 1, wherein the second set of one or more elements comprises a service usage monitor located in a wireless operator network.

14. The network system recited in claim 1, wherein the second set of one or more elements comprises a service usage monitor located in an enterprise access network.

15. The network system recited in claim 1, wherein the second set of one or more elements comprises a service usage monitor located on the end-user device.

16. The network system recited in claim 1, wherein the first notification policy is associated with a first device group defined by a first set of device credentials or a first user group defined by a first set of user credentials, and wherein the first set of one or more elements is further configured to obtain a second notification policy comprising a plurality of second trigger conditions and, for each of the plurality of second trigger conditions, an associated second notification message, the second notification policy associated with a second device group defined by a second set of device credentials or a second user group defined by a second set of user credentials.

17. The network system recited in claim 16, wherein the first notification policy comprises a subset of the second notification policy.

18. The network system recited in claim 1, wherein the user interface is an end-user device user interface.

19. The network system recited in claim 1, wherein the trigger condition is that the end-user device attempted an activity that requires a service plan to be activated or purchased.

20. The network system recited in claim 1, wherein the user interface is an end-user device user interface, and wherein the first set of one or more elements is further configured to obtain, from the end-user device, a response to the notification information.

21. The network system recited in claim 20, wherein the response comprises a request to activate or purchase a service plan for the end-user device.

22. The network system recited in claim 21, wherein the first set of one or more elements is further configured to at least assist in activating the service plan for the end-user device.

23. The network system recited in claim 1, wherein the first set of one or more elements comprises a billing system, a gateway, a home agent, a service plan provisioning system, or a combination of these.

24. The network system recited in claim 1, wherein the notification information comprises a warning.

25. The network system recited in claim 1, wherein the notification information comprises an indication that an attempted activity is not allowed.

26. The network system recited in claim 1, wherein the first trigger condition is that the end-user device has consumed a particular amount of service usage.

27. The network system recited in claim 1, wherein the first trigger condition is that the end-user device has consumed a particular amount of service usage on a roaming network.

28. The network system recited in claim 1, wherein the first trigger condition is that the end-user device is connected to or is attempting to connect to a roaming network.

29. The network system recited in claim 1, wherein the first set of one or more elements comprises a service design center, a network provisioning translator, a provisioning element, or a combination of these.

30. The network system recited in claim 1, wherein the user interface is a service design center user interface.

31. The network system recited in claim 1, wherein the first trigger condition is that the end-user device has incurred a cost of service usage, and the notification information comprises a measure of the cost of service usage or an aggregate service usage cost.

32. The network system recited in claim 11, wherein the second set of one or more elements is further configured to block or to assist in blocking one or more communications associated with the end-user device after the first trigger condition has occurred.

33. The network system recited in claim 11, wherein the second set of one or more elements is further configured to restrict or to assist in restricting one or more communications associated with the end-user device after the first trigger condition has occurred.

34. The network system recited in claim 11, wherein the second set of one or more elements is further configured to classify service usage by device application, and wherein the first trigger condition is associated with one or more device application access activities.

35. The network system recited in claim 34, wherein the second set of one or more elements comprises a usage accounting server, a firewall, a gateway, a deep packet inspection element, a home agent, or a combination of these.

36. The network system recited in claim 1, wherein the notification information comprises information about a data usage.

37. The network system recited in claim 1, wherein the notification information comprises information about a status of the end-user device.

38. The network system recited in claim 1, wherein the notification information comprises real-time or near-real-time information about a data usage associated with the end-user device.

39. The network system recited in claim 1, wherein the notification information comprises information about a data usage availability.

40. The network system recited in claim 1, wherein the notification information comprises information about a data usage entitlement.

41. The network system recited in claim 1, wherein the notification information comprises a report of usage.

42. The network system recited in claim 41, wherein the report of usage provides information about usage associated with a user, a user group, the end-user device, a device group, a location, or a combination of these.

43. The network system recited in claim 1, wherein the first trigger condition is that the one or more attempted or successful end-user device network access activities indicate a network access pattern.

44. The network system recited in claim 43, wherein the network access pattern is associated with a particular application on the end-user device.

45. The network system recited in claim 43, wherein the network access pattern is associated with one or more network destinations, websites, or network servers.

46. The network system recited in claim 43, wherein the notification information comprises information about the network access pattern.

47. The network system recited in claim 43, wherein the notification information comprises information that the network access pattern has occurred.

\* \* \* \* \*

UNITED STATES PATENT AND TRADEMARK OFFICE
CERTIFICATE OF CORRECTION

PATENT NO. : 8,924,469 B2  
APPLICATION NO. : 13/248028  
DATED : December 30, 2014  
INVENTOR(S) : Raleigh et al.

Page 1 of 1

It is certified that error appears in the above-identified patent and that said Letters Patent is hereby corrected as shown below:

In the claims

In column 55, line 7, the word "communicate" should be changed to "communication"

In column 55, line 11, the word "comprise" should be changed to "comprises"

In column 55, line 37, the phrase "assist in the presenting" should be changed to "assist in presenting"

Signed and Sealed this
Fourteenth Day of June, 2016

Michelle K. Lee
*Director of the United States Patent and Trademark Office*